United States Patent [19]

Rode et al.

[11] 3,863,060

[45] Jan. 28, 1975

[54] GENERAL PURPOSE CALCULATOR WITH CAPABILITY FOR PERFORMING INTERDISCIPLINARY BUSINESS CALCULATIONS

[75] Inventors: France Rode, Los Altos; William L. Crowley, Jr., Cupertino; Alexander D. R. Walker, San Francisco; David S. Cochran, Palo Alto, all of Calif.

[73] Assignee: Hewlett-Packard Company, Palo Alto, Calif.

[22] Filed: Oct. 30, 1972

[21] Appl. No.: 302,371

[52] U.S. Cl. .......... 235/156

[51] Int. Cl. .......... G06f 7/38

[58] Field of Search .......... 235/156, 159, 160, 164, 235/92 AC, 92 CP; 340/122.5; 444/1

[56] References Cited

UNITED STATES PATENTS

| | | | |
|---|---|---|---|
| 3,017,103 | 1/1962 | Goldberg et al. | 235/176 |
| 3,533,076 | 10/1970 | Perkins et al. | 340/172.5 |
| 3,631,403 | 12/1971 | Asloo et al. | 340/172.5 |
| 3,720,820 | 3/1973 | Cochran | 235/156 |
| 3,760,171 | 9/1973 | Wang et al. | 235/156 |

*Primary Examiner*—Eugene G. Botz
*Assistant Examiner*—David H. Malzahn
*Attorney, Agent, or Firm*—Roland I. Griffin; F. David LaRiviere

[57] ABSTRACT

A battery-powered, hand-held, calculator employs MOS/LSI calculator circuits to perform arithmetic and financial calculations. Data and commands are input to the calculator from a keyboard having a prefix key to double the functions of selected keys. A 15-digit, seven-segment light emitter diode (LED) display serves as the output for the calculator. The calculator circuits include a read-only memory circuit in which the algorithms for performing the arithmetic and financial calculations are stored; a control and timing circuit for scanning the keyboard, retaining status information about the condition of the calculator or of an algorithm, and generating the next read-only memory address; and an arithmetic and register circuit containing an adder, a group of working registers, a group of data storage registers forming a stack for roll down operation, and a constant storage register. These circuits are interconnected by a multiple line buss system.

34 Claims, 36 Drawing Figures

POSSIBLE TRANSFER PATHS BETWEEN ROMS

Addressing And Readout Timing

Display Decoding From Arithmetic And Register Circuit

Example Output For Digit 9

Start Signal

Timing for Decimal Point Drive

Keyboard Force-Deflection Curve

CALCULATOR PARAMETERS $L = 130\mu h$
$R_L = 4\Omega$
RaSAT = 1Ω
Rd = 1Ω
Rc SAT = 1Ω
Vd = 1.7 Volts
Va SAT = .3 Volts
Vc SAT = .45 Volts Inductor Current And LED Anode Voltages

FLOW DIAGRAM OF DISPLAY WAIT LOOP

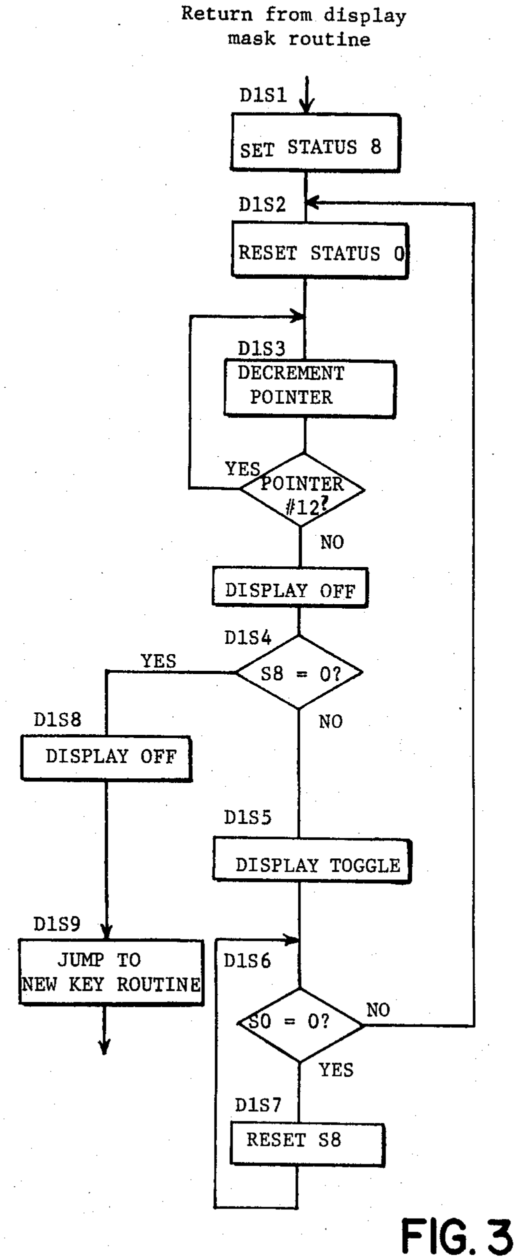

Pointer is at 12 at this time, and the display is off.

Status 8 = 1 indicates "key has been processed"

Status 0 = 1 indicates a key is down

This loop takes 48 word times or about 14.4 msec. It prevents key bounce from executing a function twice.

Check if key is processed. First time S8 = 1 so go to D1S5.

Turn on display to see answer from previous operation.

Check if key down. If no (S0 = 0) reset S8. If yes, return to check S8. At least one pass through D1S7 must be made to insure a key is processed only once.

FIG. 31

GENERAL PURPOSE CALCULATOR WITH CAPABILITY FOR PERFORMING INTERDISCIPLINARY BUSINESS CALCULATIONS

TABLE OF CONTENTS

Section
Background and Summary of the Invention
Description of the Drawings
Description of the Preferred Embodiment
System Architecture
Control and Timing Circuit
Read-Only Memory Circuit
Arithmetic and Register Circuit
Clock Driver
Anode Driver
Cathode Driver
Keyboard
LED Display
Instruction Set
Detailed Listing of Routines and Subroutines of Instructions
Functions
Operating Instructions

BACKGROUND AND SUMMARY OF THE INVENTION

This invention relates generally to calculators and improvements therein and more particularly to non-programmable business calculators.

Conventional business calculators generally have less capability and flexibility than is required to meet the needs of the business user. They are usually designed to solve the most elementary calculation of one business discipline (i.e., banking or real estate, or finance, etc) and lack the capability and flexibility for inter-disciplinary business calculations. For example, there are special calculators for financiers to solve bond yield and bond price problems, and calculators for realtors to solve mortgage amortization and depreciation problems. However, a financier who wishes to quickly compare the rate of return between bonds and real estate will either need two expensive calculators or will have to compromise the degree of accuracy of the calculation with gross mathematical approximations performed on a single purpose calculator. This limitation of single purpose calculators can lead to critical errors in decision making. Because conventional single purpose business calculators are designed for special applications by specialists in that area, the keyboards are generally not selfexplanatory and appear as a befuddling collection of buttons and switches with special symbols. This requires a longer user orientation period before productive usage begins.

Due to the high cost and the limited capabilities of the available business calculators, and sometimes, simply because there is no calculator available to perform certain calculations, the majority of the everyday business calculations are still made with the aid of published tables. Published tables are the only convenient means available for solving certain financial problems, such as calculations for the discount amount in discounted notes and the equivalent interest rate between accrued interest notes and discounted notes. The main disadvantage of using tables is the inherent restriction to the discrete values given in the table. The accuracy of the calculation is limited to the accuracy of the tables and the need for interpolation further compromises the calculation. For example, a widely used bond value table has discrete values for bond yield to two decimal places and the interest rate is given in one-eighth of one percent increments. The use of tables with this limited accuracy could lead to errors of several thousands of dollars in a 50 million dollar bond issue.

Another disadvantage of using tables is the requirement that the user must have a working knowledge of both the problem area and the mathematical formulas to set up the problem in a specific manner before the tables are applicable. Even then, it is often necessary to take a reciprocal or multiply by a constant before the answer is usable. This limits the use of the table to only those with a certain level of expertise in the problem area. Thus, one who performs a great variety of business calculations, from asset depreciation to sale forecasting must have: (1) an expensive collection of special purpose calculators; or (2) a library of tables close at hand; or (3) the mathematical and financial expertise to set up and solve the problem correctly.

The principle object of this invention is to provide a general purpose business calculator that has vastly greater capability and flexibility than conventional business calculators and that is small, inexpensive and easier to use than conventional business calculators. This calculator was designed to incorporate into one small calculator the capability of performing the majority of the calculations used in the many disciplines of business and performing these calculations with up to ten-digit accuracy. It replaces the special calculators designed for banking, or accounting, or finance, or real estate and other businesses and eliminates the need for all commonly used financial tables. It also allows the user to make inter-disciplinary analysis, for example, between real estate or bond investment programs, quickly and with one calculator. Furthermore, with the present invention, a sophisticated user can incorporate the mathematical formulas of several business disciplines to solve a complex problem involving several disciplines.

Another object of this invention is to provide a small business calculator which does not require a high level of user expertise or a working knowledge of the problem area and the necessary mathematical formulas before the problem can be set up and solved. Keys relating to a general class of problems are grouped together and designated in accordance with the generally accepted business symbols (e.g., *i* for interest per period, PMT for payment per period, etc.). The key layout and the keying sequence are such that they suggest to the non-expert user the information necessary to solve a given problem. For example, in solving the general class of compound interest and annuity problems with this calculator, the five possible variables, number of time periods, interest rate per period, payment per period, the present value and the future value are all located on the top row. A user can key in any of the three variables in the prescribed left to right sequence and the calculator will solve either of the remaining unknowns as requested. This procedure does not require any previous knowledge of compound interest or annuity mathematics, and any of the five variables can be solved without any intermediate steps. Hence, all that is required of the user is that he be able to define the variables of the problem, and the unique keying sequence of the invention will carry out the necessary mathematical manipulation.

A calculator constructed according to the preferred embodiment of this invention is small enough to hold in one hand, capable of displaying data as it is entered and a numerical result as it is calculated, and incorporates many complex functions in order to perform the number and kind of calculations and mathematical operations required for different business disciplines. The limits of maniaturization and sophistication are realized, however, if the keyboard of such a calculator becomes so small and so crowded with keys that the human hand can no longer physically or conveniently manipulate them. One solution to this problem is to reduce the number of functions the calculator can perform. A better solution is to assign more than one function to each key, thus reducing the number of keys necessary to incorporate all the functional capabilities of the calculator.

As more functions are assigned to each key, however, the clarity of labelling a key's various functions becomes important. Moreover, not only must the labelling clearly refer to the particular key, but the functions each key causes the machine to perform should be easily understood and learned by the user from scanning the keyboard labels. After learning the total capability of the particular machine from a reading of the manual, the user should be able to know the relationship between keys, the function(s) each key initiates and, therefore, the operation of the machine, from his knowledge of the keyboard itself.

The limitations of miniature calculators are overcome in the preferred embodiment of the present invention by incorporating easily interpreted, coded legends on the surface of the keyboard immediately above certain keys to which an additional function is assigned. The coding, not only designates the additional function of each such key, but also refers to the prefix key which is depressed to activate the additional function of the key.

Some conventional business calculators have a day between date function, but do not check for improper date entries (e.g., 32nd of June) or compensate for the extra day in a leap year. The present invention automatically checks for improper date entries and compensates for the extra days in leap years in all number-of-days calculations between 1900 A.D. and 2100 A.D. Furthermore, the present invention has the unique capability of determining a future or past date with compensation for leap years given the number of days away.

Conventional business calculators have very complicated procedures for establishing a trend line from a set of periodic data points. In the existing prior art, the user enters the data points and is given the value of the $y$ intercept and the slope of the straight line that best fits the data points (hereinafter referred to as the best fit line). In order to forecast future values, the user had to multiply the slope by the future time period and add the result to the value of the $y$ intercept to get the desired future value.

The present calculator is capable of determining a best fit line from a set of data points and, without any intermediate steps or interpolation, of providing ordinal values on the best fit line at any point on the time axis. This calculator can also extrapolate either single or multiple time periods into the past or the future. Hence, the user can either request the ordinal value at any time period up to 10 digits long (e.g., −2.5, 0, 7.53452) or utilize the feature which automatically calculates the ordinal value for single time period increments.

Conventional business calculators for bond price and bond yield calculations have a manual switch to initiate different bond price and bond yield algorithms for bonds maturing in less than 181 days (these are considered as notes rather than bonds). The present calculator has an automatic feature to check the maturity period and initiate the proper algorithm. The algorithms traditionally used in conventional business calculators to solve bond price and bond yield are very complex and require extensive hardware capability. This has made these calculators large, complicated, and expensive. In the present calculator, two new algorithms requiring significantly less hardware for bond price and bond yield calculations are used to allow the incorporation of these two bond calculations in a small, general purpose calculator at a fraction of the special bond calculator price.

Conventional business calculators designed to calculate accumulated mortgage interest and remaining principal on a mortgage can give the cumulative totals up to a given time period. However, it is often necessary to determine the accumulated mortgage interest and the cumulative principal paid during a specific time period. This is not possible with prior art calculators without making two separate calculations and then taking the difference. The present invention permits the user to find the amount of mortgage interest paid during any specified time period, as well as the remaining principal in one step. Thus, this calculator can for example automatically calculate either the interest paid during the past year or the interest paid during the sixth through the tenth years.

Conventional business calculators with discount cash flow capability discount the entire stream of expected cash flow and solve for the rate of return of the investment. This provides for a summary analysis of the cash producing life span of an asset, but does not provide any interim information on the repayment of the original investment. The present calculator has a discount cash flow capability that discounts each cash flow and maintains a running total of the outstanding amount of the original investment. Hence, when the outstanding balance becomes zero, or greater, the user will know the number of periods before the investment is recouped.

In the past discounted note calculations were made by employing discount note tables where the discounted interest rate is given at 0.05 percent increments, the discounted amount is given to six decimal places, and the equivalent annual interest rate is given only to four decimal places. Thus, one who wished to find the discounted amount or to convert the discounted interest rate to an equivalent annual interest rate is faced with two limitations: (1) the discrete interest value and, hence, the need for interpolation to obtain the discounted interest rate; and (2) the four decimal place accuracy of the equivalent annual interest rates. Both of these aforementioned limitations can have a sizable effect on large sum calculations.

In some money markets outside the United States, a 365 day year is used for interest bearing transactions. This makes it necessary for an international investor to make extra calculations to convert a given interest rate from a 360 day basis to a 365 day basis or vice versa. Thus, it would be very helpful for an international investor to have the capability of finding the equivalent interest for either interest bearing period.

The present calculator replaces the discount note tables and performs the calculations related to discounted notes without being limited to discrete discounted interest rates and is accurate to ten digits. It automatically calculates the discounted amount and the equivalent annual interest rate to ten digit accuracy for both the 360 day year and the 365 day year which enables prompt evaluation of interest bearing instruments in different money markets.

Conventional business calculators with arithmetic mean and standard deviation capability are very restricted in their performance. In most cases, to find the standard deviation, the user must first find the variance from the sum of the squares of the input data and then take the square root of the variance to find the standard deviation. Also, once the data is entered and the arithmetic mean calculation is made, it is not possible to add or remove a data point to evaluate the effect on the arithmetic mean and the standard deviation without entering all the data points and performing the calculations over again.

The present calculator computes both the arithmetic mean and the standard deviation automatically from the input data. Furthermore, once the arithmetic mean and the standard deviation are calculated, the present invention permits the user to add or remove input data values from the original set of data and calculate a new arithmetic mean and standard deviation without reentering all the input values. Hence, this machine is highly interactive and permits the user to measure the influence of hypothetical inputs on the existing data.

The present calculator also has the capability for determining a depreciation schedule based on the sum-of-the-digit depreciation method. Given the life of an asset and the depreciable amount, this calculator computes the depreciation for any requested period and the remaining book value to be depreciated. Furthermore, the user can find the same information for all subsequent periods to set up a depreciation schedule.

In order to implement the extended capability and flexibility provided by this calculator, new algorithms were developed requiring less hardware to solve complex problems. A new algorithm using internal transformations was developed to solve for the interest in the present value of an annuity and in the future value of an annuity. This same algorithm also solves for the effective annual percentage rate from the so-called "add-on" rate. Thus, this one algorithm has made it possible for a user to solve any of these three inherently different interest problems without having to identify the problem. The present calculator automatically identifes the type of interest problem from the prescribed left to right keying sequence of the relevant data, and the input data is then converted to a form acceptable to the new algorithm.

Another new algorithm was also developed to reduce the complexity of the bond price and bond yield problem (and the solution thereof) so as to make this problem solvable using only five registers. This new algorithm uses an explicit term that eliminates the need for a series of summations, which would otherwise require substantially more hardware.

The algorithms for performing the functions of this calculator are stored in a read-only memory circuit including seven serial-address in, serial-instruction out read-only memories regulated by a control and timing circuit. This control and timing circuit includes a microprogrammed controller, which receives status conditions from throughout the calculator and sequentially outputs signals to control the flow of data. The control and timing circuit also scans the keyboard to obtain a six-bit read-only memory address, which is generated at the keyboard each time a key is actuated as required to initiate one or more algorithms for performing the functions associated with the actuated key.

Information from the addressed read-only memory is transmitted serially to an arithmetic and register circuit where a serial, binary-coded decimal (BCD) adder/-subtractor performs the basic computations. The results of the computations are transmitted to registers in this circuit where they are either stored temporarily or outputted via a seven-segment, 15 -digit, LED display.

DESCRIPTION OF THE DRAWINGS

FIG. 31 is a flow diagram of the display wait loop employed in the calculator of FIGS. 1 and 2.

DESCRIPTION OF THE PREFERRED EMBODIMENT

SYSTEM ARCHITECTURE

Figure 1:
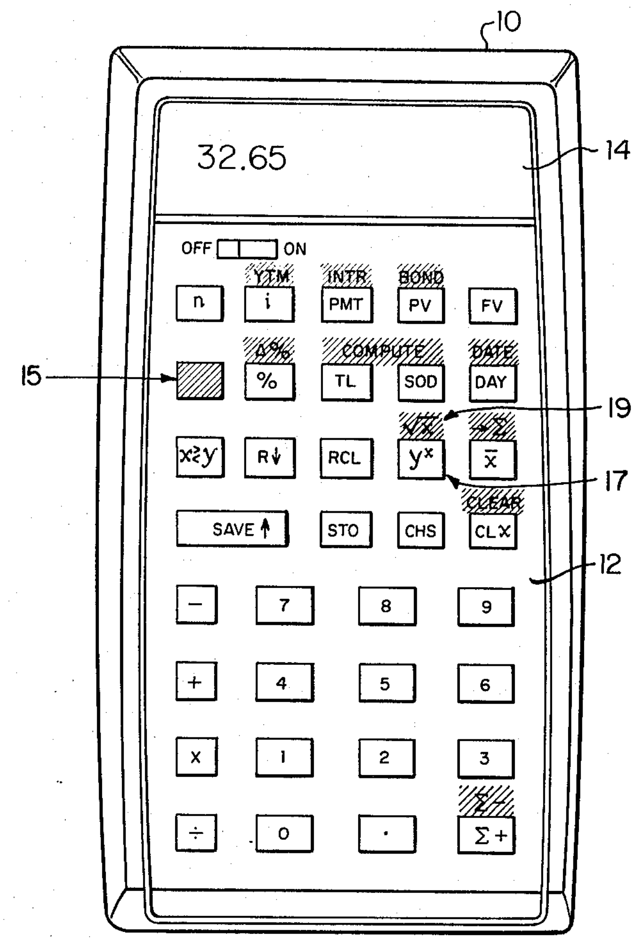
FIG. 1 is a top view of a business calculator according to the preferred embodiment of the invention.
Figure 2:
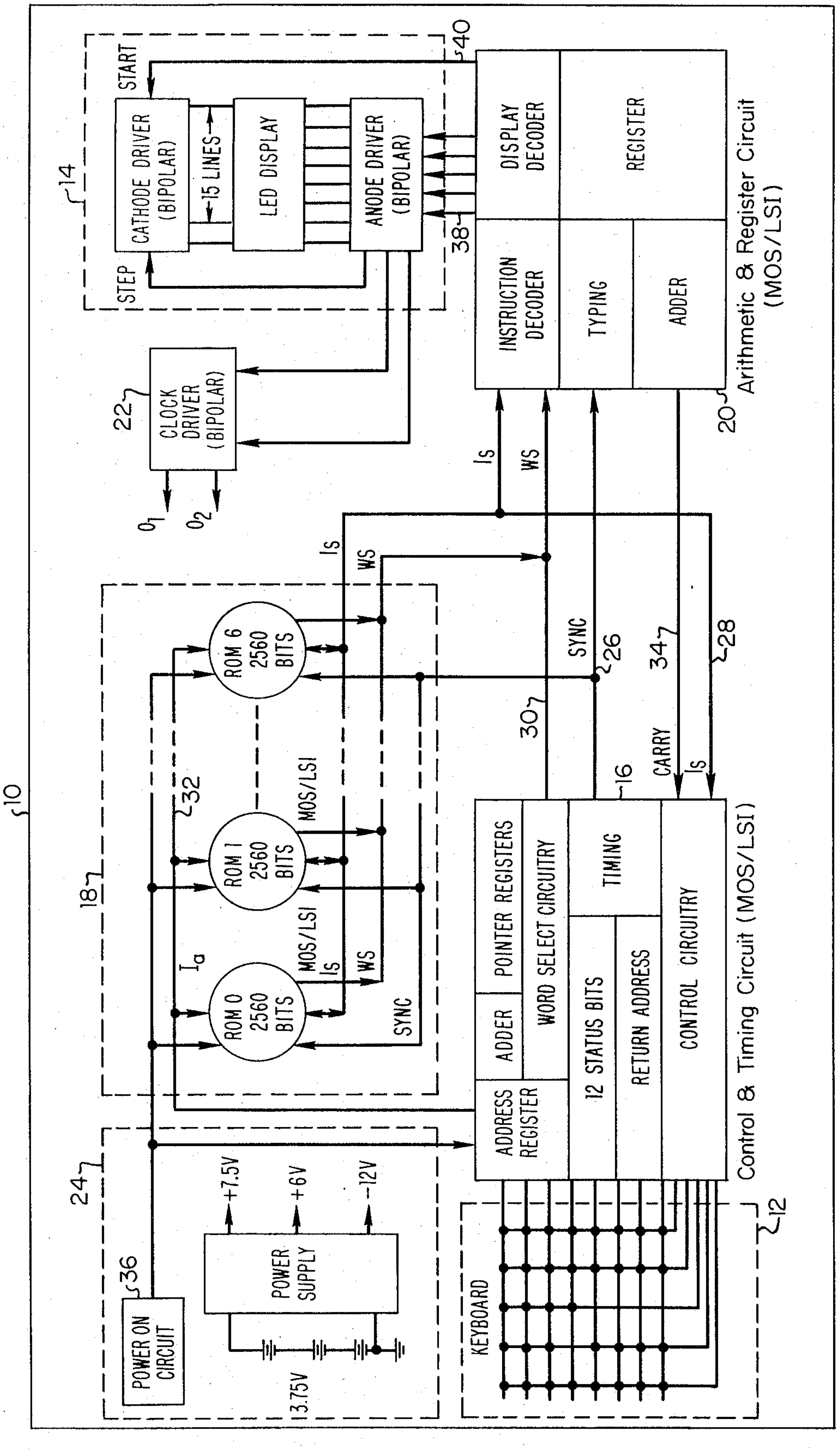
FIG. 2 is a block diagram of the calculator of FIG. 1.

Referring to FIGS. 1 and 2, there is shown a pocket-size electronic calculator 10 including a keyboard input unit 12 for entering data and instructions into the calculator and a seven-segment LED output display unit 14 for displaying each data entry and the results of calculations performed by the calculator. As shown in FIG. 2, calculator 10 also includes an MOS control and timing circuit 16, an MOS read-only memory circuit 18 (including ROM's 0–6), an MOS arithmetic and register circuit 20, a bipolar clock driver 22, and a solid state power supply unit 24.

The three MOS circuits are two-phase dynamic MOS/LSI circuits with low thresholds allowing compatibility with TTL bipolar circuits and allowing extremely low-power operation (less than 100 milliwatts for all three circuits). They are organized to process fourteen-digit BCD words in a digit-serial, bit-serial manner. The maximum bit rate or clock frequency is 200 kilohertz, which gives a word time of 280 microseconds (permitting a floating point addition to be completed in 60 milliseconds).

Figure 3:
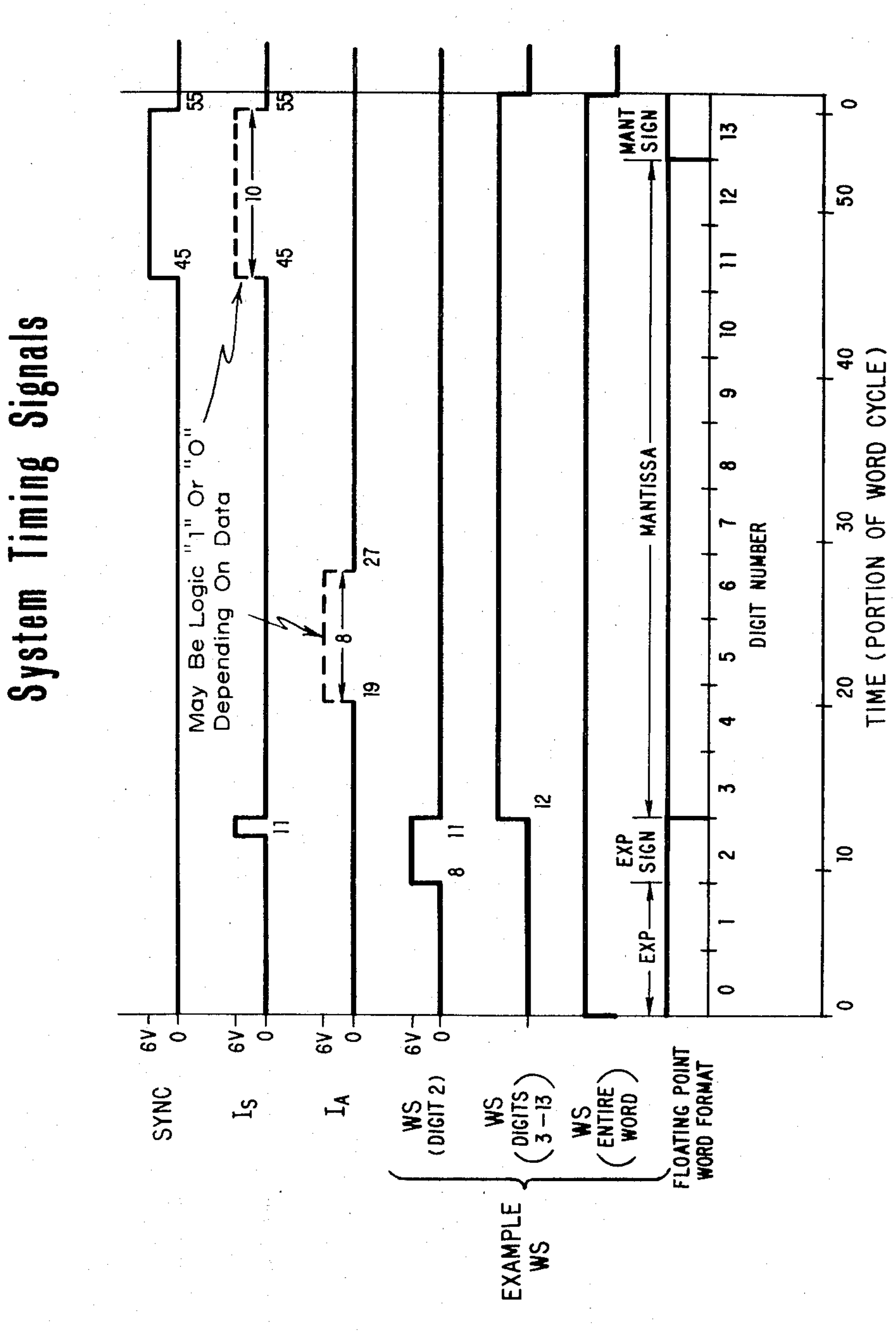
FIG. 3 is a waveform diagram illustrating the timing sequence of the interconnecting busses and lines of FIG. 2.

Control and timing circuit 16, read-only memory circuit 18, and arithmetic and register circuit 20 are tied together by a synchronization (SYNC) buss 26, an instruction ($I_s$) buss 28, a word select (WS) buss 30, an instruction address ($I_a$) line 32, and a carry line 34. All operations occur on a 56 bit ($b_0$–$b_{55}$) word cycle (14 four-bit BCD digits). The timing sequence for the interconnecting busses and lines 26–34 is shown in FIG. 3.

The SYNC buss 26 carries synchronization signals from control and timing circuit 16 to ROM's 0–6 in read-only memory circuit 18 and to arithmetic and register circuit 20 to synchronize the calculator system. It provides one output each word time. This output also functions as a ten-bit wide window ($b_{45}$–$b_{54}$) during which $I_s$ buss 28 is active.

The $I_s$ buss 28 carries ten-bit instructions from the active ROM in the read-only memory circuit 18 to the other ROM's, control and timing circuit 16, and arithmetic and register circuit 20, each of which decodes the instructions locally and responds to or acts upon them if they pertain thereto and ignores them if they do not. For instance, the ADD instruction affects arithmetic and register circuit 20 but is ignored by control and timing circuit 16. Similarly, the SET STATUS BIT 5 instruction sets status flip-flop 5 in control and timing circuit 16 but is ignored by arithmetic and register circuit 20.

The actual implementation of an instruction is delayed one word time from its receipt. For example, an instruction may require the addition of digit 2 in two of the registers in arithmetic and register circuit 20. The ADD instruction would be received by arithmetic and register circuit 20 during bit times $b_{45}$–$b_{54}$ of word time N and the addition would actually occur during bit times $b_8 - b_{11}$ of word time N + 1. Thus, while one instruction is being executed the next instruction is being fetched.

The WS buss 30 carries an enable signal from control and timing circuit 16 or one of the ROM's in read-only memory circuit 18 to arithmetic and register circuit 20 to enable the instruction being executed thereby. Thus, in the example of the previous paragraph, addition occurs only during digit 2 since the adder in the arithmetic and register circuit 20 is enabled by WS buss 30 only during this portion of the word. When WS buss 30 is low, the contents of the registers in arithmetic and register circuit 20 are recirculated unchanged. Three examples of WS timing signals are shown in FIG. 3. In the first example, digit 2 is selected out of the entire word. In the second example, the last eleven digits are selected. This corresponds to the mantissa portion of a floating point word format. In the third example, the entire word is selected. Use of the word select feature allows selective addition, transfer, shifting or comparison of portions of the registers within arithmetic and register circuit 20 with only one basic ADD, TRANSFER, SHIFT, or COMPARE instruction. Some customization in the ROM word select fields is available via masking options.

The $I_a$ line 32 serially carries the addresses of the instructions to be read from ROM's 0–6. These addresses originate from control and timing circuit 16, which contains an instruction address register that is incremented each word time unless a JUMP SUBROUTINE or a BRANCH instruction is being executed. Each address is transferred to ROM's 0–6 during bit times $b_{19}$–$b_{26}$ and is stored in an address register of each ROM. However, only one ROM is active at a time, and only the active ROM responds to an address by outputting an instruction on the $I_s$ line 28. Control is transferred between ROM's by a ROM SELECT instruction. This technique allows a single eight-bit address, plus eight special instructions, to address up to eight ROM's of 256 words each.

The carry line 34 transmits the status of the carry output of the adder in arithmetic and register circuit 20 to control and timing circuit 16. The control and timing circuit uses this information to make conditional branches, dependent upon the numerical value of the contents of the registers in arithmetic and register circuit 20.

Control and timing circuit 16 is organized to scan a five-by-eight matrix of switches in search of an interconnection that designates actuation of a key. Any type of metal-to-metal contact may be used as a key. Bounce problems are overcome by programmed lockouts in the key entry routine. Each key has an associated six-bit code.

A power on circuit 36 in power supply unit 24 supplies a signal forcing the calculator to start up in a known condition when power is supplied thereto. Power is supplied to the calculator when the on-off switch of keyboard input unit 12 (see FIG. 1) is moved to the on position.

The primary outputs of the calculator are five output lines 38 connected between a display decoder of arithmetic and register circuit 20 and an anode driver of output display unit 14. Data for a seven-segment display plus a decimal point is time-multiplexed onto these five output lines. A start line 40 connected between the display decoder of arithmetic and register circuit 20 and a cathode driver of output display unit 14 indicates when the digit 0 occurs.

CONTROL AND TIMING CIRCUIT

Figure 4:
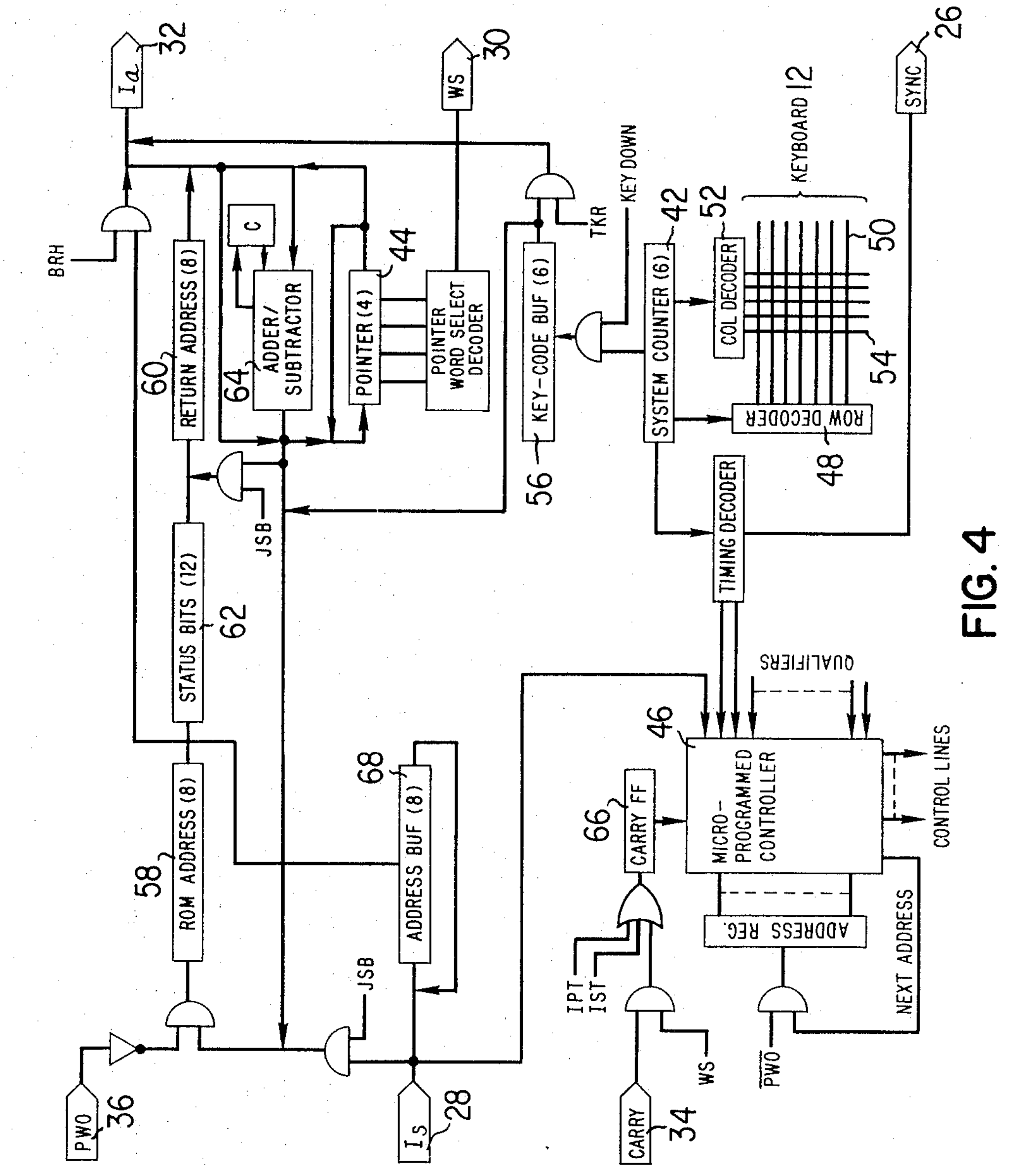
FIG. 4 is a block diagram of the control and timing circuit of FIG. 2.

Referring now to FIG. 4, control and timing circuit 16 contains the master system counter 42, scans the keyboard 12, retains status information about the system or the condition of an algorithm, and generates the next ROM address. It also originates the subclass of Word Select signals which involve the pointer 44, a four-bit counter that points to one of the register digit positions.

The control unit of control and timing circuit 16 is a microprogrammed controller 46 comprising a 58 word (25 bits per word) control ROM, which receives qualifier or status conditions from throughout the calculator and sequentially outputs signals to control the flow of data. Each bit in this control ROM either corresponds to a single control line or is part of a group of N bits encoded into $2^N$ mutually exclusive control lines and decoded external to the control ROM. At each phase 2 clock, a word is read from the control ROM as determined by its present address. Part of the output is fed back to become the next address.

Several types of qualifiers are checked. Since most commands are issued only at certain bit times during the word cycle, timing qualifiers are necessary. This means the control ROM may sit in a wait loop until the appropriate timing qualifier comes true, then move to the next address to issue a command. Other qualifiers are the state of the pointer register, the PWO (power on) line, the CARRY flip flop, and the state of each of the 12 status bits.

Since the calculator is a serial system based on a 56 bit word, a six-bit system counter 42 is employed for counting to 56. Several decoders from system counter 42 are necessary. The SYNC signal is generated during bit times $b_{45}$–$b_{54}$ and transmitted to all circuits in the system (see FIG. 3). Other timing qualifiers are sent to the microprogrammed control ROM 46 as mentioned in the previous paragraph.

Figure 5:
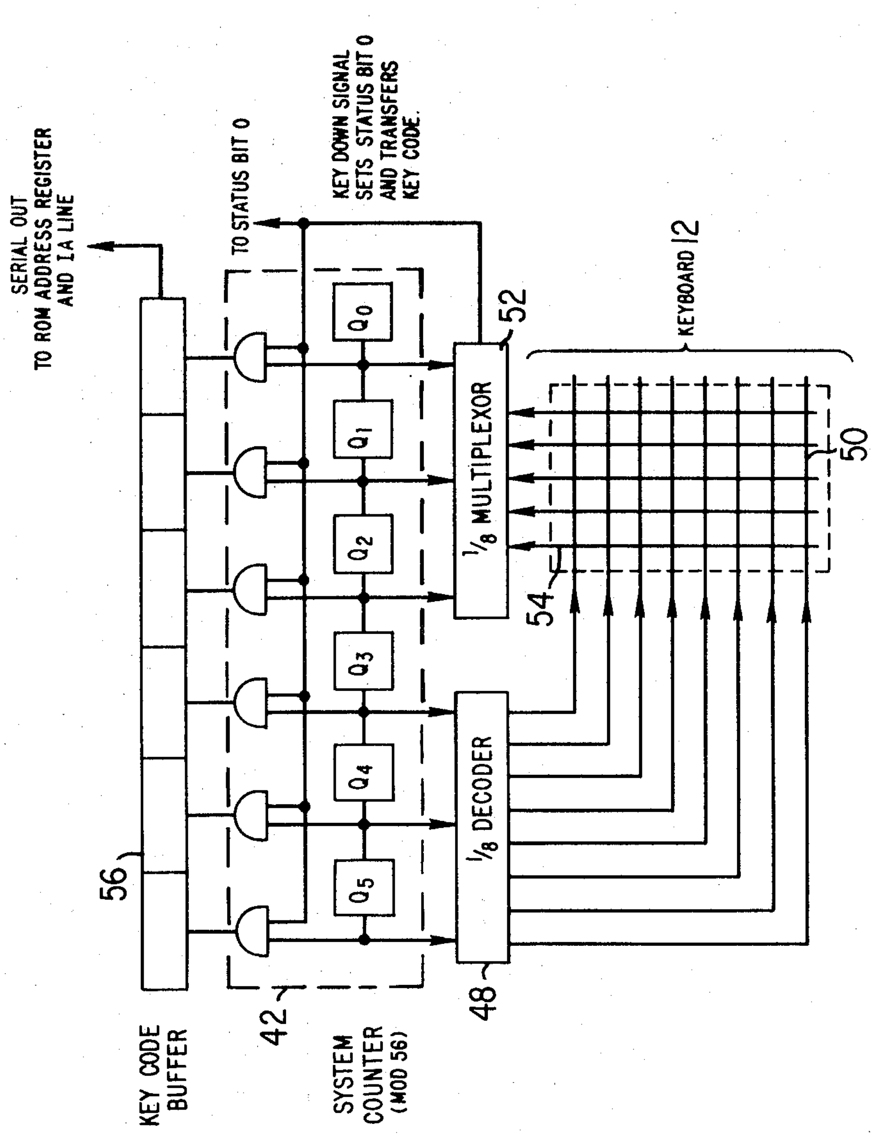
FIG. 5 is a more detailed block diagram of the keyboard scanning circuitry of FIG. 4.

System counter 42 is also employed as a keyboard scanner as shown in FIG. 5. The most significant three bits of system counter 42 go to a one-of-eight decoder 48, which sequentially selects one of the keyboard row lines 50. The least significant three bits of the system counter count modulo seven and go to a one-of-eight multiplexor 52, which sequentially selects one of the keyboard column lines 54 (during sixteen clock times no key is scanned). The multiplexor output is called the key down signal. If a contact is made at any intersection point in the five-by-eight matrix (by depressing a key), the key down signal will become high for one state of system counter 42 (i.e., when the appropriate row and column lines are selected). The key down signal will cause that state of the system counter to be saved in key code buffer 56. This six-bit code is then transferred to the ROM address register 58 and becomes a starting address for the program which services the key that was down (two leading 0 bits are added by hardware so an eight-bit address exists). Thus, during each state of system counter 42, the decoder-multiplexor combination 48 and 52 is looking to see if a specific key is down. If it is, the state of the system counter becomes a starting address for execution of that key function (note that 16 of the 56 states are not used for key codes). By sharing the function of the system counter and using a keyboard scanning technique directly interfaced to the MOS circuitry, circuit complexity is reduced significantly.

A 28 bit shift register which circulates twice each 56 bit word time, is employed in control and timing circuit 16. These 28 bits are divided into three functional groups: the main ROM address register 58 (eight bits), the subroutine return address register 60 (eight bits), and the status register 62 (twelve bits).

The main ROM's 0–6 each contain 256 (ten bit) words, thereby requiring an eight-bit address. This address circulates through a serial adder/subtractor 64 and is incremented during bit times $b_{47}$–$b_{54}$ (except in the case of branch and jump-subroutine instructions for which the eight bit address field of the ten-bit instruction is substituted for the current address). The next address is transmitted over the $I_a$ line 32 to each of the main ROM's 0–6 during bit times $b_{19}$–$b_{26}$.

The Status register 62 contains twelve bits or flags which are used to keep track of the state of the calculator. Such information as whether the decimal point has been hit, the minus sign set, etc. must be retained in the status bits. In each case the calculator remembers past events by setting an appropriate status bit and asking later if it is set. A yes answer to a status interrogation will set the carry flip-flop 66 as indicated by control signal IST in FIG. 4. Any status bit can be set, reset, or interrogated while circulating through the adder 64 in response to the appropriate instruction.

The instruction set allows one level of subroutine call. The return address is stored in the eight-bit return address register 60. Execution of a JUMP subroutine stores the incremented present address into return address register 60. Execution of the RETURN instruction retrieves this address for transmission over $I_a$ line 32. Gating is employed to interrupt the 28 bits circulating in the shift register 58–62 for insertion of addresses at the proper time as indicated by the JSB control signal in FIG. 4.

An important feature of the calculator system is the capability to select and operate upon a single digit or a group of digits (such as the exponent field) from the fourteen digit registers. This feature is implemented through the use of a four-bit pointer 44 which points at the digit of interest. Instructions are available to set, increment, decrement, and interrogate pointer 44. The pointer is incremented or decremented by the same serial adder/subtractor 64 used for addresses. A yes answer to the instruction "is pointer N" will set the carry flip-flop 66 via control signal IPT in FIG. 4.

The word select feature was discussed above in connection with FIGS. 2 and 3. Some of the word select signals are generated in control and timing circuit 16, namely those dependent on pointer 44, and the remainder in the main ROM's 0–6. The pointer word select options are (1) pointer position only and (2) pointer position and all less significant digits. For instance, assume the mantissa signs of the numbers in the A and C registers of arithmetic and register circuit 20 were to be exchanged. The pointer would be set to position 13 (last position) and the A EXCHANGE C instruction with a "pointer position" word select field would be given. If all of the word except the mantissa signs were to be exchanged, the A EXCHANGE C instruction would be given with the pointer set at 12 and the word select field set to pointer and less significant digits. The control and timing circuit word-select output 30 is or-tied with the ROM word-select output 30 and transmitted to arithmetic and register circuit 20.

Any carry signal out of the adder in arithmetic and register circuit 20, with word select also high, will set carry flip-flop 66. This flip-flop is interrogated during the BRANCH instruction to determine if the existing address should be incremented (yes carry) or replaced by the branch address (no carry). The branch address is retained in an eight-bit address buffer 68 and gated to $I_a$ line 32 by the BRH control signal.

The power-on signal is used to synchronize and preset the starting conditions of the calculator. It has two functions, one of which is to get the address of control ROM 46 set to a proper starting state and the other of which is to get the system counter 42 in control and timing circuit 16 synchronized with the counter in each main ROM 0–6. As the system power comes on, the PWO signal is held at logic 1 (0 volts in this system) for at least 20 milliseconds. This allows system counter 42 to make at least one pass through bit times $b_{45}$–$b_{54}$ when SYNC is high thereby setting main ROM 0 active and the rest of the ROM's inactive. When PWO goes to logic 0 (+6 volts), the address of control ROM 46 is set to 000000 where proper operation can begin.

READ-ONLY MEMORY CIRCUIT

Figure 6:
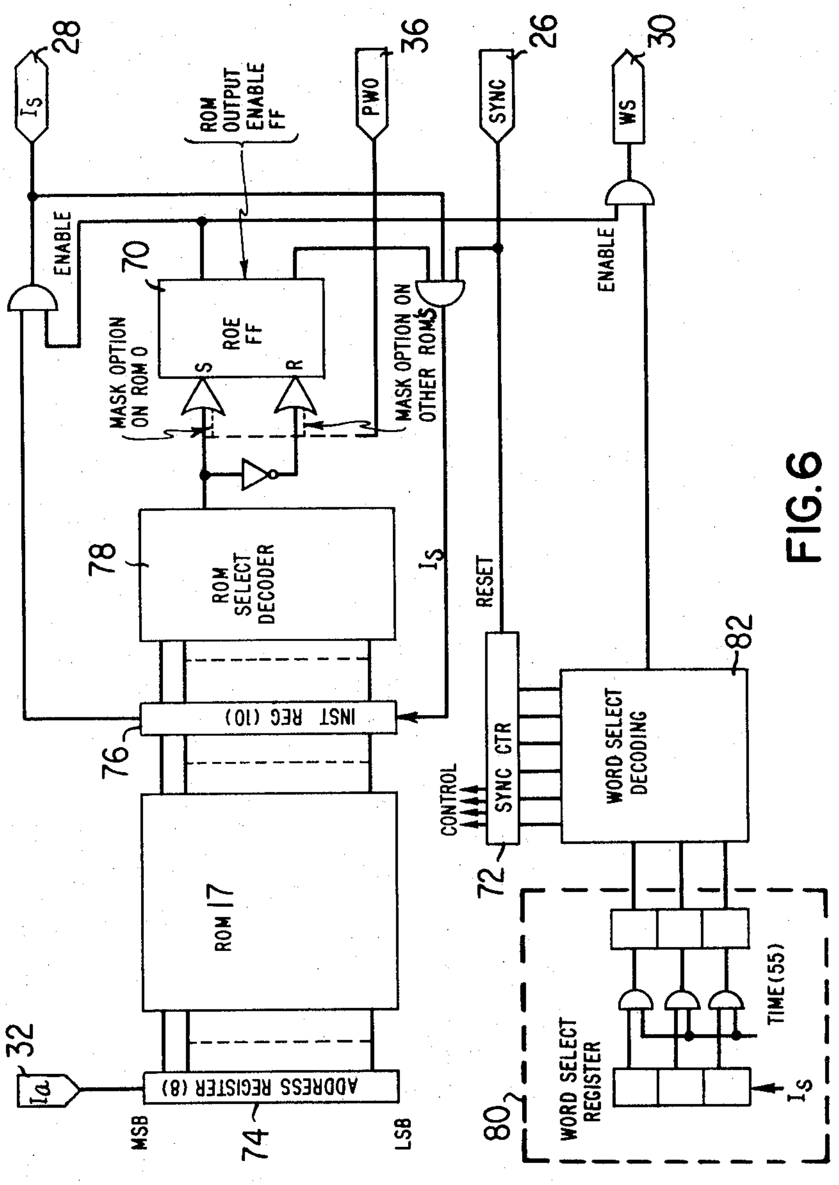
FIG. 6 is a block diagram of one of ROM's 0–6 of FIG. 2.

The ROM's 0–6 in read-only memory circuit 18 store the programs for executing the functions required of the system. Since each ROM contains 256 ten-bit words, there are 1,536 words or 15,360 bits of ROM. A block diagram of each of the ROM's 0–6 is shown in FIG. 6.

The basic operation of each ROM is a serial-address in, a serial-instruction out. During every 56 bit word time the address comes in, least significant bit first from bit $b_{19}$ through bit $b_{26}$. Every ROM 0–6 in the system receives this same eight-bit address and from bit time $b_{45}$ through $b_{54}$ tries to output onto $I_s$ line 28. However, a ROM enable (ROE) flip-flop 70 in each ROM insures that no more than one ROM actually sends an instruction on $I_s$ line 28 at the same time.

Figure 8:
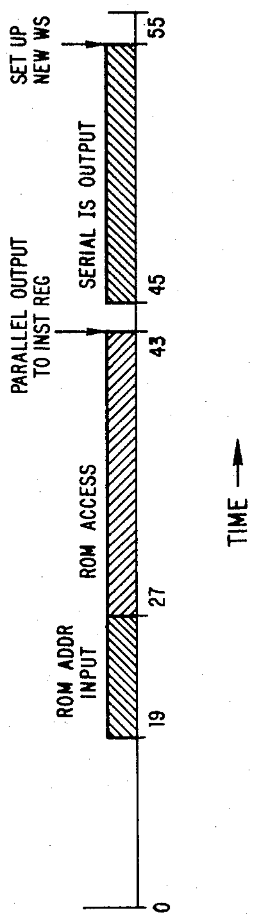
FIG. 8 is a timing diagram illustrating the important timing points for a typical addressing sequence.

All output signals are inverted so that the steady-state power dissipation is reduced. The calculator circuits are P-channel MOS. Thus, the active signals that turn on a gate are the more negative. This is referred to as negative logic, since the more negative logic level is the logic 1. As mentioned above, logic 0 is +6 volts and logic 1 is 0 volts. The signals on $I_a$ and $I_s$ are normally at logic 0. However, when the output buffer circuits are left at logic 0 they consume more power. A decision was therefore made to invert the signals on the $I_a$ and $I_s$ outputs and re-invert the signals at all inputs. Thus, signals appear at the $I_a$ and $I_s$ outputs as positive logic. The oscilloscope pattern that would be seen for instruction 1101 110 011 from state 11 010 101 is shown in FIG. 8.

The serial nature of the calculator circuits requires careful synchronization. This synchronization is provided by the SYNC pulse, generated in control and timing circuit 16 and lasting for bit times $b_{45}$–$b_{54}$. Each ROM has its own 56 state counter 72, synchronized to the system counter 42 in control and timing circuit 16. Decoded signals from this state counter 72 open the input to the address register 74 at bit time $b_{19}$, clock $I_s$ out at bit time $b_{45}$ and provide other timing control signals.

As the system power comes on, the PWO signal is held at 0 volts (logic 1) for at least 20 milliseconds. The PWO signal is wired (via a masking option) to set ROM Output Enable (ROE) flip-flop 70 on main ROM 0 and reset it on all other ROM's. Thus when operation begins, ROM 0 will be the only active ROM. In addition, control and timing circuit 16 inhibits the address output during start-up so that the first ROM address will be zero. The first instruction must be a JUMP SUBROUTINE to get the address register 58 in control and timing circuit 16 loaded properly.

Figure 7:
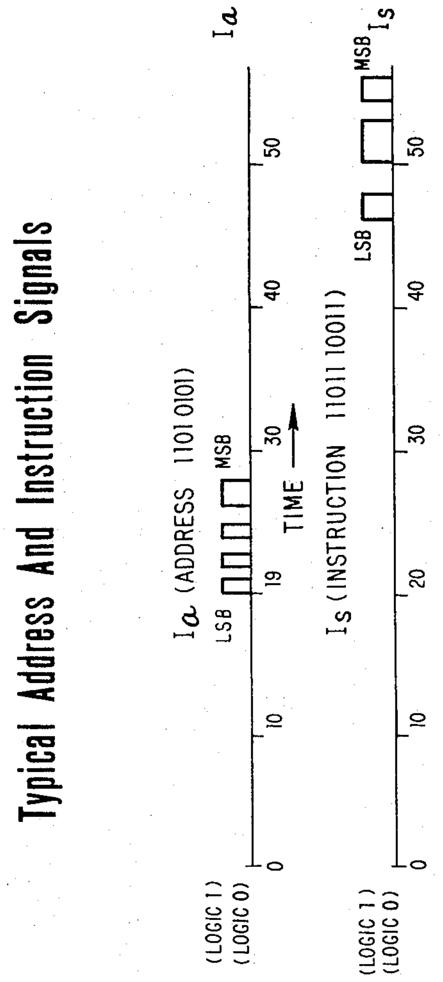
FIG. 7 is a waveform diagram illustrating a typical address signal and a typical instruction signal.

FIG. 7 shows the important timing points for a typical addressing sequence. During bit times $b_{19}$–$b_{26}$ the address is received serially from control and timing circuit 16 and loaded into address register 74 via $I_a$ line 32. This address is decoded and at bit time $b_{44}$ the selected instruction is gated in parallel into the $I_s$ register 76. During bit times $b_{45}$–$b_{54}$ the instruction is read serially onto $I_s$ buss 28 from the active ROM (i.e., the ROM with the ROM enable flip-flop set).

Control is transferred between ROM's by a ROM SELECT instruction. Effectively this instruction will turn off ROE flip-flop 70 on the active ROM and turn on ROE flip-flop 70 on the selected ROM. Implementation is dependent upon the ROE flip-flop being a master-slave flip-flop. In the active ROM, the ROM SELECT instruction is decoded by a ROM select decoder 78 at bit time 44, and the master portion of ROE flip-flop 70 is set. The slave portion of ROE flip-flop 70 is not set until the end of the bit time ($b_{55}$). In the inactive ROM's the instruction is read serially into the $I_s$ register 76 during bit times $b_{45}$–$b_{54}$ and then decoded, and the ROE flipflop 70 is set at bit time $b_{55}$ in the selected ROM. A masking option on the decoding from the least significant three bits of the $I_s$ register 76 allows each ROM to respond only to its own code.

The six secondary word-select signals are generated in the main ROM's 0–6. Only the two word-select signals dependent upon the POINTER come from control and timing circuit 16. The word select of the instruction is retained in the word select register 80 (also a master-slave). If the first two bits are 01, the instruction is of the arithmetic type for which the ROM must generate a word select gating signal. At bit time $b_{55}$ the next three bits are gated to the slave and retained for the next word time to be decoded into one of six signals. The synchronization counter 72 provides timing information to the word select decoder 82. The output WS signal is gated by ROE flip-flop 70 so only the active ROM can output on WS line 30, which is OR-tied with all other ROM's and also control and timing circuit 16. As discussed above, the WS signal goes to arithmetic and register circuit 20 to control the portion of a word time an instruction is active.

Figure 9:
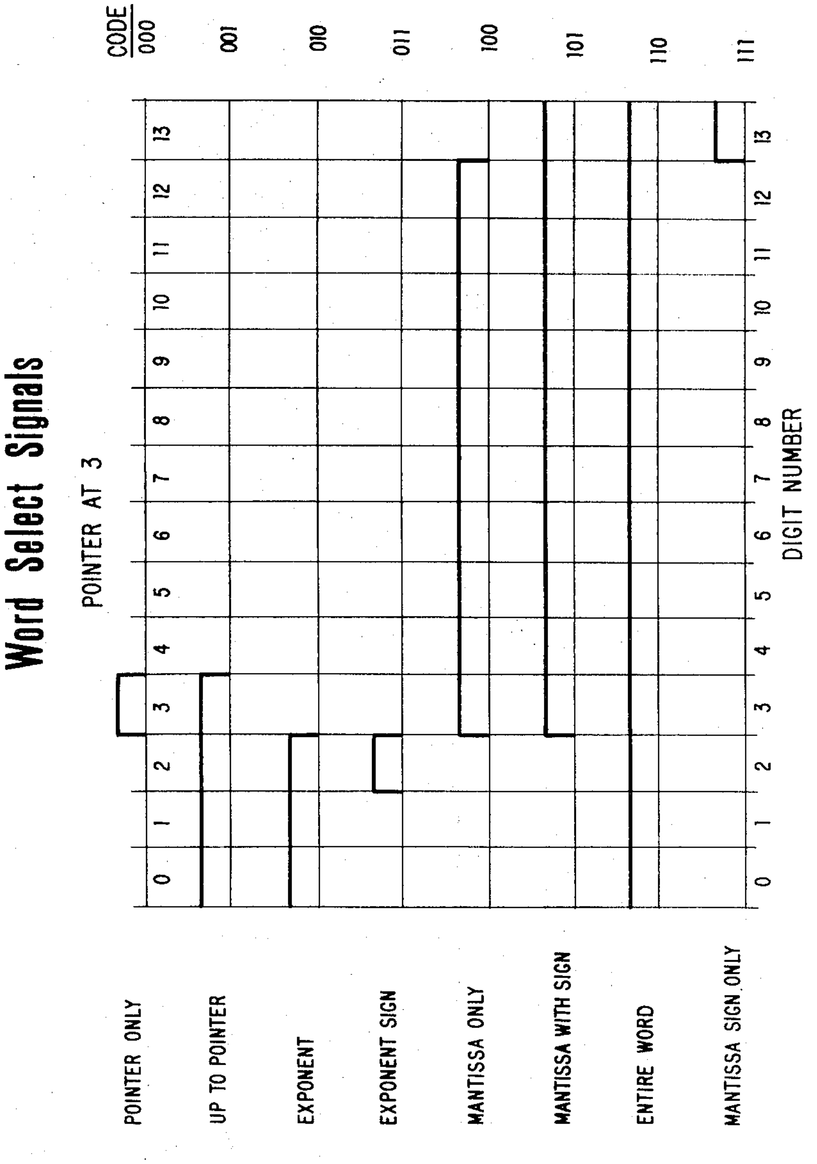
FIG. 9 is a waveform diagram illustrating the word select signals generated in the control and timing circuit of FIGS. 2 and 4 and in ROM's 0–6 of FIGS. 2 and 6.

The six ROM generated word select signals used in the calculator are shown in FIG. 9. ROM's 0–6 output a one bit-time pulse on $I_s$ buss 28 at bit time $b_{11}$ to denote the exponent minus sign time. This pulse is used in the display decoder of arithmetic and register circuit 20 to convert a 9 into a displayed minus sign. The time location of this pulse is a mask option on the ROM.

ARITHMETIC AND REGISTER CIRCUIT

Figure 10:
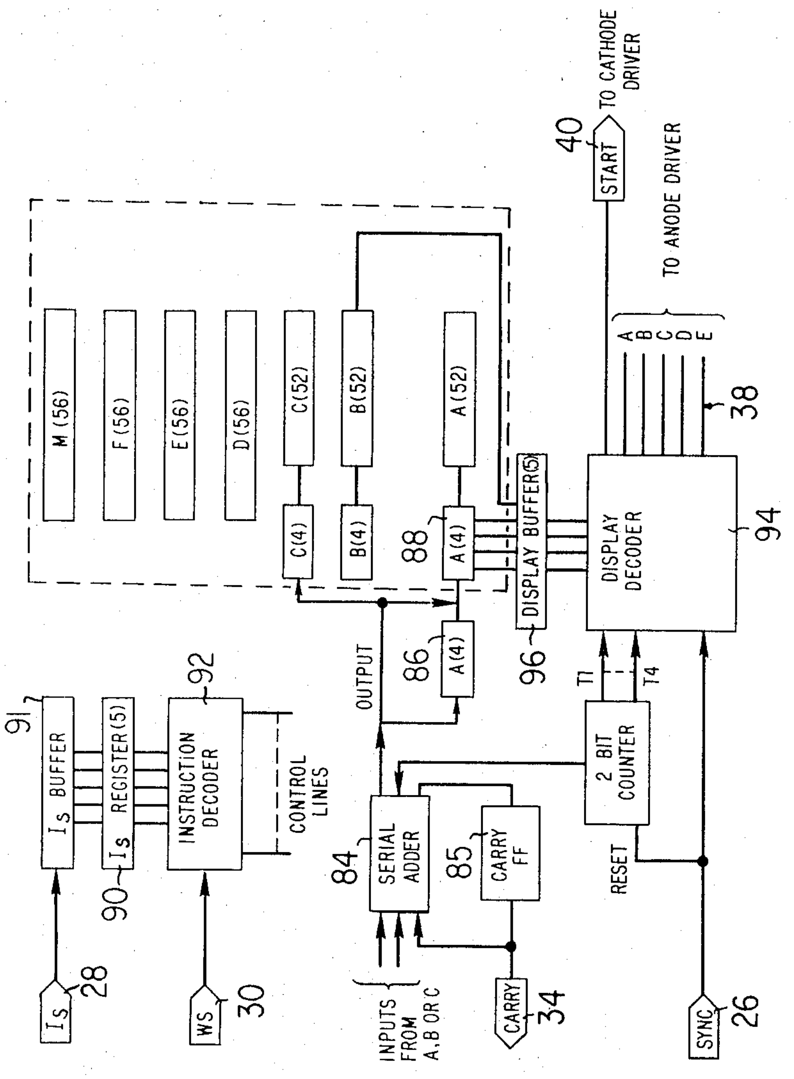
FIG. 10 is a block diagram of the arithmetic and register circuit of FIG. 2.

Arithmetic and register circuit 20 shown in FIG. 10 provides the arithmetic and data storage function for the calculator. It is controlled by the WS, $I_s$, and SYNC lines 30, 28, and 26, respectively; receives instructions from ROM's 0–6 over the $I_s$ line 28; sends information back to control and timing circuit 16 via the CARRY line 34; partially decodes the dispaly information before transmitting it via output lines 38 to the anode driver of output display unit 14; and provides a START pulse to the cathode driver of output display unit 14 to synchronize the display.

Arithmetic and register circuit 16 contains seven, fourteen-digit (56 bit) dynamic registers A–F and M and a serial BCD adder/subtractor 84. Actual data paths, not shown in FIG. 10 due to their complexity, are discussed below and shown in FIG. 11. The power and flexibility of an instruction set is determined to a great extent by the variety of data paths available. One of the advantages of a serial structure is that additional data paths are not very costly (only one additional gate per path). The structure of arithmetic and register circuit 20 is optimized for the type of algorithms required by the calculator.

Figure 11:
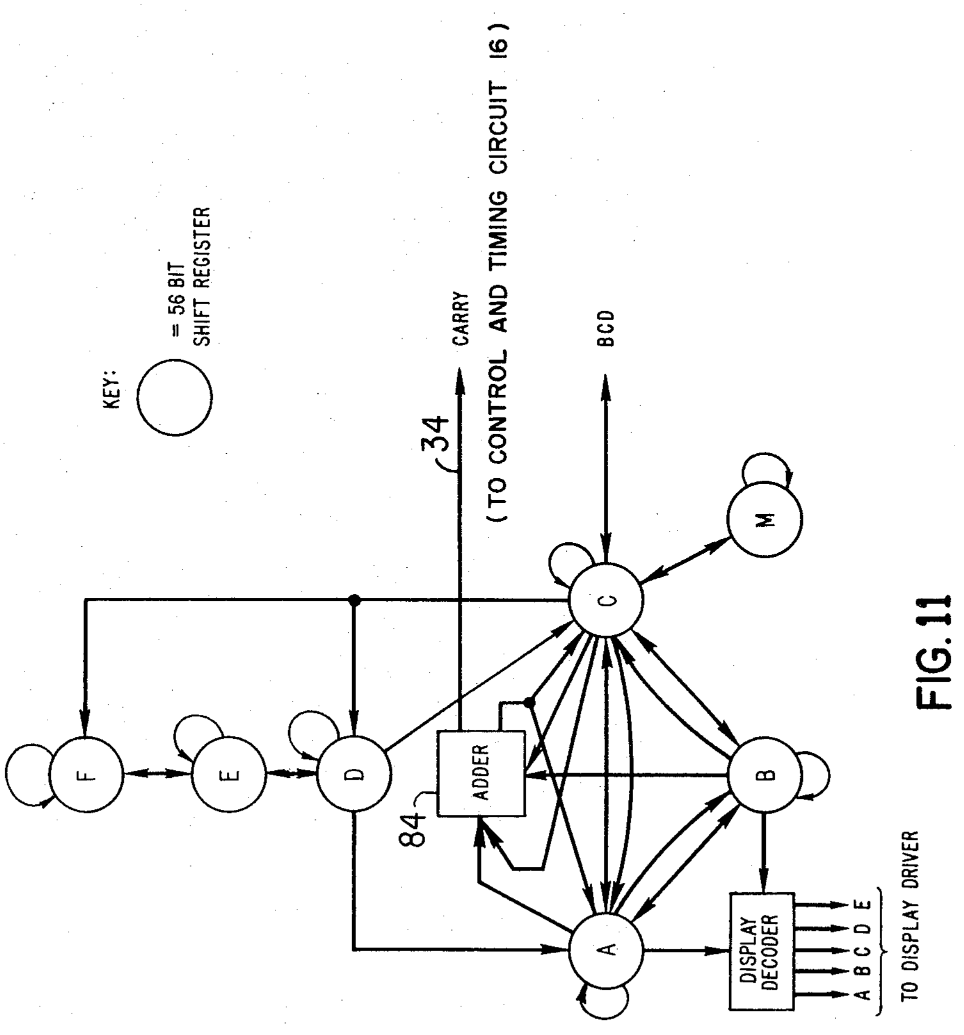
FIG. 11 is a path diagram of the actual data paths for the registers A–F and M of FIG. 10.

The seven registers A–F and M can be divided into three groups: the working registers A, B, and C with C also being the bottom register of a four-register stack; the next three registers D, E, and F in the stack; and a separate storage register M communicating with the other registers through register C only. In FIG. 11, which shows the data paths connecting all the registers A–F and M, each circle represents the fifty-six bit register designed by the letter in the circle. In the idle state (when no instruction is being executed in arithmetic and register circuit 20) each register continually circulates since with dynamic MOS registers information is represented by a charge on a parasitic capacitance and must be continually refreshed or lost. This is represented by the loop re-entering each register.

Registers A, B, and C can all be interchanged. Either register A or C is connected to one adder input, and either register B or C to the other. The adder output can be directed to either register A or C. Certain instructions can generate a carry via carry flip-flop 85 which is transmitted to control and timing circuit 16 to determine conditional branching. Register C always holds a normalized version of the displayed data.

In the stack formed by registers C, D, E, and F a ROLL DOWN instruction is executed by the following transfers: F → E → D → C → F. A STACK UP instruction is executed by the following transfers: CC → D → E → F. Thus, it is possible to transfer a register and also let it recirculate so that in the last example the contents of C are not lost. The structure and operation of a stack such as this are further described in copending U.S. Pat. application Ser. No. 257,606 entitled IMPROVED PORTABLE ELECTRONIC CALCULATOR, filed on May 30, 1972, by David S. Cochran et al, and issued as U.S. Pat. No. 3,781,820 on Dec. 25, 1973.

In serial decimal adder/substractor 84 a correction (addition of 6) to a BCD sum must be made if the sum exceeds nine (a similar correction for subtraction is necessary). It is not known if a correction is needed until the first three bits of the sum have been generated. This is accomplished by adding a four-bit holding register 86 ($A_{60}$–$A_{57}$) and inserting the corrected sum into a portion 88 ($A_{56}$–$A_{53}$) of register A if a carry is generated. This holding register 86 is also required for the SHIFT A LEFT instruction. One of the characteristics of a decimal adder is that non-BCD codes (i.e. 1101) are not allowed. They will be modified if circulated through the adder. The adder logic is minimized to save circuit area. If four bit codes other than 0000–1001 are processed, they will be modified. This is no constraint for applications involving only numeric data (however, if ASC11 codes, for instance, are operated upon, incorrect results will be obtained).

Arithmetic and register circuit 20 receives the instruction during bit times $b_{45}$–$b_{54}$. Of the ten types of instructions hereinafter described, arithmetic and register circuit 20 must respond to only two types (namely, ARITHMETIC & REGISTER instructions and DATA ENTRY/DISPLAY instructions). ARITHMETIC & REGISTER instructions are coded by a 10 in the least significant two bits of $I_s$ register 90. When this combination is detected, the most significant five bits are saved in $I_s$ register 90 and decoded by instruction decoder 92 into one of 32 instructions.

The ARITHMETIC & REGISTER instructions are active or operative only when the Word Select signal (WS) generated in one of the ROM's 0–6 or in control and timing circuit 16 is at logic one. For instance, suppose the instruction "A+C → C, mantissa with sign only" is called. Arithmetic and register circuit 20 decodes only A+C → C. It sets up registers A and C at the inputs to adder 84 and, when WS is high, directs the adder output to register C. Actual addition takes place only during bit times $b_{12}$ to $b_{55}$ (digits 3–13) since for the first three digit times the exponent and exponent sign are circulating and are directed unchanged back to their original registers. Thus, the word select signal is an "instruction enable" in arithmetic and register circuit 20 (when it is at logic 1, instruction execution takes place, and when it is at logic 0, recirculation of all registers continues).

The DATA ENTRY/DISPLAY instructions, except for digit entry, affect an entire register (the word select signal generated in the active ROM is at logic 1 for the entire word cycle). Some of these instructions are: up stack, down stack, memory exchange M↔C, and display on or toggle. A detailed description of their execution is given hereinafter.

Figure 12:
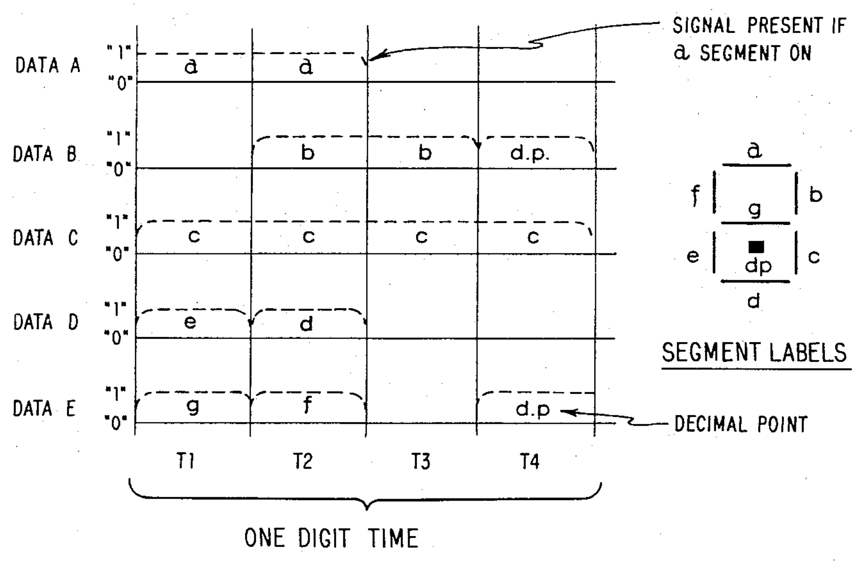
FIG. 12 is a waveform diagram illustrating the output signals for the display decoder outputs A–E of FIGS. 2, 10, and 11.
Figure 13:
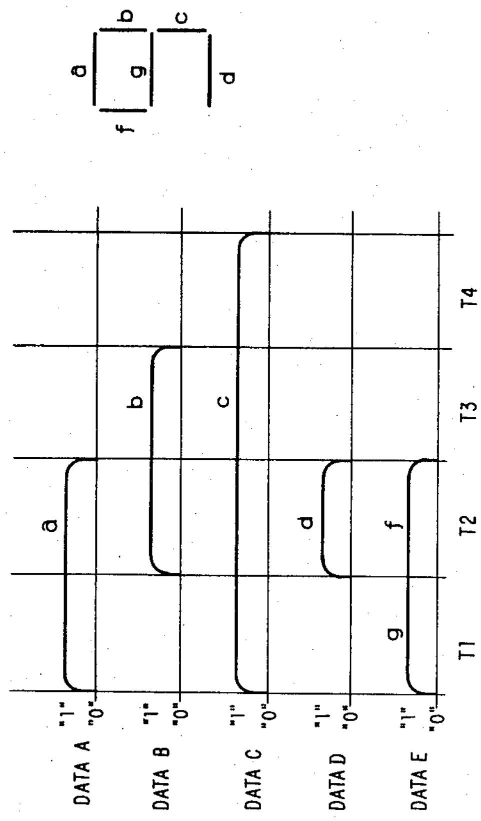
FIG. 13 is a waveform diagram illustrating the actual signals on the display decoder outputs A–E of FIGS. 2, 10, and 11 when the digit 9 is decoded.

For increased power savings display decoder 94 is partitioned to partially decode the BCD data into seven segments and a decimal point in arithmetic and register circuit 20 by using only five output lines (A–E) 38 with time as the other parameter. Information for seven segments (*a–g*) and a decimal point (*dp*) are time shared on the five output lines A–E. The output wave forms for output lines A–E are shown in FIG. 12. For example, output line D carries the segment e information during $T_1$ (the first bit time of each digit time) and the segment D information during $T_2$ (the second bit time of each digit time); and output E carries the segment G information during $T_1$, the segment F information during $T_2$, and the decimal point (*dp*) during $T_4$. The actual signals which would appear if a digit 9 were decoded are shown in FIG. 13. The decoding is completed in the anode driver of output display unit 14 as explained hereinafter.

The registers in arithmetic and register circuit 20 hold 14 digits comprising ten mantissa digits, the mantissa sign, two exponent digits, and the exponent sign. Although the decimal point is not allocated a register position, it is given a full digit position in the output display. This apparent inconsistency is achieved by using both the A and B registers to hold display information. The A register is set up to hold the displayed number with the digits in the proper order. The B register is used as a masking register with digits 9 inserted for each display position that is to be blanked and a digit 2 at the decimal point location. When the anode driver of output display unit 14 detects a decimal point code during $T_4$, it provides a signal to the cathode driver of the output display unit to move to the next digit position. One digit and the decimal point share one of the 14 digit times. The digit 9 mask in register B allows both trailing and leading zeros to be blanked (i.e., by programming 9's into the B register). Use of all three working registers for display (i.e., the C register to retain the number in normalized form, the A register to hold the number in the displayed form, and the B register as a mask) allows the calculator to have both a floating point and a scientific display format at the expense of only a few more ROM states.

The display blanking is handled as follows. At time $T_4$ the BCD digit is gated from register A into display buffer 96. If this digit is to be blanked, register B will contain a 9 (1001) so that at $T_4$ the end bit ($B_{01}$) of the B register will be a one (an eight would therefore also work). The input to display buffer 96 is OR-ED with $B_{01}$ and will be set to 1111 if the digit is to be blanked. The decimal point is handled in a similar way. A 2 (0010) is placed in register B at the decimal point location. At time $T_2$ the decimal point buffer flip-flop is set by $B_{01}$. Any digit with a one in the second position will set the decimal point (i.e., 2, 3, 6, or 7).

Figure 14:
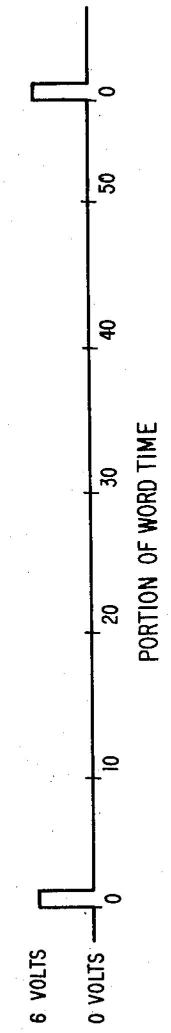
FIG. 14 is a waveform diagram illustrating the timing of the START signal generated by the display decoder of FIG. 10.

Display decoder 94 also applies a START signal to line 40. This signal is a word synchronization pulse, which resets the digit scanner in the cathode driver of output display unit 14 to assure that the cathode driver will select digit 1 when the digit 1 information is on outputs A, B, C, D, and E. The timing for this signal is shown in FIG. 14.

One other special decoding feature is required. A minus sign is represented in tens complement notation or sign and magnitude notation by the digit 9 in the sign location. However, the display must show only a minus sign (i.e., segment *g*). The digit 9 in register A in digit position 2 (exponent sign) or position 13 (mantissa sign) must be displayed as minus. The decoding circuitry uses the pulse on $I_s$ buss 28 at bit time $b_{11}$ (see FIG. 3) to know that the digit 9 in digit position 2 of register A should be a minus and uses the SYNC pulse to know that the digit 9 in digit position 13 of register A should also be a minus. The pulse on $I_s$ buss 28 at bit time $b_{11}$ can be set by a mask option, which allows the minus sign of the exponent to appear in other locations for other uses of the calculator circuits.

CLOCK DRIVER

Figure 15:
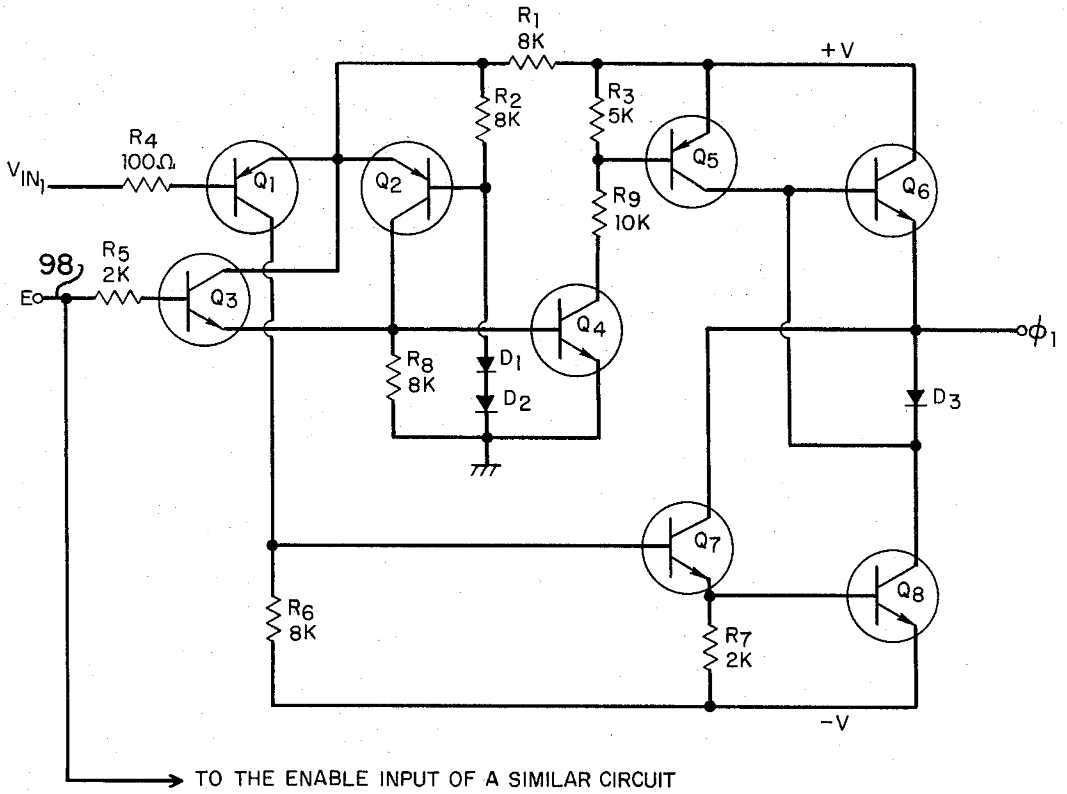
FIG. 15 is a schematic diagram of the clock driver of FIG. 2.
Figure 16:
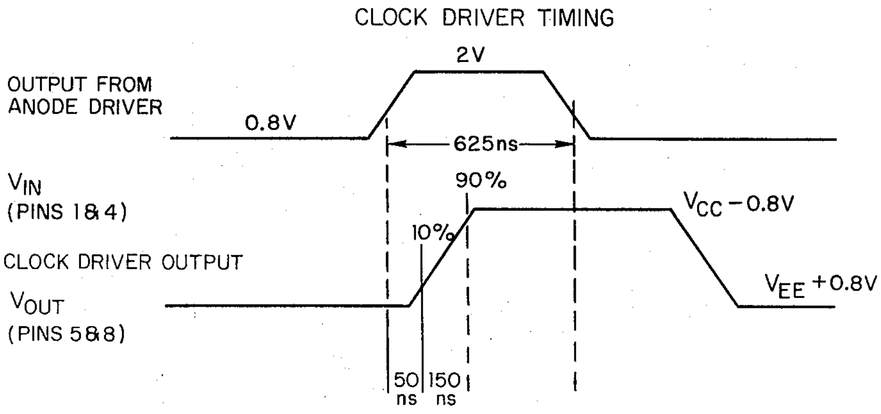
FIG. 16 is a waveform diagram illustrating the timing relationship between the input and output signals of the clock driver of FIG. 15.

The bipolar clock driver 22, one phase of which is shown in FIG. 15, requires less than 25 milliwatts and can drive loads up to 300 picoforads with a voltage swing of +7 to −14 volts. An ENABLE input 98 allows both outputs $Q_1$ and $Q_2$ to be held to $V_{CC}$, the MOS Logic 0 state. This is an effective means of strobing the clock. During dc operation, the transistor pair $Q_1$–$Q_2$ allows only one of the output transistor pairs $Q_5$–$Q_6$ or $Q_7$–$Q_8$ to conduct. Diode $D_3$ prohibits conduction from transistor $Q_6$ to transistor $Q_8$ during transient operation. Thus, the only possible transient short circuit current must flow from transistor $Q_5$ to transistor $Q_7$. However, the limited current handling capability of $Q_5$ (a lateral PNP) limits this current to less than 5 milliamps peak. The input signals for clock driver 22 are generated on the anode driver of output display unit 14, and the outputs of the clock driver go to each of the MOS circuits in the system. The timing relationships are shown in FIG. 16.

ANODE DRIVER

Figure 17:
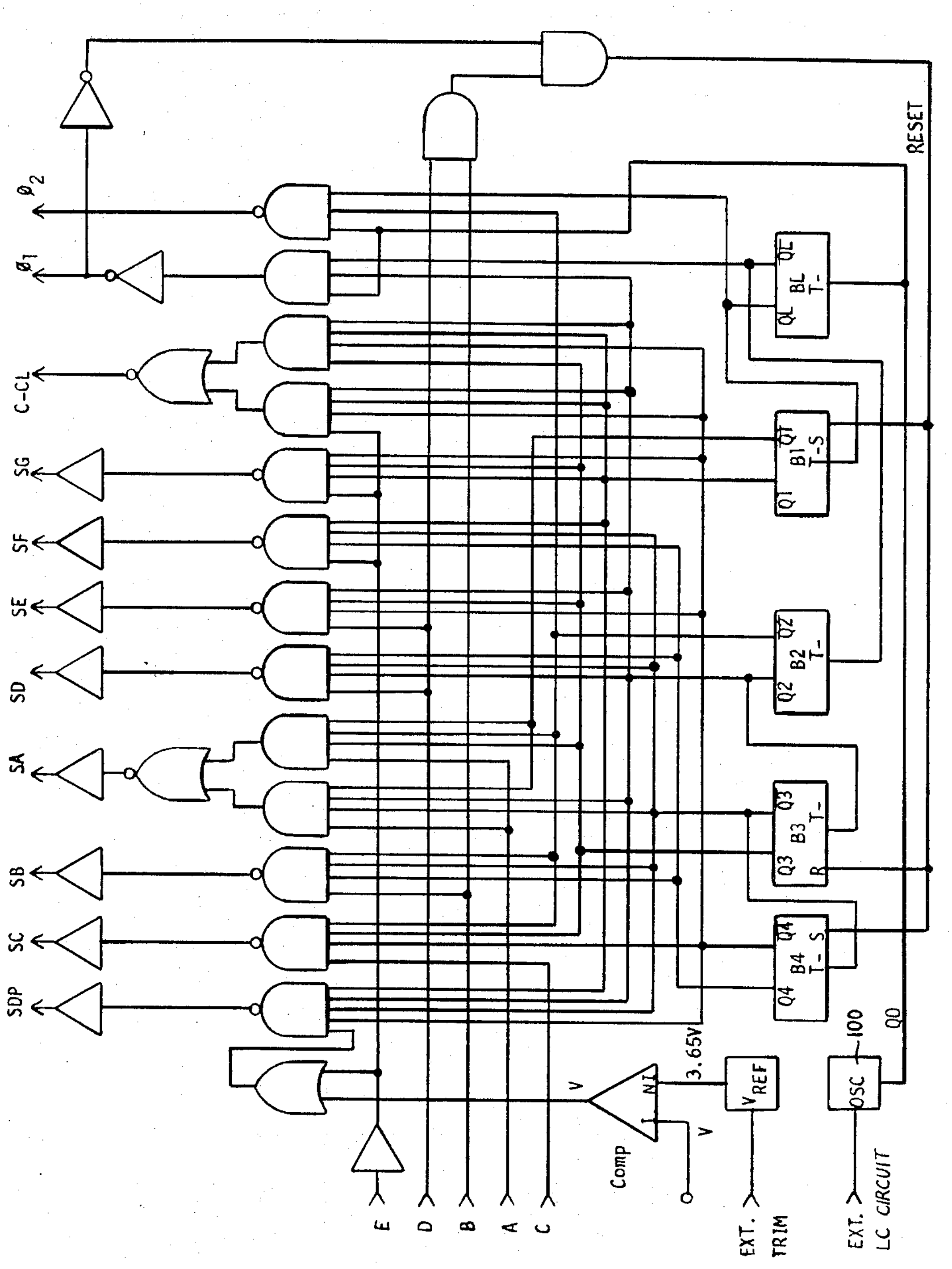
FIG. 17 is a logic diagram of the anode driver of FIG. 2.

As discussed above, the display information is partially decoded in arithmetic and register circuit 20 and completely decoded into seven segment plus decimal point signals in the bipolar anode driver of output display unit 14. The anode driver also includes the basic clock generator for the system and a circuit for detecting low battery voltage to turn on all the decimal points. Such a circuit is shown and described in copending U.S. Pat. application Ser. No. 206,407 entitled LOW BATTERY VOLTAGE INDICATOR FOR A PORTABLE DIGITAL ELECTRONIC INSTRUMENT, filed on Dec. 9, 1971, by Thomas M. Whitney and now abandoned. A logic diagram of the anode driver is shown in FIG. 17.

The clock generator uses an external LC series circuit to set the oscillator frequency. The advantages of an LC series circuit to set the frequency are: (1) the components can be specified to up to 2 percent tolerance; and (2) a crystal can be connected to the same external pin to set the frequency to 0.001 percent for timing applications.

Figure 18:
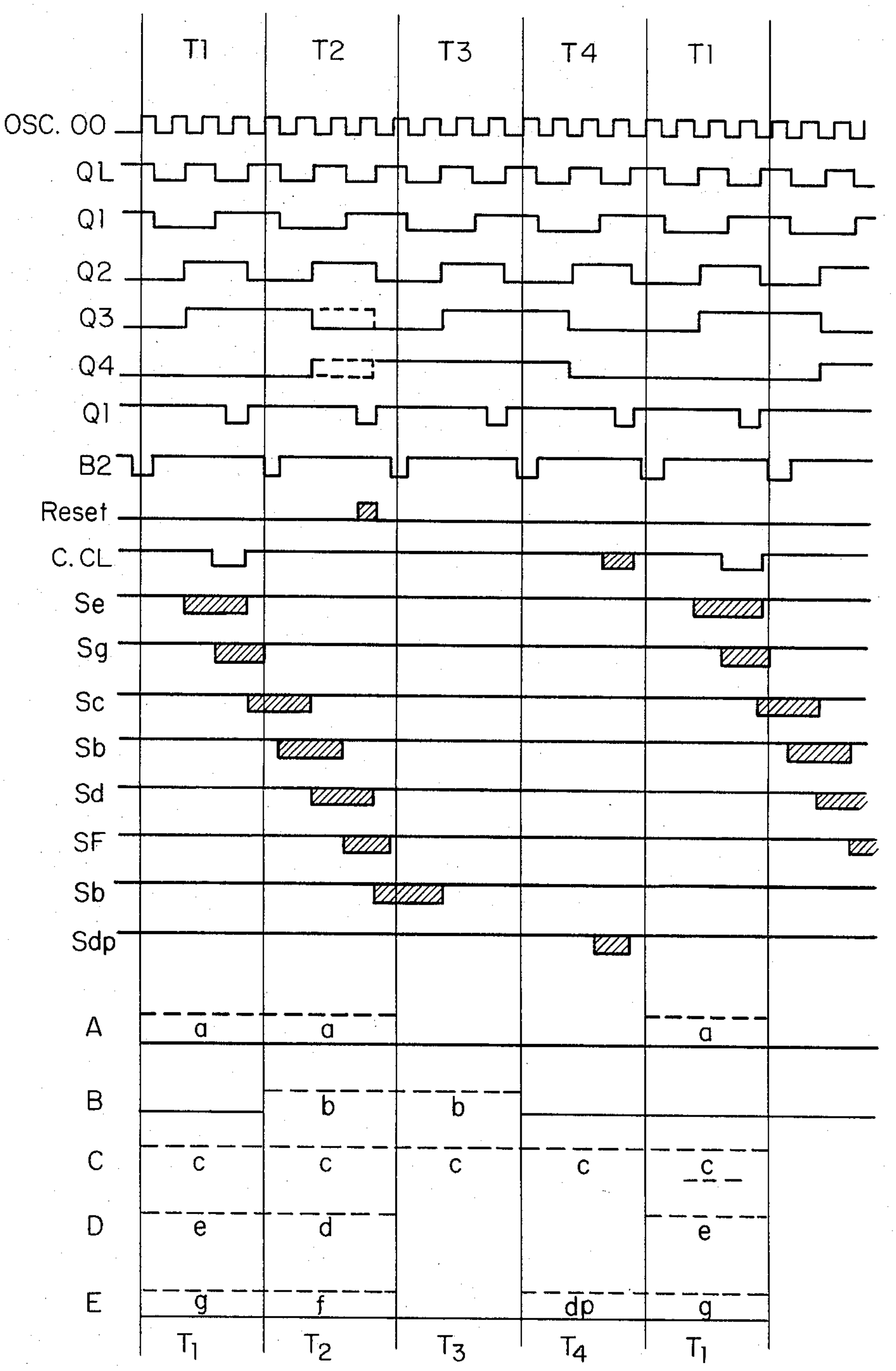
FIG. 18 is a waveform diagram illustrating the timing relationship between the input, output, and other signals of the anode driver of FIG. 17.

The square-wave oscillator frequency (all times in this section will be referred to an 800 KHz oscillator frequency, which translates to a 200 KHz clock for the calculator, the actual frequency being somewhat less) is divided by flip-flop BL to 400 KHz. Flip-flops B1 and B2 are clocked off alternate phases of flip-flop B1 to provide two 200 KHz square waves as shown in FIG. 18. Flip-flop B3 is clocked from flip-flop B2 and in turn clocks flip-flop B4 to provide further count-down of the basic clock frequency. The two-phase clock signals $Q_1$ and $Q_2$ are generated from flip-flops BL and B1 and the 800 KHz oscillator 100. They are on for 625 nsec and separated by 625 $\mu$sec as shown in FIG. 18. One other periodic signal is derived in the anode driver. Once each digit time a signal (counter-clock) is sent to the cathode driver of output display unit 14 (the trailing edge of this signal will step the display to the next digit).

The display consists of fifteen characters while the basic calculator word cycle consists of fourteen digits. The extra character is the decimal point. As explained above, a BCD two is placed in register B at the digit position of the decimal point. The display decoder 94 in arithmetic and register circuit 20 indicates this by a signal on outputs B and E during bit time $T_4$ (see FIG. 12). When this condition is decoded by the anode driver, the decimal point is excited and an extra counter clock signal is given to step the display to the next position (see FIGS. 18, 19, and 20). Therefore all remaining digits in register A are displaced one digit in the display.

Figure 19:
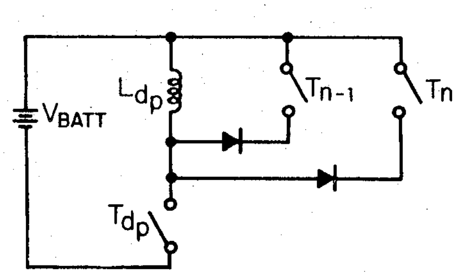
FIG. 19 is a schematic diagram of the basic inductive drive circuit for one of the LED's employed in the LED display of FIG. 2.
Figure 20:
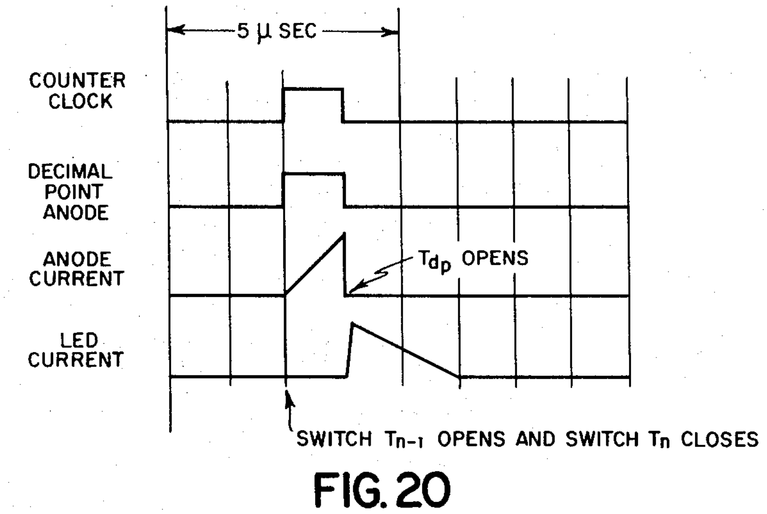
FIG. 20 is a waveform diagram illustrating the timing relationship between the decimal point drive signals for the LED display of FIG. 2.

FIGS. 19 and 20 show the simplified circuit and the timing relationship for the decimal point. The timing is critical since all the inductor current in segment *b* (the last to be excited) must be decayed before the counter clock signal is given to step to the next digit or the remaining current would be discharged through the wrong digit and a faint lighting of segment *b* on the same digit with the decimal point would occur. The decimal point insertion technique is the reason all other seven segments are excited during the first half of the digit time. The decimal point charging time is one-half that of the other segments. The decimal point segment gets the same current in one-half the time and is one-half as bright as the other segments.

Figure 21:
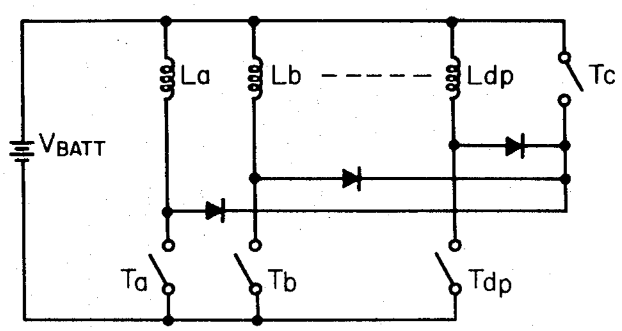
FIG. 21 is a schematic diagram of the inductive drive circuit for one digit in the LED display of FIG. 2.

An inductive circuit method of driving the light-emitting diodes is employed. Basically the method involves using the time it takes current to build up in an inductor to limit current, rather than using a resistor as is normally done with LED read-outs. This saves power since the only lossy components in the drive system are the parasitic inductor and transistor resistances. The drive circuit for one digit is shown in FIG. 21. Assuming the cathode transistor switch $T_c$ is closed, an anode switch $T_a$ is closed for 2.5 $\mu$sec allowing the current to build up to a value $I_p$ along a nearly triangular waveform (the eartly part of an exponential buildup). When anode switch $T_a$ is opened, the current is dumped through the LED, decaying in about 5 $\mu$sec. The anodes are strobed according to the sequence in FIG. 18. The primary reason for sequentially exciting the anodes is to reduce the peak cathode transistor current. Since the decay time is approximately twice the buildup time, it works out that the peak cathode current is about 2.5 times the peak current in any segment. The LED's are more efficient when excited at a low duty cycle. This means high currents for short periods (80 ma. anode current, 250 ma. cathode current). FIG. 18 also shows the relationship between the anode strobing sequence and the display output signals (A–E) from arithmetic and register circuit 20.

Since the anode driver operates from the battery voltage directly and drives the decimal point segment, a circuit is provided that senses when the voltage drops below a certain limit and thereupon turns on all decimal points. An external pin is provided to connect a trimming resistor to set the voltage where the indication is to occur.

CATHODE DRIVER

Figure 22:
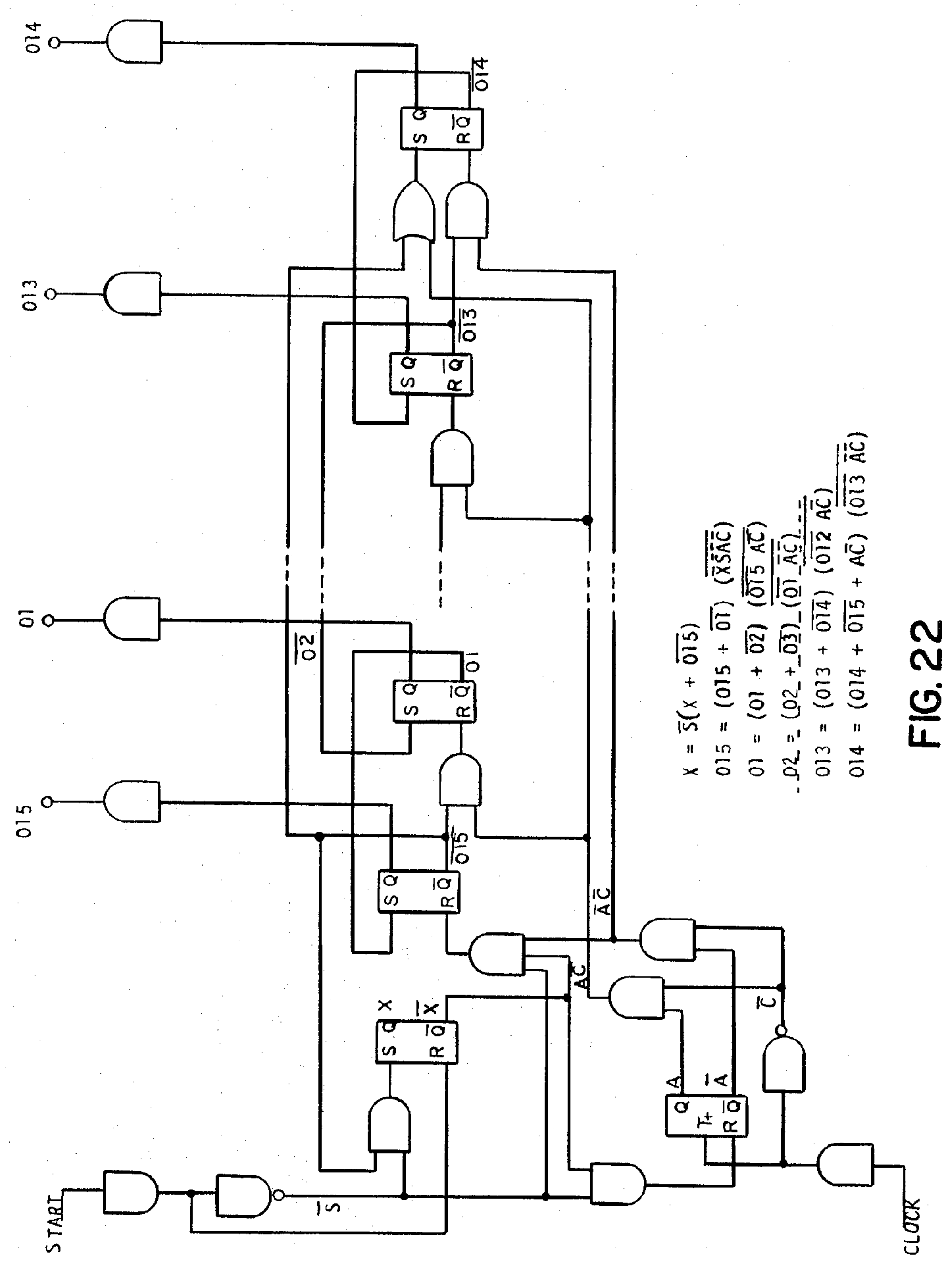
FIG. 22 is a logic diagram of the cathode driver of FIG. 2.

The cathode driver of output display unit 14 comprises a fifteen position shift register for scanning the fifteen digit display once each word time. This scanning operation moves from digit to digit in reponse to counter clock signals from the anode driver. Once each word time a START signal arrives from arithmetic and register circuit 20 to restart the procedure. A block diagram is shown in FIG. 22.

KEYBOARD

Figure 23:
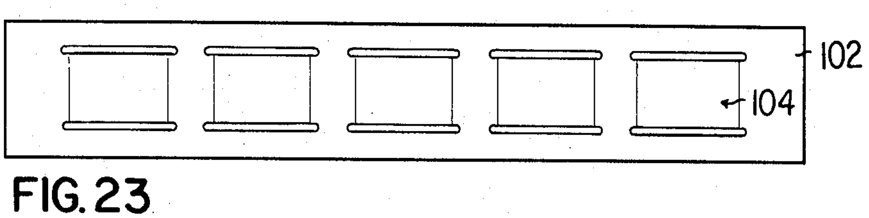
FIG. 23 is a top view of a metal strip employed in the keyboard input unit of FIGS. 1 and 2.
Figure 24:
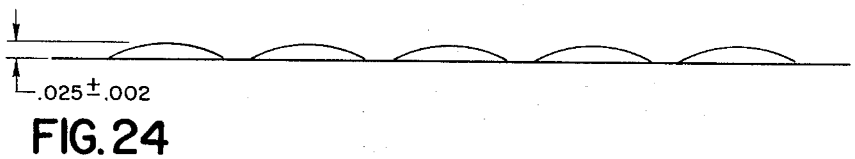
FIG. 24 is a side view of the metal strip of FIG. 23.

The calculator employs a reliable, low-profile, low cost keyboard with tactile feedback such as that shown and described in copending U.S. Pat. application Ser. No. 173,754 entitled KEYBOARD HAVING SWITCHES WITH TACTILE FEEDBACK and filed on Aug. 23, 1971, by William W. Misson et al. The keyboard employs metal strips 102 with slots 104 etched or punched out as shown in FIG. 23, leaving an area which can be stretched to form small humps as shown in FIG. 24. The strips are spot welded to a printed circuit board such that orthogonal traces run under each hump. Pressing a key makes electrical contact between one of the horizontal strips and the corresponding vertical trace. The bounce is less than one millisecond (the calculator contains a wait loop to prevent double entries). Extensive life testing of the keyboard indicates more than a million cycles can be expected. Tolerances must be maintained carefully to prevent the possibility that a key is depressed but no contact is made and to insure uniformity.

Figure 25:
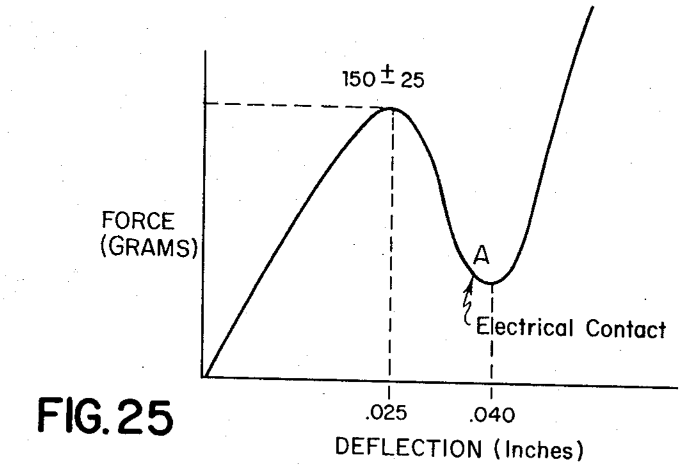
FIG. 25 is a force-deflection curve for a typical key in the keyboard input unit of FIGS. 1 and 2.

One of the main advantages of the keyboard is the "overcenter" or "fall away" feel. FIG. 25 shows a force-deflection curve for a typical key. As can be seen a force of about 100 grams must be exceeded before the metal hump "breaks" through. After this critical value the operator cannot prevent contact from being made. Similarly when the key is released, contact is maintained until a critical value when the hump bounces back. Again, past a critical point the operator cannot prevent the key from releasing. This type of action prevents a condition known as "teasing" in which a key is nearly depressed and slight movement causes multiple entries. The point on the force deflection curve at which contact is made or released is most desirably on the negative slope portion. In the calculator it is either there or exactly at the bottom (point A in FIG. 25), but never on the final positive slope portion.

FIG. 1 shows the layout of keyboard input unit 12 which includes a plurality of function and numeric keys. Several of the function keys are capable of performing more than one function when used in conjunction with prefix key 15. For example, function key 17 carries one legend $Y^x$ which refers to its direct function. Immediately above the key location, legend 19 indicates a second function $\sqrt{x}$. Legend 19 is color-coded to designate not only the second function $\sqrt{x}$, but also to refer the user to prefix key 15 which initializes that function when depressed prior to depressing key 17. The coloration of the body of prefix key 15 corresponds to the coloration of all legends, such as legend 19, for association with of the present invention initialized by prefix key 15 are YTM, INTR, BOND, Δ%, COMPUTE, DATE, $\sqrt{x}$, → Σ, CLEAR, and Σ –.

LED DISPLAY

As mentioned above, the inductive drive technique employed for the LED display is inherently efficient because there are no dissipative components other than parasitic resistances and the forward voltage drop across saturated transistor switches. An inductive driver like that used in the calculator is shown and described in copending U.S. Pat. application Ser. No. 202,475 entitled LIGHT EMITTING DIODE DRIVER, filed on Nov. 26, 1971, by Donald K. Miller, and issued as U.s. Pat. No. 3,755,697 on Aug. 28, 1973.

Figure 26:
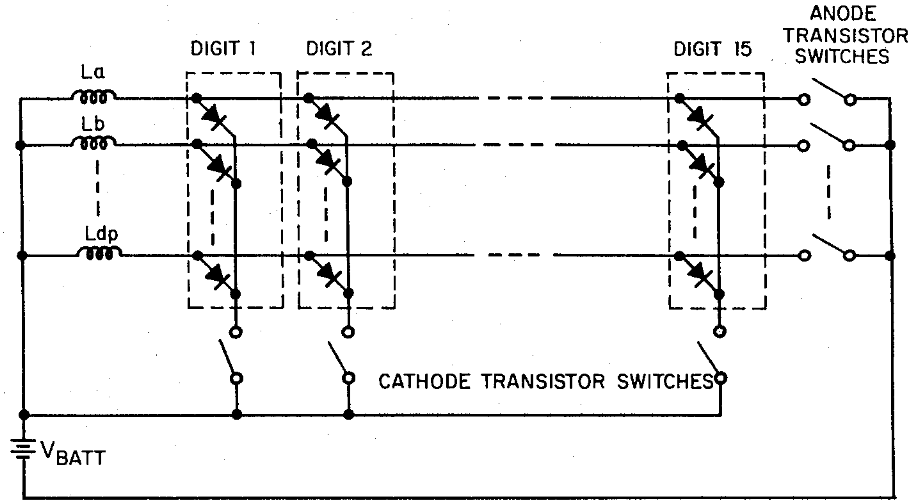
FIG. 26 is a schematic diagram of the LED display of FIGS. 1 and 2 and the inductive drive circuits therefor.
Figure 27:
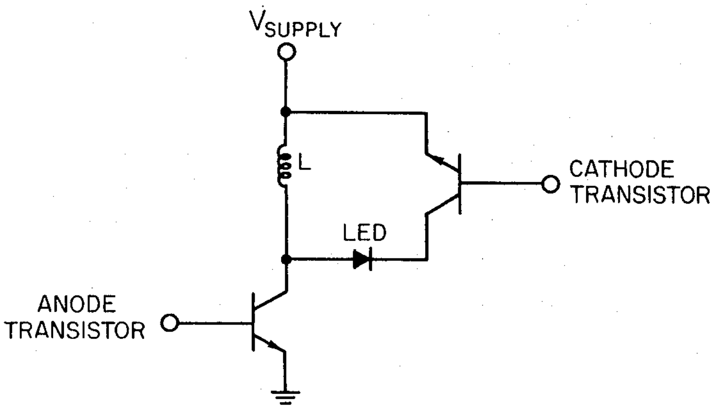
FIG. 27 is a schematic diagram of one segment of the LED display of FIG. 26.
Figure 28:
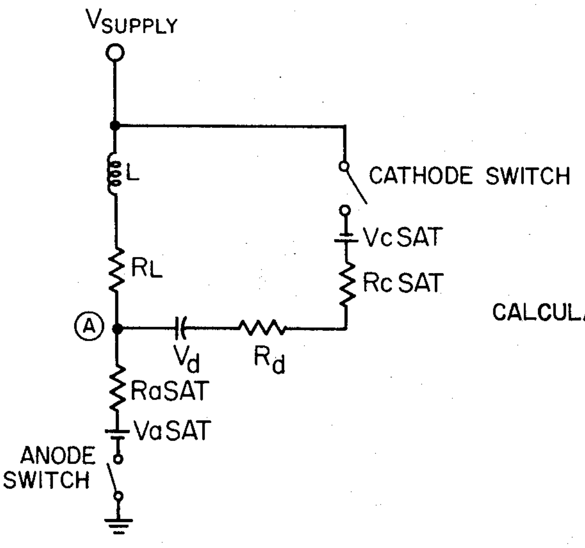
FIG. 28 is an equivalent piecewise-linear model for the circuitry of FIG. 27.

The display circuitry used in the calculator is shown in FIG. 26. It comprises an 8 × 15 array of LED's in which the eight rows are scanned by the anode driver and the fifteen columns by the cathode driver. The timing for this scanning was discussed above. A simplified circuit diagram for one segment is shown in FIG. 27. The equivalent piecewise-linear circuit model is shown in FIG. 28. An analysis of this model shows the inductor current buildup and discharge to be nearly linear for the parameters used in the calculator. The discharge-time to charge-time ratio is approximately:

$$t_{discharge}/t_{charge} \quad (V_s - V_{asat})/(V_d + V_{csat}) = (3.8 - 0.1)/(1.6 + 0.2) = 3.7/1.8 = 2.06$$

Figure 29:
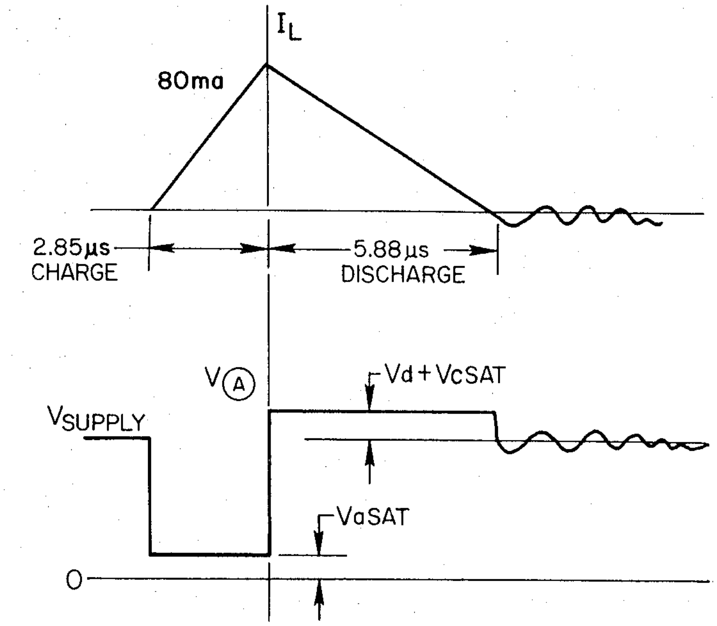
FIG. 29 is a waveform diagram illustrating the inductor current and LED anode voltages in the circuitry of FIG. 27.

FIG. 29 shows the inductor current for a basic calculator clock frequency of 175 KHz. The average LED current can be calculated from the formula $$\text{Ave } I_{LED} = \text{pulse current} \times \text{duty cycle}$$

$$= \left(\frac{1}{2} \times 80 \text{ ma}\right) \frac{5.88 \text{ sec}}{\frac{1}{175} \text{ KHz} \times 56}$$

$$= \frac{(80)\ (5.88)\ (.175)}{(2)\ (56)} = .735 \text{ ma}$$

The worst case display power (i.e., thirteen 8's and two minus signs) is about 110 milliwatts. FIG. 29 also shows the ringing inherent with inductive drive.

INSTRUCTION SET

Every function performed by the calculator is implemented by a sequence of one or more ten-bit instructions stored in ROM's 0–6 of read-only memory circuit 18. The serial nature of the MOS calculator circuits allows the instruction bits to be decoded from LSB to MSB (right to left) serially. If the first bit is a one, the instruction is either a subroutine jump or a conditional branch as selected by the second bit, with eight bits left for an address. The next largest set of instructions, the arithmetic set, starts with a zero followed by a one (right to left), leaving eight bits for encoded instructions. The ten different types of instructions, employed by the calculator are shown in the table below.

TABLE OF INSTRUCTION TYPES (X=DON'T CARE)

| Type | Available Instructions | Name | Fields |
|---|---|---|---|
| 1 | 256 (ADDRESSES) | JUMP SUBROUTINE | 8 / SUBROUTINE ADDRESS 0 1 |
| | 256 (ADDRESSES) | CONDITIONAL BRANCH | BRANCH ADDRESS 1 1 / I9 … I0 |
| 2 | 32X8=256 | ARITHMETIC/REGISTER | 5 3 / OPERATION-CODE WORD SELECT 1 0 |
| 3 | 64 (37 used) | STATUS OPERATIONS | 4 2 / N F 0 1 0 0 / I5I4 I3 I2 I1 I0 |
| | | SET BIT N | F=00 |
| | | INTERROGATE N | F=01 |
| | | RESET N | F=10 |
| | | CLEAR ALL | F=11 (N=0000) |
| 4 | 64 (30 used) | POINTER OPERATIONS | 4 2 / P F 1 1 0 0 |
| | | SET POINTER TO P | F=00 |
| | | INTERROGATE P | F=10 |
| | | DECREMENT P | F=01 P=XXXX |
| | | INCREMENT P | F=11 P=XXXX |
| 5 | 64 (20 used) | DATA ENTRY/DISPLAY | 4 2 / N F 1 0 0 0 |
| | | LOAD CONSTANT | F=01 |
| | | IS→A | F=1X (N=XX01) |
| | | BCD INPUT TO C REG | F=1X (N=XX11) |
| | | STACK INSTRUCTIONS | F=10 N=(——0) |
| | | AVAILABLE | F=00 |
| 6 | 32 (11 used) | ROM SELECT, MISC. | 3 2 / N F 1 0 0 0 0 |
| | | SELECT ROM "N" | F=00 |
| | | KEYBOARD ENTRY | F=10 (N=XX1) |
| | | EXTERNAL ENTRY | (N=XX0) |
| | | SUBROUTINE RETURN | F=01 (N=XXX) |

TABLE OF INSTRUCTION TYPES (X=DON'T CARE) – Continued

| Type | Available instructions | Name | Fields |
|---|---|---|---|
| | | | 4 |
| 7 | 16 | RESERVED FOR PROGRAM STORAGE MOS CIRCUIT | X X X X 1 0 0 0 0 0 |
| | | | 3 |
| 8 | 8 | | X X X 1 0 0 0 0 0 0 |
| 9 | 7 | AVAILABLE | X X X 0 0 0 0 0 0 0 |
| 10 | 1 | NO OPERATION (NOP) | 0 0 0 0 0 0 0 0 0 0 |

There are two type 1 instructions, jump subroutine and conditional branch. They are decoded only by control and timing circuit 16. No word select is generated and all registers in arithmetic and register circuit 20 merely recirculate. The object of the jump subroutine instruction is to move to a new address in ROM and to save the existing address (plus one) as a return address. The last instruction in a subroutine must be a RETURN to continue the program where it was left previously.

buffer register 68 onto the $I_a$ buss 32 and loaded into the ROM address register 74 (see FIG. 6). Thus, the instruction is a BRANCH IF NO CARRY. There are three ways the carry flip-flop 66 can be set: (1) by a carry generated in the arithmetic and register circuit 20; (2) by a successful interrogation of the pointer position; and (3) by a successful interrogation of one of the twelve status bits. An example is given in the table below.

Example Conditional Branch Execution

| WORD | ADDRESS RECEIVED AT ROM | INSTRUCTION SENT BY ROM | INSTRUCTION EXECUTED | RESULT |
|---|---|---|---|---|
| N–1 | P | INCREMENT SIGN DIGIT | — | — |
| N | P+1 | CONDITIONAL BRANCH TO ADDRESS Q | INCREMENT SIGN DIGIT | CARRY GENERATED IF "A" REG. NEGATIVE |
| N+1 | P+2 | CONTENTS OF P+2 | CONDITIONAL BRANCH | SEND P+2 |
| | or | or | | or |
| | Q | CONTENTS OF Q | | SEND Q |

As discussed above, control and timing circuit 16 contains a 20 eight-bit shift register 58–62 which holds the current eight-bit ROM address and also has eight bits of storage for one return address (see FIG. 4). During bit times $b_{47}$–$b_{54}$ the current ROM address flows through the adder 64 and is incremented by one. Normally, this address is updated each word time. However, if the first two bits of the instruction, which arrive at bit times $b_{45}$–$b_{46}$ are 10, the incremented current address is routed to the return address portion 60 of the 20 eight-bit shift register and the remaining eight bits of the instruction, which are the subroutine address, are inserted into the address portion 58. These data paths with the JSB control line are shown in FIG. 4. In this way the return address has been saved and the jump address is ready to be transmitted to ROM at bit times $b_{19}$–$b_{26}$ of the next word time.

The most frequently used instruction is the conditional branch, which based upon data or system status implements the decision-making capability of the calculator. In the calculator system described here this instruction also functions as an unconditional branch.

The format of the branch instruction, as shown in the instruction table above, is two ones followed by an eight-bit branch address. The instruction is received at bit times $b_{45}$–$b_{54}$. The last eight bits of the instruction are stored in the address buffer register 68 (see FIG. 4). During the next word time the carry flip-flop 66 is checked at bit time $b_{19}$. If the carry flip-flop was set during the previous word time, the current ROM address is transmitted to ROM's 0–6. If the carry flip-flop was not set, the branch address is read from the address A typical test condition is to determine the sign of a number. Support at address P in the program a branch to location Q is desired if the sign of A is positive, while program execution is to continue if the sign if negative. In the example given in the table above, the instruction "increment the A register, word select of sign digit only" is given at location P. During word time N–1 the instruction is received by arithmetic and register circuit 20 and is executed at word time N (the same word time when the CONDITIONAL BRANCH instruction is received by control and timing circuit 16). If the sign of A is negative, there will be a nine in the sign digit. Incrementing this position will generate a carry and set the carry flip-flop 66 in control and timing circuit 16. Since the instruction is a branch if no carry is generated, the program execution will jump to location Q only if the sign is positive (i.e., was a zero), otherwise execution continues at P+2.

Note that during word time N+1 the calculator did nothing more than to select which of two addresses to send next (all registers merely recirculate). To perform a branch actually takes two word cycles to execute, one to ask a question and set the carry flip-flop 66 if the answer is YES, and the other to test if the CARRY flip-flop was set and transmit the proper address. In many cases the asking of the question is an arithmetic operation (i.e., A+B → A) which must be performed anyway. Then the branch takes only one extra instruction.

Contrary to most instruction sets, this set has no unconditional branch instruction. However, since an ordinary "jump" is one of the most used instructions, the conditional branch is also used as an unconditional branch or jump by insuring that the carry flip-flop 66 is reset when an unconditional branch is desired. This is the reason the sense of the conditional branch is BRANCH ON NO CARRY. The carry flip-flop 66 is reset during execution of every instruction except arithmetic (type 2) and interrogation of pointer or status (types 3 and 4). Since only arithmetic and interrogation instructions can set the carry flip-flop 66, the constraint is not severe. The jump subroutine instruction can also be used as an unconditional branch if the previous return address does not have to be saved. In summary, conditional branch can be used as an unconditional branch provided the state of the carry flip-flop 66 is known to be reset (i.e., provided the conditional branch does not follow an arithmetic or an interrogation of pointer or status instruction).

Arithmetic and register (Type 2) instructions apply to the arithmetic and register circuit 20 only. There are 32 arithmetic and register instructions divided into eight classes encoded by the left-hand five bits of the instruction. Each of these instructions can be combined with any of eight word select signals to give a total capability of 256 instructions. The 32 arithmetic and register instructions are listed in the table below.

TABLE OF TYPE TWO INSTRUCTIONS
(in order of binary code)

| CODE | INST | CODE | INST |
|---|---|---|---|
| 0 0000 | 0–B | 1 0000 | A–B |
| 0 0001 | 0→B | 1 0001 | B↔C |
| 0 0010 | A–C | 1 0010 | SHIFT C RIGHT |
| 0 0011 | C–1 | 1 0011 | A–1 |
| 0 0100 | B→C | 1 0100 | SHIFT B RIGHT |
| 0 0101 | 0–C→C | 1 0101 | C+C→C |
| 0 0110 | 0→C | 1 0110 | SHIFT A RIGHT |
| 0 0111 | 0–C–1→C | 1 0111 | 0→A |
| 0 1000 | SHIFT A LEFT | 1 1000 | A–B→A |
| 0 1001 | A→B | 1 1001 | A↔B |
| 0 1010 | A–C→C | 1 1010 | A–C→A |
| 0 1011 | C–1→C | 1 1011 | A–1→A |
| 0 1100 | C→A | 1 1100 | A+B→A |
| 0 1101 | 0–C | 1 1101 | A↔C |
| 0 1110 | A+C→C | 1 1110 | A+C→A |
| 0 1111 | C+1→C | 1 1111 | A+1→A |

KEY: A,B,C are registers; → means goes into; ↔ means interchange

The eight classes of arithmetic and register instructions are:

(1) Clear (3);
(2) Transfer/Exchange (6);
(3) Add/Subtract (7);
(4) Compare (6);
(5) Complement (2);
(6) Increment (2);
(7) Decrement (2); and
(8) Shift (4).

There are three clear instructions. These instructions are 0 → A, 0 → B, and 0 → C. They are implemented by simply disabling all the gates entering the designated register. Since these instructions can be combined with any of the eight word select options, it is possible to clear a portion of a register or a single digit.

There are six transfer/exchange instructions. These instructions are A → B, B → C, C → A, A ↔ B, B ↔ C, and C ↔ A. This variety permits data in registers A, B, and C to be manipulated in many ways. Again, the power of the instruction must be viewed in conjunction with the word select option. Single digits can be exchanged or transferred.

There are seven add/subtract instructions which use the adder circuitry 84. They are A+C → C, A+B → A, A+C → A, and C+C → C. The last instruction can be used to divide by five. This is accomplished by first adding the number to itself via C+C → C, multiplying by two, then shifting right one digit, and dividing by ten. The result is a divide by five. This is used in the square root routine.

There are six compare instructions. These instructions are always followed by a conditional branch. They are used to check the value of a register or a single digit in a register and still not modify or transfer the contents. These instructions may easily be found in the type two instruction table above since there is no transfer arrow present. They are:

(1) 0–B (Compare B to zero);
(2) A–C (Compare A and C);
(3) C–1 (Compare C to one);
(4) 0–C (Compare C to zero);
(5) A–B (Compare A and B); and
(6) A–1 (Compare A to one).

If, for example, it is desired to branch if B is zero (or any digit or group of digits is zero as determined by WS), the 0–B instruction is followed by a conditional branch. If B was zero, no carry (or borrow) would be generated and the branch would occur. The instruction can be read: IF U ≥ V THEN BRANCH. Again it is easy to compare single digits or a portion of a register by appropriate word select options.

There are two complement instructions. The number representation system in the calculator is sign and magnitude notation for the mantissa, and tens complement notation in the exponent field. Before numbers can be subtracted, the subtrahend must be tens-complemented (i.e., 0–C → C). Other algorithms require the nines complement (i.e., 0–C–1 → C).

There are four increment/decrement instructions (two of each). They are A±1 → A and C±1 → C.

There are four shift instructions. All three registers A, B, and C can be shifted right, while only A has a shift left capability. The arithmetic and register instruction set is summarized by class in the table below.

TABLE OF TYPE TWO INSTRUCTIONS
(divided by class)

| Class | Instruction | Code |
|---|---|---|
| 1) Clear | 0→A | 00111 |
| | 0→B | 00001 |
| | 0→C | 00110 |
| 2) Transfer/ Exchange | A→B | 01001 |
| | B→C | 00100 |
| | C→A | 01100 |
| | A↔B | 11001 |
| | B↔C | 10001 |
| | C↔A | 11101 |
| 3) Add/ Subtract | A+C→C | 01110 |
| | A–C→C | 01010 |
| | A+B→A | 11100 |
| | A–B→A | 11000 |
| | A+C→A | 11110 |
| | A–C→A | 11010 |
| | C+C→A | 10101 |
| 4) Compare | 0–B | 00000 |
| | 0–C | 01101 |
| | A–C | 00010 |
| | A–B | 10000 |
| | A–1 | 10011 |
| | C–1 | 00011 |
| 5) Complement | 0–C→C | 00101 |
| | 0–C–1→C | 00111 |
| 6) Increment | A+1→A | 11111 |
| | C+1→C | 01111 |
| 7) Decrement | A–1→A | 11011 |
| | C–1→C | 01011 |
| 8) Shift | Sh A Right | 10110 |
| | Sh B Right | 10100 |
| | Sh C Right | 10010 |
| | Sh A Left | 01000 |

The twenty eight-bit shift register 58–62 in control and timing circuit 16 contains twelve status bits or flags used to remember conditions of an algorithm or some past event (e.g., the decimal point key has already been depressed). These flags can be individually set, reset, or interrogated or all bits can be cleared (reset simultaneously). The format for the status operation (type 3) instructions given in the instruction types table above is repeated below

TABLE OF STATUS INSTRUCTION DECODING

| Bit No. | IIII<br>9876 | II<br>54 | I<br>3 | III<br>210 |
|---|---|---|---|---|
| FIELD | N | F | 0 | 100 |

| F | INSTRUCTION |
|---|---|
| 00 | SET FLAG N |
| 01 | INTERROGATE FLAG N |
| 10 | RESET FLAG N |
| 11 | CLEAR ALL FLAGS (N=0000) |

If status bit N is one when the instruction "interrogate N" is executed, the CARRY flip-flop 66 in control and timing circuit 16 will be set. The status bit will remain set. Interrogate is always followed by a conditional branch instruction. The form of the interrogation is: "If status bit N=0, then branch," or "If status bit N≠1, then branch." The reason for this negative orientation is that all branches occur if the test is false (i.e., CARRY flip-flop=0), a result derived from using the conditional and unconditional branches as the same instruction.

Status bit 0 is set when a key is depressed. if cleared it will be set every word time as long as the key is down.

A four-bit counter 44 in control and timing circuit 16 acts as a pointer or marker to allow arithmetic instructions to operate on a portion of a register. Instructions are available to set and interrogate the pointed at one of fourteen locations or to increment or decrement the present position. The pointer instruction decoding is given in the table below.

TABLE OF POINTER INSTRUCTION DECODING

| BIT No. | 9 8 7 6 | 5 4 | 3 | 2 1 0 |
|---|---|---|---|---|
| FIELD | P | F | 1 | 1 0 0 |

| F | INSTRUCTION | |
|---|---|---|
| 00 | Set pointer to P | |
| 10 | Interrogate if pointer at P | |
| 01 | Decrement pointer | P = XXXX i.e. don't care |
| 11 | Increment pointer | P = XXXX i.e. don't care |

As with the status interrogate instruction, the CARRY flip-flop 66 is set if the pointer is at P when the "pointer at P?" instruction is executed (as with status interrogation, the actual question is in the negative form: IF P≠N, THEN BRANCH or IF P = OTHER THAN N, THEN BRANCH). This instruction would be followed by a conditional branch. In a math routine the pointer allows progressive operation on a larger and larger portion of a word. After each iteration (cycle) through a loop, the pointer is decremented (or incremented) and then tested for completion to force another iteration or a jump out of the loop.

The data entry and display (type 5) instructions are used to enter data into arithmetic and register circuit 20, manipulate the stack and memory registers, and blank the display (sixteen instructions in this set are not recognized by any of the existing circuits and are therefore available for other external circuits that might be employed with other embodiments of the calculator). The table below contains a detailed coding of the data entry and display (type 5) instructions.

The first set of sixteen instructions ($I_5I_4 = 00$) in this table are not used by any of the main MOS circuits. They may be used by additional circuits or external circuitry listening to the $I_s$ line such as may be employed with other embodiments of the calculator.

The next instruction ($I_5I_4 = 01$) in this table is called the LOAD CONSTANT (LDC) or DIGIT ENTRY in-

TABLE OF TYPE 5 INSTRUCTION DECODING (X = don't care, which in this context means the instruction does not depend on this bit; either a 1 or a 0 here will cause the same execution.)
$I_9\ I_8\ I_7\ I_6\ I_5\ I_4$ 1 0 0 0

| | $I_9\ I_8\ I_7\ I_8$ | $I_5$ | $I_4$ | INSTRUCTION |
|---|---|---|---|---|
| | 0000 → 1111 | 0 | 0 | 16 Available instructions |
| | 0000 → 1001 | 0 | 1 | Enters 4 bit code N into C Register at pointer position (LOAD CONSTANT) |
| | 0 00 0 | 1 | X | Display Toggle |
| | 0 01 0 | 1 | X | Exchange Memory, C → M → C |
| | 0 10 0 | 1 | X | Up Stack, C → C → D → E → F |
| 8 | 0 11 0 | 1 | X | Down Stack, F → F → E → D → A |
| | 1 00 0 | 1 | X | Display OFF |
| | 1 01 0 | 1 | X | Recall Memory, M → M → C |
| | 1 10 0 | 1 | X | Rotate Down, C → F → E → D → C |
| | 1 11 0 | 1 | X | Clear all registers 0 → A,B,C,D,E,F,M |
| 1 | X X0 1 | 1 | X | $I_s$ → A Register (56 bits) |
| 1 | X X1 1 | 1 | X | BCD → C register (56 bits) |

struction. The four bits in $I_9 - I_6$ will be inserted into the C register at the location of the pointer, and the pointer will be decremented. This allows a constant, such as $\pi$ (pi), to be stored in ROM and transferred to arithmetic and register circuit 20. To transfer a ten-digit constant requires only eleven instructions (one to preset the pointer). Several exclusions exist in the use of this instruction. When used with the pointer in position 13, it cannot be followed by an arithmetic and register instruction (i.e., by Type 2 or 5 instructions as there are problems in common use of the five-bit $I_s$ buffer 91 in arithmetic and register circuit 20). With P=12, LDC can be followed by another LDC but not by any other type 2 or 5 instruction. When used with the pointer in position 14, the instruction has no effect. However, when P=12 and LDC is followed by a type 2 or 5 instruction, position 13 in register C is modified. Loading non-digit codes (1010–1111) is not allowed since they will be modified passing through the adder. The next set of instructions ($I_6\ I_5\ I_4 = 01X$) in the type 5 instruction decoding table contains two display instructions and six stack or memory instructions. The display flip-flop in arithmetic and register circuit 20 controls blanking of all the LED's. When it is reset, the 1111 code is set into the display buffer 96, which is decoded so that no segments are on. There is one instruction to reset this flip-flop $I_9\ I_8\ I_7 =$ 100) and another to toggle it (000). The toggle feature is convenient for blinking the display.

The remaining instructions in the type 5 instruction decoding table include two affecting memory (Exchange C↔M and Recall M → C), three affecting the stack (Up, Down, and Rotate Down), one general clear, one for loading register A from $I_s$ buss 28 (namely, $I_7\ I_6\ I_5 = 011$), and one for loading register C from BCD (111). Neither of the two last-mentioned instructions depends on bits $I_9$, $I_8$, or $I_4$. The $I_s$ → A instruction is designed to allow a key code to be transmitted from a program storage circuit to arithmetic and register circuit 20 for display. The entire 56 bits are loaded although only two digits of information are of interest. The BCD → C instruction allows data input to arithmetic and register circuit 20 from a data storage circuit or other external source such as might be employed with other embodiments of the calculator.

The ROM select and other type six instructions are denoted by the pattern 10000 in instruction bits $I_4 - I_0$. The decoding table for these instructions is shown below.

The ROM SELECT instruction allows transfer of control from one ROM to another. Each ROM has a masking option which is programmed to decode bits $I_9 - I_7$. A Select ROM 3 instruction read from ROM 1 will reset the ROE flip-flop 70 in ROM 1 and set the ROE flip-flop 70 in ROM 3. The address is incremented in control and timing circuit 16 as usual. Thus, if Select ROM 3 is in location 197 in ROM 1, the first instruction read from ROM 3 will be location 198.

Figure 30:
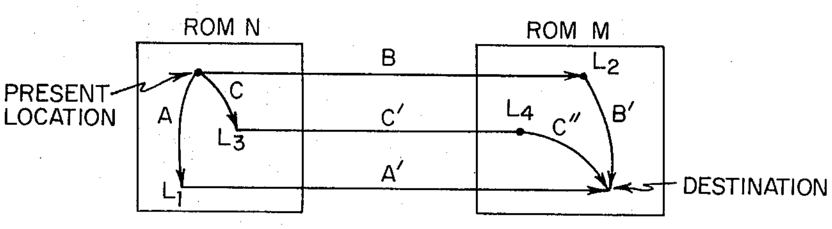
FIG. 30 is a path diagram illustrating the possible transfer paths between ROM's 0–6 of FIG. 2.

There are three ways to arrive at a desired address, on a different ROM as shown in FIG. 30. In path AA', a transfer (via an unconditional branch or a jump subroutine) to an address one before the desired address (L1) is executed in ROM N first. Then a ROM select M is given. In BB', the opposite order is shown (first ROM N select, then a transfer). Because the desired transfer location (L1 or L2) may already be occupied by an instruction, a third possibility may be used that is less efficient in states but does not depend on program locations. A transfer to L3 is made, then a ROM select, and then an additional transfer from L4 to the final desired location. With this method, L3 and L4 are overhead states.

Bits $I_6 I_5 = 01$ designate a subroutine return (RET). There are eight bits of storage in the twenty eight-bit shift register 58–62 of control and timing circuit 16 for retaining the return address when Jump Subroutine is executed. This address has already been incremented so execution of RET is simply a matter of outputting the address on $I_a$ line 32 at bit times $b_{19}$–$b_{26}$ and also inserting it into the ROM address portion 58 of the shift register. It is also still retained in the return address portion 60.

A key code is entered into control and timing circuit 16 by depressing a key on the keyboard. A key depression is detected by a positive interrogation of status bit 0. During a computation the keyboard is locked out because this status bit would ordinarily not be interrogated until return to the display loop. The actual key depression saves the state of the system counter (which is also the key code) in the key code buffer 56 (see FIG. 4) and also sets status bit 0. Execution of the KEYBOARD ENTRY instruction routes the key code (six bits) in the key code buffer 56 onto $I_a$ line 32 and into ROM address register 58 at bit times $b_{19}$–$b_{26}$. The most significant two bits $b_{25}$ and $b_{26}$ are set to zero so that a keyboard entry always jumps to one of the first 64 states.

TABLE OF TYPE SIX INSTRUCTION DECODING

| Circuit Affected | $I_9I_8I_7I_6I_5I_4I_3I_2I_1I_0$ | Instruction |
|---|---|---|
| ROM | 0 0 0 0 0 1 0 0 0 0<br>↓ 0 0 1 0 0 0 0<br>1 1 1 0 0 1 0 0 0 0 | ROM select. One of 8 as specified in bits 19 – 17. |
| C&T | X X X 0 1 1 0 0 0 0 | Subroutine return |
| | X X 0 1 0 1 0 0 0 0 | External key code entry to C&T |
| | X X 1 1 0 1 0 0 0 0 | Keyboard entry |
| DATA STORAGE | 1 X 0 1 1 1 0 0 0 0 | Send Address from C Register to Data Storage Circuit |
| | 1 0 1 1 1 1 0 0 0 0 | Send data from C Register into Data Storage Circuit |

Two algorithms used in the calculator will now be discussed to further illustrate the instruction set. The first of these algorithms is a display wait loop, used after a key has been processed and while waiting for another key to be actuated. The second of these algorithms is a floating point multiply operation.

A flow diagram of the display wait loop is shown in FIG. 31. This loop is entered after a keystroke has been processed, register A has been properly loaded with the number to be displayed, and register B contains the display "mask" as discussed above. Two flags or status bits are required. Status bits 0 (SO) is hardwired in control and timing circuit 16 to automatically set whenever a key is down. Status bit 8 (S8) is used in this program to denote the fact that the key which is presently down has already been processed (since a routine may be finished before the key is released). In states D1S1 and D1S2 these two status bits are initialized. Then a loop is used as a time delay (about 14.4 ms.) to wait out any key bounce. In D1S4 status bit 8 (S8) is checked. The first time through the algorithm it must be 1 since it was set in D1S1 to denote the key has been processed. In state D1S5 the display is turned on (actually it is toggled since it must previously have been off; there is no DISPLAY ON instruction). At this time the answer appears to the user. In D1S6 status bit 0 (SO) is checked to see if a key is down. If not (i.e., SO=0), the previous key has been released, and status bit 8 (S8) is reset to 0 (D1S7). The machine is now ready to accept a new key since the previous key has been processed and released. The algorithm cycles through D1S6 and D1S7 waiting for a new key. This is the basic wait cycle of the calculator. If SO=1 in D1S6, the key which is down may be the old key (i.e., the one just processed) or a new key. This can be determined upon return to D1S4 where status bit 8 (S8) is checked. If a new key is down (S8=0), execution jumps to D1S8, the display is blanked, and a jump out is made to service the key. A listing of the algorithm is given in the table below.

TABLE OF WAIT LOOP ALGORITHM

| LABEL | OPERATION | COMMENT |
|---|---|---|
| D1S1: | 1→S8 | Set Status 8 |
| D1S2: | 0→SO | Reset Status 0 |
| D1S3: | P-1→P | Decrement pointer, |
| | IF P # 12 | 48 word loop (3 × 16) |
| | THEN GO TO D1S3 | to wait out key bounce |
| | DISPLAY OFF | |
| D1S4: | IF S8 # 1 | If key not processed, |
| | THEN GO TO D1S8: | leave routine |
| D1S5: | DISPLAY TOGGLE | Turn on display |
| D1S6: | IF SO # 1 | If key up, reset |
| | THEN TO TO D1S7: | S8 and wait |
| | GO TO D1S2: | Key down. Check if same key |
| D1S7: | 0→S8 | Indicate key not processed |
| | GO TO D1S6: | Back to wait for key |
| D1S8: | | Blank display |
| D1S9: | KEYS→ROM | Jump to start of program to |
| | ADDRESS | |
| | ↓ | process key that was down. |
| | CONTINUE | |

The floating point multiply algorithm multiplies $x$ times $y$, where register C contains $x$ in scientific notation and register D contains $y$ (note that in the calculator register C corresponds to the user's X register and register D to the user's Y register). When the multiply key is depressed, the wait loop algorithm will jump instruction a ROM address corresponding to the first step of the multiply algorithm because of the way the instructions KEYS → ROM ADDRESS (state D1S9 in FIG. 31) is executed. The key code actually becomes the next ROM address. At this time the contents of registers A–D are indicated by the following:

Register A floating point form of $x$
Register B display mask for $x$
Register C scientific form of $x$
Register D scientific form of $y$ The algorithm for executing floating point multiply is given in the table below. The letters in parentheses indicate word select options as follows:

| | |
|---|---|
| P pointer position | M mantissa field without sign |
| WP Up to a pointer position | MS mantissa with sign |
| X Exponent field | W entire word |
| XS Exponent sign | S mantissa sign only |

TABLE OF FLOATING POINT MULTIPLY ALGORITHM

| LABEL | OPERATION | COMMENT |
|---|---|---|
| MPY1: | STACK→A | Transfer $y$ to A. Drop stack |
| MPY2: | A+C→C(X) | Add exponents to form exponent of answer |
| | A+C→C(S) | Add signs to form sign 1 |
| | IF NO CARRY GO TO MPY3 | of answer. |
| | 0→C(S) | Correct sign if both negative |
| MPY3: | 0→B(W) | Clear B, then transfer |
| | A→B(M) | mantissa of $y$. B(X) = 0. |
| | 0→A(W) | Prepare A to accumulate product |
| | 2→P | Set pointer to LSD (Least Significant Digit) Multiplier (Minus 1) |
| MPY4 | P+1→P | Increment to next digit. |
| MPY5 | A+B→A(W) | Add multiplier mantissa to partial |
| | C−1→C(P) | product C(P) times. When C(P)=0, |
| | IF NO CARRY GO TO MPY5 | stop and go to next digit |
| | SHIFT RIGHT A(W) | Shift partial product right. |
| | IF P # 12 | Check if multiply is complete |
| | THEN GO TO MPY4 | i.e. is pointer at MSD. |
| | IF A(P) > 1 | Check if MSD = 0. If so must |
| | THEN GO TO MPY6 | shift left and correct exp. |
| | SHIFT LEFT A(M) | Multiply by 10 and decrement exponent |
| | C−1→C(X) | |
| MPY6 | C+1→C(X) | Always do this to correct for factor of 10 too small |
| | A→B(XS) | Duplicate extra product digits |
| | A+B→A(XS) | add 11th digits |
| | IF NO CARRY GO TO MPY7 | If sum less than 10, then done |
| | A+1→A(M) | If sum more than 10, add 1 |
| | IF NO CARRY GO TO MPY7 | If answer was not all 9's, then done |

TABLE OF FLOATING POINT MULTIPLY ALGORITHM – Continued

| LABEL | OPERATION | COMMENT |
|---|---|---|
| | A+1 →A(P) | If answer was all 9's add 1 |
| | C+1 →C(X) | and increment exponent |
| MPY7 | A EXCHANGE C(M) | Get answer mantissa into C |
| | GO TO MASK 1 | Go to routine to position the answer in A and make the proper mask in B. Then to the DISPLAY program. |

DETAILED LISTING OF ROUTINES AND SUBROUTINES OF INSTRUCTIONS

A complete listing of all of the routines and subroutines of instructions employed by the calculator and of all of the constants employed by these routines and subroutines is given below. All of these routines, subroutines, and constants are stored in ROM's θ–6, as indicated at the top of the first page associated with each ROM. Each line in each ROM is separately numbered in the first column from the left-hand side of the page. This facilitates reference to different parts of the listing. Each address in ROM's θ–6 is represented in octal form by four digits in the second column from the left-hand side of the page. The first digit identifies which ROM, and the next three digits represent a nine-bit address (the L preceding these four digits is merely an address identifier). The instruction or constant stored in each address of ROM's θ–6 is represented in binary form in the third column from the left-hand side of the page. Branching addresses are represented in octal form by four digits in the fourth column from the left-hand side of the page. Explanatory comments are given in the remaining columns.

ROM O

| | | | | | | | | |
|---|---|---|---|---|---|---|---|---|
| 0 | L0000: | 1.11..1..1 | → | L0262 | | POWER1 | : | JSB POWER2 |
| 1 | L0001: | .1.111..11 | → | L0134 | | | | GO TO ERZ |
| 2 | L0002: | 11111.1.1. | | | | DIG3 | : | A + 1 → A[X] |
| 3 | L0003: | 11111.1.1. | | | | DIG2 | : | A + 1 → A[X] |
| 4 | L0004: | 11111.1.1. | | | | DIG1 | : | A + 1 → A[X] |
| 5 | L0005: | ..1..1..11 | → | L0044 | | | | IF NO CARRY GO TO DIG0 |
| 6 | L0006: | .11.1.1... | | | | MUL1 | : | STACK → A |
| 7 | L0007: | ..1..1.... | → | L1010 | ***** | | | SELECT ROM 1 |
| 8 | L0010: | 11..1.1... | | | | MS1 | : | DOWN ROTATE |
| 9 | L0011: | 1.1.....11 | → | L0240 | | | | GO TO MS2 |
| 10 | L0012: | ..1..1.... | → | L1013 | ***** | YTX | : | SELECT ROM 1 |
| 11 | L0013: | 111111.111 | → | L0375 | | STOR1 | : | GO TO STOR2 |
| 12 | L0014: | 11..1.1... | | | | RDOWN1 | : | DOWN ROTATE |
| 13 | L0015: | .1..111111 | → | L0017 | | | | GO TO OWFL3 |
| 14 | L0016: | .11.1.1... | | | | XEY | : | STACK → A |
| 15 | L0017: | ..1....111 | → | L0041 | | | | GO TO XEY1 |
| 16 | L0020: | .......... | | | | | | NO OPERATION |
| 17 | L0021: | .......... | | | | | | NO OPERATION |
| 18 | L0022: | 11111.1.1. | | | | DIG6 | : | A + 1 → A[X] |
| 19 | L0023: | 11111.1.1. | | | | DIG5 | : | A + 1 → A[X] |
| 20 | L0024: | 11111.1.1. | | | | DIG4 | : | A + 1 → A[X] |
| 21 | L0025: | ......1.11 | → | L0002 | | | | IF NO CARRY GO TO DIG3 |
| 22 | L0026: | .11.1.1... | | | | PLS1 | : | STACK → A |
| 23 | L0027: | ..1..1.... | → | L1030 | ***** | | | SELECT ROM 1 |
| 24 | L0030: | 1.11...1.. | | | | FV1 | : | 1 → S11 |
| 25 | L0031: | ...1111.11 | → | L0036 | | | | GO TO N1 |
| 26 | L0032: | ...1111.11 | → | L0036 | | PV1 | : | GO TO N1 |
| 27 | L0033: | 1.1....1.. | | | | PMT1 | : | 1 → S10 |
| 28 | L0034: | ...1111.11 | → | L0036 | | ROR1 | : | GO TO N1 |
| 29 | L0035: | ....11.... | | | | | | RETURN |
| 30 | L0036: | .111.1.1.. | | | | N1 | : | IF S7 # 1 |
| 31 | L0037: | ..11....11 | → | L0060 | | | | THEN GO TO N2 |
| 32 | L0040: | .11..1.... | → | L3041 | ***** | | | SELECT ROM 3 |
| 33 | L0041: | ..1..1.... | → | L1042 | ***** | XEY1 | : | SELECT ROM 1 |
| 34 | L0042: | ..1..1.... | → | L1043 | ***** | SUM1 | : | SELECT ROM 1 |
| 35 | L0043: | .1.1...1.. | | | | DP1 | : | 1 → S5 |
| 36 | L0044: | ..1..1.... | → | L1045 | ***** | DIG0 | : | SELECT ROM 1 |
| 37 | L0045: | .......... | | | | | | NO OPERATION |
| 38 | L0046: | .11.1.1... | | | | DIV1 | : | STACK → A |
| 39 | L0047: | ..1..1.... | → | L1051 | ***** | | | SELECT ROM 1 |
| 40 | L0050: | 11...1.... | → | L6051 | ***** | DATE | : | SELECT ROM 6 |
| 41 | L0051: | .......... | | | | | | NO OPERATION |
| 42 | L0052: | 1....1.... | → | L4053 | ***** | SOD1 | : | SELECT ROM 4 |
| 43 | L0053: | 1....1.... | → | L4054 | ***** | TRND1 | : | SELECT ROM 4 |
| 44 | L0054: | .11.1.1... | | | | PRC1 | : | STACK → A |
| 45 | L0055: | ..1..1.... | → | L1056 | ***** | | | SELECT ROM 1 |
| 46 | L0056: | .111...1.. | | | | PRE | : | 1 → S7 |
| 47 | L0057: | .1....1.11 | → | L0102 | | | | GO TO STOR3 |
| 48 | L0060: | .111...1.. | | | | N2 | : | 1 → S7 |
| 49 | L0061: | .1..111111 | → | L0117 | | | | GO TO OWFL3 |
| 50 | L0062: | 11111.1.1. | | | | DIG9 | : | A + 1 → A[X] |
| 51 | L0063: | 11111.1.1. | | | | DIG8 | : | A + 1 → A[X] |
| 52 | L0064: | 11111.1.1. | | | | DIG7 | : | A + 1 → A[X] |
| 53 | L0065: | ...1..1.11 | → | L0022 | | | | IF NO CARRY GO TO DIG6 |
| 54 | L0066: | ..1111111. | | | | MIN1 | : | 0 − C − 1 → C[S] |
| 55 | L0067: | ...1.11..1 | → | L0026 | | | | JSB PLS1 |
| 56 | L0070: | ..11..111. | | | | CLR1 | : | 0 → C[W] |
| 57 | L0071: | .1...1...1 | → | L0104 | | | | JSB CLR2 |
| 58 | L0072: | 1111.11.11 | → | L0366 | | CHS1 | : | GO TO CHS2 |
| 59 | L0073: | 1....1.1.. | | | | RCL1 | : | IF S8 # 1 |
| 60 | L0074: | .1..11..11 | → | L0114 | | | | THEN GO TO RCL3 |
| 61 | L0075: | .1..11.111 | → | L0115 | | | | GO TO RCL4 |
| 62 | L0076: | .1..1.1... | | | | ENTER1 | : | C → STACK |
| 63 | L0077: | 1.111..1.. | | | | | | 0 → S11 |
| 64 | L0100: | 1.1.1..1.. | | | | | | 0 → S10 |
| 65 | L0101: | .1111..1.. | | | | | | 0 → S7 |

ROM O – Continued

```
L0102:  .1..1..1..                          STOR3   :  0 → S4
L0103:  .1.1....11   →           GO TO OWFL1
L0104:  .111.1.1..                          CLR2    :  IF S7 # 1
L0105:  1...111.11   →  L0216                             THEN GO TO CLR3
L0106:  .1...1.1..                                     IF S4 # 1
L0107:  .1..1..111   →  L0111                             THEN GO TO CLR4
L0110:  1...111.11   →  L0216                          GO TO CLR3
L0111:  .1..1.1...                          CLR4    :  C → STACK
L0112:  .1..1.1...                                     C → STACK
L0113:  ..11111.11   →  L0076                          GO TO ENTER1
L0114:  .1..1.1...                          RCL3    :  C → STACK
L0115:  1.1.1.1...                          RCL4    :  M → C
L0116:  .1111..1..                          OWFL7   :  0 → S7
L0117:  .1.....1..                          OWFL3   :  1 → S4
L0120:  1...1..1..                          OWFL1   :  0 → S8
L0121:  .11...111.                          OWFL4   :  C → A[W]
L0122:  .1..1.111.                          OWFL5   :  A → B[W]
L0123:  11....11..                                     12 → P
L0124:  ..11.1.11.                                     0 → C[MS]
L0125:  .1111...1.                                     C + 1 → C[P]
L0126:  .1111...1.                                     C + 1 → C[P]
L0127:  .11.111.1.                                     IF C[XS] = 0
L0130:  .111111111   →  L0177                             THEN GO TO MSK1
L0131:  ..111.1.1.                                     0 – C – 1 → C[X]
L0132:  .11.111.1.                                     IF C[XS] = 0
L0133:  1..1...111   →  L0221                             THEN GO TO MSK2
L0134:  .1.1...1..                          ERZ     :  1 → S5
L0135:  111..11.1.                                     A + B → A[XS]
L0136:  .11....111   →  L0141                          IF NO CARRY GO TO OWFL2
L0137:  ..11..111.                                     0 → C[W]
L0140:  .1.1.....1   →  L0120                          JSB OWFL1
L0141:  ..11..111.                          OWFL2   :  0 → C[W]
L0142:  .1.111..1.                                     C – 1 → C[WP]
L0143:  ..11.11.1.                                     0 → C[XS]
L0144:  111.11111.                                     A EXCHANGE C[S]
L0145:  .1.1....11   →  L0120                          GO TO OWFL1
L0146:  .1..1..1..                          DIS4    :  0 → S4
L0147:  1..11..1..                          DIS3    :  0 → S9
L0150:  11....11..                                     12 → P
L0151:  ....1..1..                          DIS5    :  0 → S0
L0152:  .....111..                          DIS6    :  P – 1 → P
L0153:  11..1.11..                                     IF P # 12
L0154:  .11.1.1.11   →  L0152                             THEN GO TO DIS6
L0155:  1...1.1...                                     DISPLAY OFF
L0156:  1..1.1.1..                                     IF S9 # 1
L0157:  .1111..111   →  L0171                             THEN GO TO DIS7
L0160:  .1.11..1..                                     0 → S5
L0161:  .1....1.1.                                     SHIFT LEFT A[X]
L0162:  ..11.1....                          TKR     :  KEYS → ROM ADDRESS
L0163:  1..1...1..                          DIS9    :  1 → S9
L0164:  ...1..11..                                     1 → P
L0165:  .1.1.1.1..                                     IF S5 # 1
L0166:  .1111.1.11   →  L0172                             THEN GO TO DIS10
L0167:  .11111..1.                                     C + 1 → C[WP]
L0170:  .111..1111   →  L0163                          IF NO CARRY GO TO DIS9
L0171:  ....1.1...                          DIS7    :  DISPLAY TOGGLE
L0172:  .....1.1..                          DIS10   :  IF SO # 1
L0173:  .111..1111   →  L0163                             THEN GO TO DIS9
L0174:  .11.1..111   →  L0151                          GO TO DIS5
L0175:  .1..1.1.1.                          SCINT9  :  A → B[X]
L0176:  1.1..1.111   →  L0245                          GO TO SCINT4
L0177:  1..1111..1   →  L0236               MSK1    :  JSB SROUND
L0200:  1.111.1.1.                                     0 → A[X]
L0201:  11111.1.1.                                     A + 1 → 0 A[X]
L0202:  .1....1.1.                                     SHIFT LEFT A[X]
L0203:  11..1.111.                                     A EXCHANGE B[W]
L0204:  1.....1.1.                                     IF A <= B[X]
L0205:  .11111.111   →  L0175                             THEN GO TO SCINT9
L0206:  .1..1.1.1.                                     A → B[X]
L0207:  11.11.1.1.                          MSK11   :  A – 1 → A[X]
L0210:  1..11.1111   →  L0233                          IF NO CARRY GO TO MSK12
L0211:  ..111.11..                          MSK14   :  IF P # 3
L0212:  1..1.11.11   →  L0226                             THEN GO TO MSK13
L0213:  ..1..1....   →  L1214   *****       MSK15   :  SELECT ROM 1
L0214:  .....111..                          MSK28   :  P – 1 → P
L0215:  1...1..111   →  L0211                          GO TO MSK14
L0216:  .1111..1..                          CLR3    :  0 → S7
L0217:  .1..1..1..                                     0 → S4
L0220:  .1.1...111   →  L0121                          GO TO OWFL4
L0221:  .11...1.1.                          MSK2    :  C → A[X]
L0222:  1..1111..1   →  L0236                          JSB SROUND
L0223:  11111.1.1.                                     A + 1 → A[X]
L0224:  11.11.1.1.                          MSK21   :  A – 1 → A[X]
L0225:  1..11..111   →  L0231                          IF NO CARRY GO TO MSK22
L0226:  .1.11.1.1.                          MSK13   :  C – 1 → C[X]
L0227:  1...11..11   →  L0214                          IF NO CARRY GO TO MSK28
L0230   1...1.1111   →  L0213                          GO TO MSK15
L0231:  1.11...11.                          MSK22   :  SHIFT RIGHT A[M]
L0232:  1..1.1...1   →  L0224                          JSB MSK21
L0233:  .....111..                          MSK12   :  P – 1 → P
L0234:  1..1...11.                                     SHIFT RIGHT C[M]
L0235:  1....111.1   →  L0207                          JSB MSK11
L0236:  ..1..1....   →  L1237   *****       SROUND  :  SELECT ROM 1
L0237:  ....11....                                     RETURN
```

ROM O – Continued

| | | | | | | | |
|---|---|---|---|---|---|---|---|
| 160 | L0240: | ..1..1.... | → | L1241 | ***** | MS2 : | SELECT ROM 1 |
| 161 | L0241: | 1....11.1. | | | | SCINT3 : | IF A >= B[XS] |
| 162 | L0242: | 1.1..1.111 | → | L0245 | | | THEN GO TO SCINT4 |
| 163 | L0243: | 11111.1.1. | | | | SCINT2 : | A + 1 → A[X] |
| 164 | L0244: | 11.1111.1. | | | | | A – 1 → A[XS] |
| 165 | L0245: | ..11..1.1. | | | | SCINT4 : | 0 → C[X] |
| 166 | L0246: | ..11..11.. | | | | | 3 → P |
| 167 | L0247: | 11..1.11.. | | | | SCINT7 : | IF P # 12 |
| 168 | L0250: | 1111...111 | → | L0361 | | | THEN GO TO SCINT5 |
| 169 | L0251: | 1...1.111. | | | | SCINT6 : | B EXCHANGE C[W] |
| 170 | L0252: | .11.1..1.. | | | | DIS1 : | 0 → S6 |
| 171 | L0253: | .11..111.1 | → | L0147 | | | JSB DIS3 |
| 172 | L0254: | 1.1111.11. | | | | | 0 → A[MS] |
| 173 | L0255: | .1...1.1.. | | | | DENT1 : | IF S4 # 1 |
| 174 | L0256: | 1.11....11 | → | L0260 | | | THEN GO TO DENT2 |
| 175 | L0257: | .1..1.1... | | | | | C → STACK |
| 176 | L0260: | .11.1..1.. | | | | DENT2 : | 0 → S6 |
| 177 | L0261: | 111.1..111 | → | L0351 | | | GO TO DENT3 |
| 178 | L0262: | 111.1.1... | | | | POWER2 : | CLEAR REGISTERS |
| 179 | L0263: | ....11.1.. | | | | | CLEAR STATUS |
| 180 | L0264: | ..1....1.. | | | | | 1 → S2 |
| 181 | L0265: | .1..1..111 | → | L0111 | | | GO TO CLR4 |
| 182 | L0266: | 11111.1.1. | | | | DENT8 : | A + 1 → A[X] |
| 183 | L0267: | ......:11. | | | | | IF B[M] = 0 |
| 184 | L0270: | 111..11.11 | → | L0346 | | | THEN GO TO DENT18 |
| 185 | L0271: | ..111.11.. | | | | | IF P # 3 |
| 186 | L0272: | 1.11111111 | → | L0277 | | | THEN GO TO DENT5 |
| 187 | L0273: | ..11..111. | | | | | 0 → C[W] |
| 188 | L0274: | .11111111. | | | | | C + 1 → C[S] |
| 189 | L0275: | .11111111. | | | | | C + 1 → C[S] |
| 190 | L0276: | 11.1..11.. | | | | | 13 → P |
| 191 | L0277: | 1..1.1..1. | | | | DENT5 : | SHIFT RIGHT C[WP] |
| 192 | L0300: | .......11. | | | | DENT19 : | IF B[M] = 0 |
| 193 | L0301: | 11..1.1111 | → | L0313 | | | THEN GO TO DENT10 |
| 194 | L0302: | 11....11.. | | | | | 12 → P |
| 195 | L0303: | 1..11...1. | | | | | IF A[P] >= 1 |
| 196 | L0304: | 11..1.1111 | → | L0313 | | | THEN GO TO DENT10 |
| 197 | L0305: | 1.111.1.1. | | | | | 0 → A[X] |
| 198 | L0306: | 11.11:1.1. | | | | DENT11 : | A – 1 → A[X] |
| 199 | L0307: | 1..11...1. | | | | | IF A[P] >= 1 |
| 200 | L0310: | 11..1.1111 | → | L0313 | | | THEN GO TO DENT10 |
| 201 | L0311: | .1.....11. | | | | | SHIFT LEFT A[M] |
| 202 | L0312: | 11...11.11 | → | L0306 | | | GO TO DENT11 |
| 203 | L0313: | .1..1.1.1. | | | | DENT10 : | A → B[X] |
| 204 | L0314: | 1...1.111. | | | | | B EXCHANGE C[W] |
| 205 | L0315: | 111.1.111. | | | | | A EXCHANGE C[W] |
| 206 | L0316: | .1.11..1.. | | | | | 0 → S5 |
| 207 | L0317: | .11..11..1 | → | L0146 | | | JSB DIS4 |
| 208 | L0320: | 1...1.111. | | | | | B EXCHANGE C[W] |
| 209 | L0321: | ..11..1.1. | | | | | 0 → C[X] |
| 210 | L0322: | .11111.11. | | | | | C + 1 → C[MS] |
| 211 | L0323: | ......11.. | | | | DENT12 : | 0 → P |
| 212 | L0324: | .1.11...1. | | | | | C – 1 → C[P] |
| 213 | L0325: | ....1111.. | | | | DENT4 : | P + 1 → P |
| 214 | L0326: | .1.11...1. | | | | | C – 1 → C[P] |
| 215 | L0327: | 11.11.1.11 | → | L0332 | | | IF NO CARRY GO TO DENT6 |
| 216 | L0330: | .1...1..1. | | | | | SHIFT LEFT A[WP] |
| 217 | L0331: | 11.1.1.111 | → | L0325 | | | GO TO DENT4 |
| 218 | L0332: | 11..1.1.1. | | | | DENT6 : | A EXCHANGE B[X] |
| 219 | L0333: | .1..1.111. | | | | | A → B[W] |
| 220 | L0334: | .1.1.1.1.. | | | | | IF S5 # 1 |
| 221 | L0335: | 111.....11 | → | L0340 | | | THEN GO TO DENT7 |
| 222 | L0336: | .11....1.. | | | | | 1 → S6 |
| 223 | L0337: | 11..1.1111 | → | L0313 | | | GO TO DENT10 |
| 224 | L0340: | .11..1.1.. | | | | DENT7 : | IF S6 # 1 |
| 225 | L0341: | 1.11.11.11 | → | L0266 | | | THEN GO TO DENT8 |
| 226 | L0342: | .....111.. | | | | | P – 1 → P |
| 227 | L0343: | ..1.1.11.. | | | | | IF P # 2 |
| 228 | L0344: | 1.11111111 | → | L0277 | | | THEN GO TO DENT5 |
| 229 | L0345: | 11......11 | → | L0300 | | | GO TO DENT19 |
| 230 | L0346: | 1..1..111. | | | | DENT18 : | SHIFT RIGHT C[W] |
| 231 | L0347: | 1...1.111. | | | | | B EXCHANGE C[W] |
| 232 | L0350: | .11..11..1 | → | L0146 | | | JSB DIS4 |
| 233 | L0351: | ..11..111. | | | | DENT3 : | 0 → C[W] |
| 234 | L0352: | ....1.111. | | | | | 0 → B[W] |
| 235 | L0353: | 11.1..11.. | | | | | 13 → P |
| 236 | L0354: | ..11.11... | | | | | LOAD CONSTANT 3 |
| 237 | L0355: | 1...1..1.. | | | | | 0 → S8 |
| 238 | L0356: | .1.11.1.1. | | | | | C – 1 → C[X] |
| 239 | L0357: | 1...1.1.1. | | | | | B EXCHANGE C[X] |
| 240 | L0360: | 11.1..1111 | → | L0323 | | | GO TO DENT12 |
| 241 | L0361: | 1..11...1. | | | | SCINT5 : | IF A[P] >= 1 |
| 242 | L0362: | 1.1.1..111 | → | L0251 | | L0363: | THEN GO TO SCINT6 |
| 243 | l0363: | .1.11...1. | | | | | C – 1 → C[P] |
| 244 | L0364: | ....1111.. | | | | | P + 1 → P |
| 245 | L0365: | 1.1..11111 | → | L0247 | | | GO TO SCINT7 |
| 246 | L0366: | ..1111111. | | | | CHS2 : | 0 – C – 1 → C[S] |
| 247 | L0367: | .11..1111. | | | | | C → A[S] |
| 248 | L0370: | .11...1.1. | | | | | C → A[X] |
| 249 | L0371: | .11..11111 | → | L0147 | | | GO TO DIS3 |
| 250 | L0372: | .......... | | | | | NO OPERATION |
| 251 | L0373: | .......... | | | | | NO OPERATION |
| 252 | L0374: | .......... | | | | | NO OPERATION |
| 253 | L0375: | ..1.1.1... | | | | STOR2 : | C EXCHANGE M |
| 254 | L0376: | 1.1.1.1... | | | | | M → C |
| 255 | L0377: | .1....1.11 | → | L0102 | | | GO TO STOR3 |

ROM 1

```
L1000:  ..........                                  NO OPERATION
L1001:  ..........                                  NO OPERATION
L1002:  ...1...1..                     R3       :   1 → S1
L1003:  ..11.11.11   → L1066           R2       :   GO TO R12
L1004:  ...1...1..                     R1       :   1 → S1
L1005:  .1..11.111   → L1115                        GO TO R13
L1006:  1..11..1..                     XTY      :   0 → S9
L1007:  .1...1....   → L2010   *****                SELECT ROM 2
L1010:  111..11..1   → L1346           SMUL11   :   JSB MPY
L1011:  .1..11.111   → L1115                        GO TO R13
L1012:  .1...1....   → L2013   *****   SQR1     :   SELECT ROM 2
L1013   1......1..                     XTY11    :   1 → S8
L1014:  .111.1.1..                                  IF S7 # 1
L1015:  ...1.11.11   → L1026                              THEN GO TO XTY12
L1016:  .1111..1..                                  0 → S7
L1017:  111111...1   → L1374                        JSB SQR
L1020:  .1..11.111   → L1115                        GO TO R13
L1021:  1....1....   → L4022   *****   RETR4    :   SELECT ROM 4
L1022:  ..11.1.111   → L1065           R6       :   GO TO R11
L1023:  ...1...1..                     R5       :   1 → S1
L1024:  ..11...1..                     R4       :   1 → S3
L1025:  .1..11.111   → L1115                        GO TO R13
L1026:  .....11..1   → L1006           XTY12    :   JSB XTY
L1027:  .1..11..11   → L1114                        GO TO R14
L1030:  .1111..1..                                  0 → S7
L1031:  .11.11...1   → L1154           ADD11    :   JSB ADD
L1032:  .1..11.111   → L1115                        GO TO R13
L1033:  .1111..1..                     DIG10    :   0 → S7
L1034:  .....1....   → L0035   *****                SELECT ROM 0
L1035:  ....11....                     RET11    :   RETURN
L1036:  .1...1.1..                     DIG11    :   IF S4 # 1
L1037:  ..11....11   → L1060                              THEN GO TO DIG14
L1040:  ...11.1111   → L1033                        GO TO DIG10
L1041:  ..........                                  NO OPERATION
L1042:  11..111111   → L1317           XEY      :   GO TO MS17
L1043:  .1.11.1111   → L1133           SUM11    :   GO TO SUM12
L1044:  .1..11.111   → L1115           R0       :   GO TO R13
L1045:  .111.1.1..                                  IF S7 # 1
L1046:  ...11.1111   → L1033                              THEN GO TO DIG10
L1047:  ...1111.11   → L1036                        GO TO DIG11
L1050:  .1111..1..                     SDIV11   :   0 → S7
L1051:  ..11111.11   → L1076                        GO TO DI
L1052:  .1..1.1...                     PRC2     :   C → STACK
L1053:  .111.1.1..                                  IF S7 # 1
L1054:  .1......11   → L1100                              THEN GO TO PRC4
L1055:  ..111...11   → L1070                        GO TO PRC3
L1056:  111.1.111.                     PRC11    :   A EXCHANGE C[W]
L1057:  ..1.1.1.11   → L1052                        GO TO PRC2
L1060:  ....11.1..                     DIG14    :   CLEAR STATUS
L1061:  ..11.1....                     TKRR1    :   KEYS → ROM ADDRESS
L1062:  ..........                     R9       :   NO OPERATION
L1063:  ..........                     R8       :   NO OPERATION
L1064:  ...1...1..                     R7       :   1 → S1
L1065:  ..11...1..                     R11      :   1 → S3
L1066:  ..1....1..                     R12      :   1 → S2
L1067:  .1..11.111   → L1115                        GO TO R13
L1070:  .1111..1..                     PRC3     :   0 → S7
L1071:  .11.1.11.1   → L1153                        JSB SUB
L1072:  11..1.1...                                  DOWN ROTATE
L1073:  .1..1.1...                                  C → STACK
L1074:  .1.11.1.1.                                  C − 1 → C[X]
L1075:  .1.11.1.1.                                  C − 1 → C[X]
L1076:  111..1...1   → L1344           DI       :   JSB DIV
L1077:  .1..11.1.1   → L1115                        JSB R13
L1100:  111..11..1   → L1346           PRC4     :   JSB MPY
L1101:  .1.11.1.1.                                  C − 1 → C[X]
L1102:  .1.11.1.1.                                  C − 1 → C[X]
L1103:  .1..11.1.1   → L1115                        JSB R13
L1104:  11..1.1...                     R100     :   DOWN ROTATE
L1105:  .1.11.1.1.                                  C −1 → C[X]
L1106:  .1.11.1.1.                                  C − 1 → C[X]
L1107:  1.111.111.                     ONE      :   0 → A[W]
L1110:  11111111.                                   A + 1 → A[S]
L1111:  1.11..111.                                  SHIFT RIGHT A[W]
L1112:  111.1.111.                                  A EXCHANGE C[W]
L1113:  11.1111111   → L1337                        GO TO RTN16
L1114:  .11.1.1...                     R14      :   STACK → A
L1115:  .....1....   → L0116   *****   R13      :   SELECT ROM 0
L1116:  ..11.1111.                     MSK20    :   0 → C[S]
L1117:  ..11.11.1.                                  0 → C[XS]
L1120:  1.1.1...1.                                  C + C → C[P]
L1121:  .1.11...11   → L1130                        IF NO CARRY GO TO
                                                    MSK16
L1122:  ..1..1..1.                                  B → C[WP]
L1123:  .1111.111.                                  C + 1 → C[W]
L1124:  .11.11111.                                  IF C[S] = 0
L1125:  .1.11...11   → L1130                              THEN GO TO MSK16
L1126:  1..1.1.11.                                  SHIFT RIGHT C[MS]
L1127:  1.1..1.11.                                  SHIFT RIGHT B[MS]
L1130:  111.1.111.                     MSK16    :   A EXCHANGE C[W]
L1131:  .11..1111.                                  C → A[S]
L1132:  1.1.1...11   → L1250                        GO TO MSKR0
L1133:  .111.1.1..                     SUM12    :   IF S7 # 1
L1134:  1.1.11.111   → L1255                              THEN GO TO SUM13
```

ROM 1 – Continued

```
L1135:  .1...1.1..                          IF S4 # 1
L1136:  1.1.1.1.11   → L1252                        THEN GO TO SUM14
L1137:  .11..1....   → L3140  *****                 SELECT ROM 3
L1140:  ..11..1.1.                 R      :  0 → C[X]
L1141:  ..11.1.1..                          IF S3 # 1
L1142:  1..1.11111   → L1227                        THEN GO TO RND1
L1143:  .1111.1.1.                          C + 1 → C[X]
L1144:  1.1.1.1.1.                          C + C → C[X]
L1145:  1.1.1.1.1.                          C + C → C[X]
L1146:  ..1..1.1..                 RN3    :  IF S2 # 1
L1147:  1..1.11111   → L1227                        THEN GO TO RND1
L1150:  ...1.1.1..                          IF S1 # 1
L1151:  1..111..11   → L1234                        THEN GO TO RND3
L1152:  1.1.....11   → L1240                GO TO SCIN
L1153:  ..1111111.                 SUB    :  0 – C – 1 → C[S]
L1154:  .1..1.111.                 ADD    :  A → B[W]
L1155:  1111111.1.                 ADD1   :  A + 1 → A[XS]
L1156:  1111111.1.                          A + 1 → A[XS]
L1157:  .111111.1.                          C + 1 → C[XS]
L1160:  .111111.1.                          C + 1 → C[XS]
L1161:  ...1..1.1.                          IF A >= C[X]
L1162:  .111.1..11   → L1164                        THEN GO TO ADD4
L1163:  111.1.111.                          A EXCHANGE C[W]
L1164:  1..11..11.                 ADD4   :  IF A[M] >= 1
L1165:  1111.11111   → L1367                        THEN GO TO ADD2
L1166:  .1111.1.11   → L1172                GO TO ADD7
L1167:  1.11...11.                 ADD3   :  SHIFT RIGHT A[M]
L1170:  1..11..11.                          IF A[M] >= 1
L1171:  11111...11   → L1370                        THEN GO TO ADD5
L1172:  .1.1111.1.                 ADD7   :  C – 1 → C[XS]
L1173:  .1.1111.1.                          C – 1 → C[XS]
L1174:  1.111.1.1.                          0 → A[X]
L1175:  111.11111.                          A EXCHANGE C[S]
L1176:  11.1.1111.                          A – C → A[S]
L1177:  1..111111.                          IF A[S] >= 1
L1200:  1....1..11   → L1204                        THEN GO TO ADD8
L1201:  1111.1.11.                          A + C → A[MS]
L1202:  11.1.1111.                          A – C → A[S]
L1203:  .1...1....   → L2204  *****                 SELECT ROM 2
L1204:  .1.1...11.                 ADD8   :  A – C → C[M]
L1205:  1....11111   → L1207                IF NO CARRY GO TO ADD9
L1206:  ..1.11.11.                          0 – C → C[MS]
L1207:  ..11...11.                 ADD9   :  C → A[M]
L1210:  .1...1....   → L2211  *****  ADD10  :  SELECT ROM 2
L1211:  ..........                          NO OPERATION
L1212:  ..........                          NO OPERATION
L1213:  ..........                          NO OPERATION
L1214:  .1111...1.                          C + 1 → C[P]
L1215:  ..11..1.1.                          0 → C[X]
L1216:  .1.111..1.                          C – 1 → C[WP]
L1217:  1...1.111.                          B EXCHANGE C[W]
L1220:  111.1.111.                          A EXCHANGE C[W]
L1221:  .....111..                          P – 1 → P
L1222:  .1..111.11   → L1116                GO TO MSK20
L1223:  ..........                          NO OPERATION
L1224:  ..........                          NO OPERATION
L1225:  ..........                          NO OPERATION
L1226:  ..........                          NO OPERATION
L1227:  ...1.1.1..                 RND1   :  IF S1 # 1
L1230:  1..11.1.11   → L1232                        THEN GO TO RND2
L1231:  .1111.1.1.                          C + 1 → C[X]
L1232:  ..1..1.1..                 RND2   :  IF S2 # 1
L1233:  1..1111.11   → L1236                        THEN GO TO RND4
L1234:  .1111.1.1.                 RND3   :  C + 1 → C[X]
L1235:  .1111.1.1.                          C + 1 → C[X]
L1236:  .....1....   → L0237  *****  RND4   :  SELECT ROM 0
L1237:  .11.....11   → L1140                GO TO R
L1240:  .....1....   → L0241  *****  SCIN   :  SELECT ROM 0
L1241:  11..1.1...                 MS11   :  DOWN ROTATE
L1242:  .111.1.1..                          IF S7 # 1
L1243:  111.1..111   → L1351                        THEN GO TO MS12
L1244:  .1111..1..                          0 → S7
L1245:  11.11..1.1   → L1331                JSB ROT1
L1246:  .1..1.1...                          C → STACK
L1247:  .....1...11  → L1010                GO TO SMULL11
L1250:  .11.1..1..                 MSKR0  :  0 → S6
L1251:  .....1....   → L0252  *****                 SELECT ROM 0
L1252:  ..1111111.                 SUM14  :  0 – C – 1 → C[S]
L1253:  .1111..1..                          0 → S7
L1254:  .1.....1..                          1 → S4
L1255:  .11.1.1...                 SUM13  :  STACK → A
L1256:  1...1..1..                          0 → S8
L1257:  .1..1.1...                          C → STACK
L1260:  .11.11...1   → L1154                JSB ADD
L1261:  11..1.1...                          DOWN ROTATE
L1262:  .11...111.                          C → A[W]
L1263:  111..11..1   → L1346                JSB MPY
L1264:  .1...1.1..                          IF S4 # 1
L1265:  1.11.11111   → L1267                        THEN GO TO SUM16
L1266:  ..1111111.                          0 – C – 1 → C[S]
L1267:  11.1.1...                  SUM16  :  STACK → A
L1270:  .1..1.1.                            C → STACK
L1271:  111.1.111.                          A EXCHANGE C[W]
L1272:  .1..111.1    → L1107                JSB ONE
```

ROM 1 – Continued

```
L1273:  .1...1.1..                            IF S4 # 1
L1274:  1.11111.11  →  L1276                        THEN GO TO SUM15
L1275:  .1.111111.                            C - 1 → C[S]
L1276:  .11.11...1  →  L1154        SUM15  :  JSB ADD
L1277:  11..1.1...                            DOWN ROTATE
L1300:  .11.1.1...                            STACK → A
L1301:  .11.11...1  →  L1154                  JSB ADD
L1302:  .1..1.1...                            C → STACK
L1303:  11..1.1...                            DOWN ROTATE
L1304:  11..1.1...                            DOWN ROTATE
L1305:  .1..11.111  →  L1115                  GO TO R13
L1306:  .1...111.1  →  L1107        MS14   :  JSB ONE
L1307:  .11.1.11.1  →  L1153                  JSB SUB
L1310:  1...1.111.                            B EXCHANGE C[W]
L1311:  11..1.1...                            DOWN ROTATE
L1312:  111.1.111.                            A EXCHANGE C[W]
L1313:  111..1...1  →  L1344                  JSB DIV
L1314:  1......1..                            1 → S8
L1315:  111111...1  →  L1374                  JSB SQR
L1316:  .11.1.1...                            STACK → A
L1317:  .1..1.1...                  MS17   :  C → STACK
L1320:  111.1.111.                            A EXCHANGE C[W]
L1321:  .1..11.111  →  L1115                  GO TO R13
L1322:  11..1.1...                  CSN    :  DOWN ROTATE
L1323:  11..1.1...                            DOWN ROTATE
L1324:  ..1111111.                            0 - C - 1 → C[S]
L1325:  11..1.1...                            DOWN ROTATE
L1326:  11..1.1...                            DOWN ROTATE
L1327:  11.1111111  →  L1337                  GO TO RTN16
L1330:  ..........                            NO OPERATION
L1331:  1...1.111.                  ROT1   :  B EXCHANGE C[W]
L1332:  11..1.1...                            DOWN ROTATE
L1333:  .11.1.1...                            STACK → A
L1334:  1...1.111.                            B EXCHANGE C[W]
L1335:  .1..1.1...                            C → STACK
L1336:  ..1...111.                            B → C[W]
L1337:  1...1.1...                  RTN16  :  DISPLAY OFF
L1340:  1111.1..11  →  L1364                  GO TO RTN9
L1341:  .1...1.1..                  RTN8   :  IF S4 # 1
L1342:  ...1...111  →  L1021                              T
L1343:  .11..1....  →  L3344  ***** RETR3  :  SELECT ROM 3
L1344:  111.11.11.                  DIV    :  A EXCHANGE C[MS]
L1345:  111..11111  →  L1347                  GO TO DIV12
L1346:  .1...1....  →  L2347  ***** MPY    :  SELECT ROM 2
L1347:  .1.1..1.1.                  DIV12  :  A - C → C[X]
L1350:  .1...1....  →  L2351  *****           SELECT ROM 2
L1351:  .11.1.1...                  MS12   :  STACK → A
L1352:  11.11..1.1  →  L1331                  JSB ROT1
L1353:  .1..1.1...                            C → STACK
L1354:  111.1.111.                            A EXCHANGE C[W]
L1355:  111..1...1  →  L1344                  JSB DIV
L1356:  11..1.1...                            DOWN ROTATE
L1357:  111..11..1  →  L1346                  JSB MPY
L1360:  .11.1.1...                            STACK → A
L1361:  .11.1.11.1  →  L1153                  JSB SUB
L1362:  11.11..1.1  →  L1331                  JSB ROT1
L1363:  11...11.11  →  L1306                  GO TO MS14
L1364:  .111.1.1..                  RTN9   :  IF S7 # 1
L1365:  ...111.111  →  L1035                        THEN GO TO RET11
L1366:  111....111  →  L1341                  GO TO RTN8
L1367:  111.1.111.                  ADD2   :  A EXCHANGE C[W]
L1370:  ...1..1.1.                  ADD5   :  IF A >= C[X]
L1371:  .1111.1.11  →  L1172                        THEN GO TO ADD7
L1372:  11111.1.1.                            A + 1 → A[X]
L1373:  .111.11111  →  L1167                  IF NO CARRY GO TO ADD3
L1374:  ...11..11.                  SQR    :  IF C[M] >= 1
L1375:  ....1.1.11  →  L1012                        THEN GO TO SQR1
L1376:  ....11....                            RETURN
```

ROM 2

```
L2000:  .....1....  →  L0001  ***** ERR21  :  SELECT ROM 0
L2001:  111...111.                  PMU23  :  A + B → A[W]
L2002:  .1.111111.                  PMU24  :  C - 1 → C[S]
L2003:  .......111  →  L2001                  IF NO CARRY GO TO PMU23
L2004:  111.1.111.                            A EXCHANGE C[W]
L2005:  .1...1.11.                            SHIFT LEFT A[MS]
L2006:  111.1.111.                            A EXCHANGE C[W]
L2007:  ..1111..11  →  L2074                  GO TO PQO23
L2010:  .11.1.1...                  XTY21  :  STACK → A
L2011:  .1..1.1...                            C → STACK
L2012:  111.1.111.                            A EXCHANGE C[W]
L2013:  1.111.111.                  LN22   :  0 → A[W]
L2014:  .11....1..                            1 → S6
L2015:  11.1...11.                            A - C → A[M]
L2016:  ........11  →  L2000                  IF NO CARRY GO TO ERR21
L2017:  1.11..111.                            SHIFT RIGHT A[W]
L2020:  .1.111111.                            C - 1 → C[S]
L2021:  ........11  →  L2000                  IF NO CARRY GO TO ERR21
L2022:  .11111111.                  LN25   :  C + 1 → C[S]
L2023:  .1..1.111.                  LN26   :  A → B[W]
```

ROM 2 – Continued

```
L2024:  ...1.11.11    →  L2026
L2025:  1.11.1..1.
L2026:  11.111111.
L2027:  ...1.1.111    →  L2025
L2030:  1.1111111.
L2031:  111...111.
L2032:  .11..1.1..
L2033:  .1.11.1.11    →  L2132
L2034:  11.11...1.
L2035:  ...1..1.11    →  L2022
L2036:  11..11..1.
L2037:  .1...1..1.
L2040:  111..1111.
L2041:  111....111    →  L2341
L2042:  .111..11..
L2043:  ..1111..11    →  L2074
L2044:  11111.1.1.
L2045:  1..1111.1.
L2046:  11.1111111    →  L2337
L2047:  11...1.11.
L2050:  ..1..1..11    →  L2044
L2051:  111..1.11.
L2052:  .1....111.
L2053:  .1.11.1.1.
L2054:  ..1..1.111    →  L2045
L2055:  1.11..111.
L2056:  ..11.1..1.
L2057:  111.1.1.1.
L2060:  .11.11111.
L2061:  ..11.1.111    →  L2065
L2062:  11..1.111.
L2063:  11....111.
L2064:  ..111.111.
L2065:  1.11..111.
L2066:  1...1..1..
L2067:  ..1111..11    →  L2074
L2070:  .11111111.
L2071:  11....111.
L2072:  ..111...11    →  L2070
L2073:  111...111.
L2074:  1...1.111.
L2075:  ..11..111.
L2076:  .1.11..11.
L2077:  .1...11...
L2100:  .1111..11.
L2101:  1..1..111.
L2102:  .1.11.11..
L2103:  11.1...111    →  L2321
L2104:  .11...11..
L2105:  1.1111..1.
L2106:  11.1..11..
L2107:  1...1.111.
L2110:  111.1.111.
L2111:  .11..11...
L2112:  .11....111    →  L2141
L2113:  1.111.11..
L2114:  1.1..11.11    →  L2246
L2115:  .11..11...
L2116:  1..1.11...
L2117:  ..11.11...
L2120:  ...1.11...
L2121:  .1...11...
L2122:  .111.11...
L2123:  ...1.11...
L2124:  1....11...
L2125:  .....11...
L2126:  .1.1.11...
L2127:  .11..11...
L2130:  1.11..11..
L2131:  11.1.11111    →  L2327
L2132:  11111...1.
L2133:  .1..1.111.
L2134:  .1.111111.
L2135:  ...1.11.11    →  L2026
L2136:  1.11.1..1.
L2137:  111.1.111.
L2140:  .1...1.11.
L2141:  111.1.111.
L2142:  11.111111.
L2143:  .1.11.1111    →  L2133
L2144:  11..1.111.
L2145:  11111...1.
L2146:  1...1..111    →  L2211
L2147:  1..1.1.11.
L2150:  .1....111.
L2151:  ..111..111    →  L2071
L2152:  1..11.11..
L2153:  .111.1..11    →  L2164
L2154:  .111..11..
L2155:  ..11.11...
L2156:  ..11.11...
L2157:  .....11...
L2160:  1....11...
L2161:  .1.1.11...
```

```
                GO TO ECA22
ECA21   :       SHIFT RIGHT A[WP]
ECA22   :       A − 1 → A[S]
                IF NO CARRY GO TO ECA21
                0 → A[S]
                A + B → A[W]
                IF S6 # 1
                   THEN GO TO EXP29
                A − 1 → A[P]
                IF NO CARRY GO TO LN25
                A EXCHANGE B[WP]
                SHIFT LEFT A[WP]
                A + B → A[S]
                IF NO CARRY GO TO LN24
                7 → P
                GO TO PQO23
PRE23   :       A + 1 → A[X]
PRE29   :       IF A[XS] >= 1
                   THEN GO TO PRE27
PRE24   :       A − B → A[MS]
                IF NO CARRY GO TO PRE23
                A + B → A[MS]
                SHIFT LEFT A[W]
                C − 1 → C[X]
                IF NO CARRY GO TO PRE29
PRE25   :       SHIFT RIGHT A[W]
                0 → C[WP]
                A EXCHANGE C[X]
PRE26   :       IF C[S] = 0
                   THEN GO TO PRE28
                A EXCHANGE B[W]
                A − B → A[W]
                0 − C − 1 → C[W]
PRE28   :       SHIFT RIGHT A[W]
                0 → S8
                GO TO PQO23
PQO15   :       C + 1 → C[S]
PQO16   :       A − B → A[W]
                IF NO CARRY GO TO PQO15
                A + B → A[W]
PQO23   :       B EXCHANGE C[W]
                0 → C[W]
                C − 1 → C[M]
                LOAD CONSTANT 4
                C + 1 → C[M]
PQO24   :       SHIFT RIGHT C[W]
                IF P # 5
                   THEN GO TO EXP35
                6 → P
                0 → A[WP]
                13 → P
                B EXCHANGE C[ W]
                A EXCHANGE C[W]
                LOAD CONSTANT 6
                GO TO EXP23
EXP32   :       IF P # 11
                   THEN GO TO EXP31
LNC2    :       LOAD CONSTANT 6
                LOAD CONSTANT 9
                LOAD CONSTANT 3
                LOAD CONSTANT 1
                LOAD CONSTANT 4
                LOAD CONSTANT 7
                LOAD CONSTANT 1
                LOAD CONSTANT 8
                LOAD CONSTANT 0
                LOAD CONSTANT 5
                LOAD CONSTANT 6
                11 → P
                GO TO LN35
EXP29   :       A + 1 → A[P]
EXP22   :       A → B[W]
                C − 1 → C[S]
                IF NO CARRY GO TO ECA22
                SHIFT RIGHT A[WP]
                A EXCHANGE C[W]
                SHIFT LEFT A[MS]
EXP23   :       A EXCHANGE C[W]
                A − 1 → A[S]
                IF NO CARRY GO TO EXP22
                A EXCHANGE B[W]
                A + 1 → A[P]
                IF NO CARRY GO TO NRM21
PQO21   :       SHIFT RIGHT C[MS]
                SHIFT LEFT A[W]
                GO TO PQO16
EXP34   :       IF P # 9
                   THEN GO TO EXP33
LNCD2   :       7 → P
                LOAD CONSTANT 3
                LOAD CONSTANT 3
                LOAD CONSTANT 0
                LOAD CONSTANT 8
                LOAD CONSTANT 5
```

ROM 2 – Continued

| | | | | | | |
|---|---|---|---|---|---|---|
| L2162: | 1..1..11.. | | | | | 9 → P |
| L2163: | 11.1.11111 | → | L2327 | | | GO TO LN35 |
| L2164: | 1.1.1.11.. | | | EXP33 | : | IF P # 10 |
| L2165: | .1..1.1111 | → | L2113 | | | THEN GO TO EXP32 |
| L2166: | 1..1..11.. | | | LNCD1 | : | 9 → P |
| L2167: | ..11.11... | | | | | LOAD CONSTANT 3 |
| L2170: | ...1.11... | | | | | LOAD CONSTANT 1 |
| L2171: | .....11... | | | | | LOAD CONSTANT 0 |
| L2172: | ...1.11... | | | | | LOAD CONSTANT 1 |
| L2173: | .111.11... | | | | | LOAD CONSTANT 7 |
| L2174: | 1..1.11... | | | | | LOAD CONSTANT 9 |
| L2175: | 1....11... | | | | | LOAD CONSTANT 8 |
| L2176: | ...1.11... | | | | | LOAD CONSTANT 1 |
| L2177: | 1.1...11.. | | | | | 10 → P |
| L2200: | 11.1.11111 | → | L2327 | | | GO TO LN35 |
| L2201: | 111..1.11. | | | MPY26 | : | A + B → A[MS] |
| L2202: | .1.11...1. | | | MPY27 | : | C – 1 → C[P] |
| L2203: | 1......111 | → | L2201 | | | IF NO CARRY GO TO MPY26 |
| L2204: | 1.11..111. | | | MPY28 | : | SHIFT RIGHT A[W] |
| L2205: | ....1111.. | | | | | P + 1 → P |
| L2206: | 11.11.11.. | | | | | IF P # 13 |
| L2207: | 1.....1.11 | → | L2202 | | | THEN GO TO MPY27 |
| L2210: | .1111.1.1. | | | | | C + 1 → C[X] |
| L2211: | 1.1111111. | | | NRM21 | : | 0 → A[S] |
| L2212: | 11....11.. | | | | | 12 → P |
| L2213: | 1..11...1. | | | NRM23 | : | IF A[P] >= 1 |
| L2214: | 1..1..1.11 | → | L2222 | | | THEN GO TO NRM24 |
| L2215: | .1....111. | | | | | SHIFT LEFT A[W] |
| L2216: | .1.11.1.1. | | | | | C – 1 → C[X] |
| L2217: | 1..11.111. | | | | | IF A[W] >= 1 |
| L2220: | 1...1.1111 | → | L2213 | | | THEN GO TO NRM23 |
| L2221: | ..11..111. | | | | | 0 → C[W] |
| L2222: | 111.1.1.1. | | | NRM24 | : | A EXCHANGE C[X] |
| L2223: | 1.1.111.1. | | | | | C + C → C[XS] |
| L2224: | 1..1.11.11 | → | L2226 | | | IF NO CARRY GO TO NRM29 |
| L2225: | 11111.11. | | | | | A + 1 → A[MS] |
| L2226: | 111.1.1.1. | | | NRM29 | : | A EXCHANGE C[X] |
| L2227: | 1..111111. | | | | | IF A[S] >= 1 |
| L2230: | 1....1..11 | → | L2204 | | | THEN GO TO MPY28 |
| L2231: | 111.1..11. | | | | | A EXCHANGE C[M] |
| L2232: | .11...111. | | | NRM25 | : | C → A[W] |
| L2233: | 1....1.1.. | | | | | IF S8 # 1 |
| L2234: | 11.1111.11 | → | L2336 | | | THEN GO TO NRM26 |
| L2235: | .11..1.1.. | | | | | IF S6 # 1 |
| L2236: | 1.1..11.11 | → | L2246 | | | THEN GO TO EXP31 |
| L2237: | .11.1..1.. | | | | | 0 → S6 |
| L2240: | 1..1.1.1.. | | | | | IF S9 # 1 |
| L2241: | 111..1.111 | → | L2345 | | | THEN GO TO XTY32 |
| L2242: | ..11..111. | | | | | 0 → C[W] |
| L2243: | .....111.. | | | | | P – 1 → P |
| L2244: | .1.1.11... | | | | | LOAD CONSTANT 5 |
| L2245: | 111..11111 | → | L2347 | | | GO TO MPY21 |
| L2246: | 11..1.11.. | | | EXP31 | : | IF P # 12 |
| L2247: | 11.1.11111 | → | L2327 | | | THEN GO TO LN35 |
| L2250: | ..11..111. | | | LNC10 | : | 0 → C[W] |
| L2251: | ..1..11... | | | | | LOAD CONSTANT 2 |
| L2252: | ..11.11... | | | | | LOAD CONSTANT 3 |
| L2253: | .....11... | | | | | LOAD CONSTANT 0 |
| L2254: | ..1..11... | | | | | LOAD CONSTANT 2 |
| L2255: | .1.1.11... | | | | | LOAD CONSTANT 5 |
| L2256: | 1....11... | | | | | LOAD CONSTANT 8 |
| L2257: | .1.1.11... | | | | | LOAD CONSTANT 5 |
| L2260: | .....11... | | | | | LOAD CONSTANT 0 |
| L2261: | 1..1.11... | | | | | LOAD CONSTANT 9 |
| L2262: | ..11.11... | | | | | LOAD CONSTANT 3 |
| L2263: | 11....11.. | | | | | 12 → P |
| L2264: | 111.1.111. | | | | | A EXCHANGE C[W] |
| L2265: | .11..1.1.. | | | | | IF S6 # 1 |
| L2266: | 11..1...11 | → | L2310 | | | THEN GO TO PRE21 |
| L2267: | .1.1..111. | | | | | A – C → C[W] |
| L2270: | .....11.1. | | | | | IF B[XS] = 0 |
| L2271: | 1.111.1111 | → | L2273 | | | THEN GO TO LN27 |
| L2272: | .1.1..111. | | | | | A – C → C[W] |
| L2273: | 11..1.111. | | | LN27 | : | A EXCHANGE B[W] |
| L2274: | .....111.. | | | LN28 | : | P – 1 → P |
| L2275: | .1....111. | | | | | SHIFT LEFT A[W] |
| L2276: | ...11.11.. | | | | | IF P # 1 |
| L2277: | 1.1111..11 | → | L2274 | | | THEN GO TO LN28 |
| L2300: | 111.1.111. | | | | | A EXCHANGE C[W] |
| L2301: | .11.11111. | | | | | IF C[S] = O |
| L2302: | 11...1..11 | → | L2304 | | | THEN GO TO LN29 |
| L2303: | ..111..11. | | | | | 0 – C – 1 → C[M] |
| L2304: | .1111.1.1. | | | LN29 | : | C + 1 → C[X] |
| L2305: | ....1.1... | | | | | DISPLAY TOGGLE |
| L2306: | 1.11..11.. | | | | | 11 → P |
| L2307: | 1.....1.11 | → | L2202 | | | GO TO MPY27 |
| L2310: | .1..1.111. | | | PRE21 | : | A → B[W] |
| L2311: | .11....11. | | | | | C → A[M] |
| L2312: | 1.1.111.1. | | | | | C + C → C[XS] |
| L2313: | ..1..11111 | → | L2047 | | | IF NO CARRY GO TO PRE24 |
| L2314: | .111111.1. | | | | | C + 1 → C[XS] |
| L2315: | 1.11..111. | | | PRE22 | : | SHIFT RIGHT A[W] |
| L2316: | .1111.1.1. | | | | | C + 1 → C[X] |
| L2317: | 11..11.111 | → | L2315 | | | IF NO CARRY GO TO PRE22 |

ROM 2 – Continued

```
208  L2320:  ..11....11   → L2060                     GO TO PRE26
209  L2321:  1...1.11..                 EXP35     :   IF P # 8
210  L2322:  .11.1.1.11   → L2152                         THEN GO TO EXP34
211  L2323:  .1.1..11..                 LNCD3     :   5 → P
212  L2324:  ..11.11...                               LOAD CONSTANT 3
213  L2325:  ..11.11...                               LOAD CONSTANT 3
214  L2326:  1.....11..                               8 → P
215  L2327:  1...1.111.                 LN35      :   B EXCHANGE C[W]
216  L2330:  .11..1.1..                               IF S6 # 1
217  L2331:  .11..11111   → L2147                         THEN GO TO PQO21
218  L2332:  1.11..111.                               SHIFT RIGHT A[W]
219  L2333:  ....1111..                               P + 1 → P
220  L2334:  ....1111..                               P + 1 → P
221  L2335:  ......1.11   → L2002                     GO TO PMU24
222  L2336:  ..1..1....   → L1337  *****  NRM26     :   SELECT ROM 1
223  L2337:  11111..11.                 PRE27     :   A + 1 → A[M]
224  L2340:  ..1.11.111   → L2055                     IF NO CARRY GO TO PRE25
225  L2341:  11..11111.                 LN24      :   A EXCHANGE B[S]
226  L2342:  1..1.1.11.                               SHIFT RIGHT C[MS]
227  L2343:  111111111.                               A + 1 → A[S]
228  L2344:  ...1..1111   → L2023                     IF NO CARRY GO TO LN26
229  L2345:  11..1.1...                 XTY32     :   DOWN ROTATE
230  L2346:  .1..1.1...                               C → STACK
231  L2347:  ..11..11..                 MPY21     :   3 → P
232  L2350:  .111..1.1.                 MPY22     :   A + C → C[X]
233  L2351:  .1.1.1111.                 DIV21     :   A − C → C[S]
234  L2352:  111.11..11   → L2354                     IF NO CARRY GO TO DIV22
235  L2353:  ..1.11111.                               0 − C → C[S]
236  L2354:  11..1.111.                 DIV22     :   A EXCHANGE B[W]
237  L2355:  1.111.111.                               0 → A[W]
238  L2356:  .1..11111.                               A → B[S]
239  L2357:  11..1.11..                               IF P # 12
240  L2360:  1......1.11  → L2202                         THEN GO TO MPY27
241  L2361:  .......11.                               IF B[M] = 0
242  L2362:  ........11   → L2000                         THEN GO TO ERR21
243  L2363:  111.11..1.                 DIV23     :   A EXCHANGE C[WP]
244  L2364:  1111.11.11   → L2366                     GO TO DIV15
245  L2365:  .1111...1.                 DIV14     :   C + 1 → C[P]
246  L2366:  11...1.11.                 DIV15     :   A − B → A[MS]
247  L2367:  1111.1.111   → L2365                     IF NO CARRY GO TO DIV14
248  L2370:  111..1.11.                               A + B → A[MS]
249  L2371:  .1...1.11.                               SHIFT LEFT A[MS]
250  L2372:  .....111..                 DIV16     :   P − 1 → P
251  L2373:  ....1.11..                               IF P # 0
252  L2374:  1111.11.11   → L2366                         THEN GO TO DIV15
253  L2375:  .11..1111.                               C → A[S]
254  L2376:  111.1.111.                               A EXCHANGE C[W]
255  L2377:  1...1..111   → L2211                     GO TO NRM21
```

ROM 3

```
 0   L3000:  .1...11..1   → L3106         FVR47       JSB ONE
 1   L3001:  111.1.111.                               A EXCHANGE C[W]
 2   L3002:  111...11.1   → L3343                     JSB DIV
 3   L3003:  ...1.1..11   → L3024                     GO TO FVR48
 4   L3004:  1.......1..                XTY       :   1 → S8
 5   L3005:  ..1..1....   → L1006  *****              SELECT ROM 1
 6   L3006:  1...1..1..                 LN        :   0 → S8
 7   L3007:  ....1..111   → L3011                     GO TO SQR1
 8   L3010:  1.......1..                SQR       :   1 → S8
 9   L3011:  ..1..1....   → L1012  *****  SQR1      :   SELECT ROM 1
10   L3012:  111..1.1.1   → L3345       N46       :   JSB MPY
11   L3013:  .1...11..1   → L3106                     JSB ONE
12   L3014:  1.11.1.1..                               IF S11 # 1
13   L3015:  ..1111.111   → L3075                         THEN GO TO N42
14   L3016:  .11.1.11.1   → L3153                     JSB ADD
15   L3017:  .....11..1   → L3006       N44       :   JSB LN
16   L3020:  11..1.1...                               DOWN ROTATE
17   L3021:  .....11..1   → L3006                     JSB LN
18   L3022:  .1...11..1   → L3106                     JSB ONE
19   L3023:  .1.11..111   → L3131                     GO TO N48
20   L3024:  .11.1.1...                 FVR48     :   STACK → A
21   L3025:  .1..1.1...                               C → STACK
22   L3026:  11.11..1.1   → L3331                     JSB S12
23   L3027:  .1.1111.11   → L3136                     GO TO P47
24   L3030:  1.111..1..                 FV40      :   0 → S11
25   L3031:  11..11..11   → L3314                     GO TO FV46
26   L3032:  .1...1..11   → L3104       PV40      :   GO TO PV41
27   L3033:  11..1.1.11   → L3312       PMT40     :   GO TO PMT42
28   L3034:  .11.11.111   → L3155       ROR40     :   GO TO FVR
29   L3035:  ..........                               NO OPERATION
30   L3036:  .11...111.                 N40       :   C → A[W]
31   L3037:  11..1.1...                               DOWN ROTATE
32   L3040:  1111.1.111   → L3365                     GO TO N41
33   L3041:  .1...1.1..                 N5        :   IF S4 # 1
34   L3042:  1111.1..11   → L3364                         THEN GO TO SELR4
35   L3043:  ..11.1....                 TKRR3     :   KEYS → ROM ADDRESS
36   L3044:  ..........                               NO OPERATION
37   L3045:  11..1.1...                 CASH1     :   DOWN ROTATE
38   L3046:  ...1.1.1...                              C EXCHANGE M
39   L3047:  11..1.1...                               DOWN ROTATE
```

```
L3050:  .1..1.1...                            C → STACK
L3051:  .1....11.1   → L3103                  JSB R100
L3052:  .11.1.11.1   → L3153                  JSB ADD
L3053:  .11.1.1...                            STACK → A
L3054:  .1..1.1...                            C → STACK
L3055:  111.1.111.                            A EXCHANGE C[W]
L3056:  .1...11..1   → L3106                  JSB ONE
L3057:  .11.1.11.1   → L3153                  JSB ADD
L3060:  .....1...1   → L3004                  JSB XTY
L3061:  11..1.1...                            DOWN ROTATE
L3062:  .1..1.1...                            C → STACK
L3063:  11..1.1...                            DOWN ROTATE
L3064:  11..1.1...                            DOWN ROTATE
L3065:  111.1.11.                             A EXCHANGE C[W]
L3066:  111...11.1   → L3343                  JSB DIV
L3067:  1.1.1.1...                            M → C
L3070:  .11.1.11.1   → L3153                  JSB ADD
L3071:  1.1.1..1..                 R13    :   0 → S10
L3072:  1.111..1..                            0 → S11
L3073:  .1..11.111   → L3115                  GO TO R14
L3074:  ..........                            NO OPERATION
L3075:  111.1.111.                 N42    :   A EXCHANGE C[W]
L3076:  .11.1.1..1   → L3152                  JSB SUB
L3077:  11..1.111.                            A EXCHANGE B[W]
L3100:  111...11.1   → L3343                  JSB DIV
L3101:  ....111111   → L3017                  GO TO N44
L3102:  ..........                            NO OPERATION
L3103:  ..1..1....   → L1104  *****  R100   :   SELECT ROM 1
L3104:  1.111..1..                 PV41   :   0 → S11
L3105:  .1..1...11   → L3110                  GO TO PV42
L3106:  ..1..1....   → L1107  ****** ONE    :   SELECT ROM 1
L3107:  1.11...1..                 PV46   :   1 → S11
L3110:  11.1...1.1   → L3321       PV42   :   JSB CSN
L3111:  .1....11.1   → L3103       PV49   :   JSB R100
L3112:  .11.1.11.1   → L3153                  JSB ADD
L3113:  11.11....1   → L3330                  JSB ROT1
L3114:  .1..111.11   → L3116                  GO TO PV48
L3115:  .....1....   → L0116  *****  R14    :   SELECT ROM 0
L3116:  .....1...1   → L3004       PV48   :   JSB XTY
L3117:  .1...11..1   → L3106                  JSB ONE
L3120:  111.1.111.                            A EXCHANGE C[W]
L3121:  1.1..1.1..                 PV43   :   IF S10 # 1
                                                    THEN GO TO PV44
L3122:  .1.111..11   → L3134
L3123:  .11.1.1..1   → L3152                  JSB SUB
L3124:  11..1.1...                            DOWN ROTATE
L3125:  11..1.1...                            DOWN ROTATE
L3126:  11..1.1...                            DOWN ROTATE
L3127:  1.11.1.1..                            IF S11 # 1
                                                    THEN GO TO PV45
L3130:  .1.11.1.11   → L3132
L3131:  111.1.111.                 N48    :   A EXCHANGE C[W]
L3132:  111...11.1   → L3343       PV45   :   JSB DIV
L3133:  .11.1.1...                            STACK → A
L3134:  .11.1.1...                 PV44   :   STACK → A
L3135:  .11.1.1...                            STACK → A
L3136:  111..1.1.1   → L3345       P47    :   JSB MPY
L3137:  ..111..111   → L3071                  GO TO R13
L3140:  1.1..1.1..                 CASH   :   IF S10 # 1
                                                    THEN GO TO CASH1
L3141:  ..1..1.111   → L3045
L3142:  .1..1..1..                            0 → S4
L3143:  1....1....   → L4144  *****           SELECT ROM 4
L3144:  .1111.1.1.                 FVR49  :   C + 1 → C[X]
L3145:  111...11.1   → L3343                  JSB DIV
L3146:  .1...11..1   → L3106                  JSB ONE
L3147:  .11.1.11.1   → L3153                  JSB ADD
L3150:  .11.1.1...                            STACK → A
L3151:  .111.11111   → L3167                  GO TO FVR43
L3152:  ..1..1....   → L1153  *****  SUB    :   SELECT ROM 1
L3153:  ..1..1....   → L1154  *****  ADD    :   SELECT ROM 1
L3154:  ..1..1....   → L1155  *****  ADD1   :   SELECT ROM 1
L3155:  1.11.1.1..                 FVR    :   IF S11 # 1
                                                    THEN GO TO FV42
L3156:  111.....11   → L3340
L3157:  1.111..1..                            0 → S11
L3160:  1.1..1.1..                            IF S10 # 1
                                                    THEN GO TO FVR1
L3161:  1.111.1111   → L3273
L3162:  11.1...1.1   → L3321       FVR3   :   JSB CSN
L3163:  ..1111111.                            0 – C – 1 → C[S]
L3164:  .1..1.1...                 FVR2   :   C → STACK
L3165:  .11.1.1...                            STACK → A
L3166:  11..1.1...                            DOWN ROTATE
L3167:  111...11.1   → L3343       FVR43  :   JSB DIV
L3170:  ..1.1.1...                            C EXCHANGE M
L3171:  11..1.1...                            DOWN ROTATE
L3172:  .1..1.1...                            C → STACK
L3173:  .1...11..1   → L3106                  JSB ONE
L3174:  .11.1.11.1   → L3153                  JSB ADD
L3175:  11..1.111.                            A EXCHANGE B[W]
L3176:  111..1.1.1   → L3345                  JSB MPY
L3177:  ..1.1.1...                            C EXCHANGE M
L3200:  .11.1.1...                            STACK → A
L3201:  .1..1.1...                            C → STACK
L3202:  11.1...1.1   → L3321                  JSB CSN
L3203:  11..1.1...                            DOWN ROTATE
L3204:  .11.1.1..1   → L3152                  JSB SUB
L3205:  .11.1.11.1   → L3153                  JSB ADD
```

ROM 3 – Continued

| | | | | | | |
|---|---|---|---|---|---|---|
| 134 | L3206: | ..1.1.1... | | | | C EXCHANGE M |
| 135 | L3207: | 111...11.1 | →L3343 | | | JSB DIV |
| 136 | L3210: | ..1.1.1... | | | | C EXCHANGE M |
| 137 | L3211: | 11..1.1... | | | FVR44 : | DOWN ROTATE |
| 138 | L3212: | ..1.1.1... | | | | C EXCHANGE M |
| 139 | L3213: | .11.1.1... | | | | STACK → A |
| 140 | L3214: | .1...11..1 | →L3106 | | | JSB ONE |
| 141 | L3215 | .11.1.11.1 | →L3153 | | | JSB ADD |
| 142 | L3216: | .1..1.1... | | | | C → STACK |
| 143 | L3217: | .1..1.1... | | | | C → STACK |
| 144 | L3220: | ..1...111. | | | | B → C[W] |
| 145 | L3221: | ..1.1.1... | | | | C EXCHANGE M |
| 146 | L3222: | .....1...1 | →L3004 | | | JSB XTY |
| 147 | L3223: | 11..1.1... | | | | DOWN ROTATE |
| 148 | L3224: | .1..1.1... | | | | C → STACK |
| 149 | L3225: | 111..1.1.1 | →L3345 | | | JSB MPY |
| 150 | L3226: | ..1...111. | | | | B → C[W] |
| 151 | L3227: | 11..1.1... | | | | DOWN ROTATE |
| 152 | L3230: | 11..1.1... | | | | DOWN ROTATE |
| 153 | L3231: | 111...11.1 | →L3343 | | | JSB DIV |
| 154 | L3232: | 11..1.1... | | | | DOWN ROTATE |
| 155 | L3233: | 11..1.1... | | | | DOWN ROTATE |
| 156 | L3234: | .1...11..1 | →L3106 | | | JSB ONE |
| 157 | L3235: | .11.1.1..1 | →L3152 | | | JSB SUB |
| 158 | L3236: | 1.1.1.1... | | | | M → C |
| 159 | L3237: | 111...11.1 | →L3343 | | | JSB DIV |
| 160 | L3240: | 11..1.1... | | | | DOWN ROTATE |
| 161 | L3241: | 11..1.1... | | | | DOWN ROTATE |
| 162 | L3242: | .11.1.1..1 | →L3152 | | | JSB SUB |
| 163 | L3243: | .11.1.1... | | | | STACK → A |
| 164 | L3244: | .1..1.1... | | | | C → STACK |
| 165 | L3245: | 1...1.111. | | | | B EXCHANGE C[W] |
| 166 | L3246: | .11.1.11.1 | →L3153 | | | JSB ADD |
| 167 | L3247: | 11..1.1... | | | | DOWN ROTATE |
| 168 | L3250: | 1...1.111. | | | | B EXCHANGE C[W] |
| 169 | L3251: | 11..1.1... | | | | DOWN ROTATE |
| 170 | L3252: | 1...1.111. | | | | B EXCHANGE C[W] |
| 171 | L3253: | 111...11.1 | →L3343 | | | JSB DIV |
| 172 | L3254: | 1.1.1.1... | | | | M → C |
| 173 | L3255: | 111..1.1.1 | →L3345 | | | JSB MPY |
| 174 | L3256: | ..1.1.1... | | | | C EXCHANGE M |
| 175 | L3257: | .11.1.11.1 | →L3153 | | | JSB ADD |
| 176 | L3260: | ..1.1.1... | | | | C EXCHANGE M |
| 177 | L3261: | .11...111. | | | | C → A[W] |
| 178 | L3262: | 111.11...1 | →L3354 | | | JSB TEN6 |
| 179 | L3263: | 1..1111.1. | | | | IF A[XS]>= 1 |
| | | | | | | THEN GO TO FVR46 |
| 180 | L3264: | 11.1..1.11 | →L3322 | | | |
| 181 | L3265: | 1...1..111 | →L3211 | | | GO TO FVR44 |
| 182 | L3266: | 111..1.1.1 | →L3345 | | FVR49 : | JSB MPY |
| 183 | L3267: | 11.11..1.1 | →L3331 | | | JSB S12 |
| 184 | L3270: | .1111.1.1. | | | | C + 1 → C[X] |
| 185 | L3271: | 1.11...1.. | | | | 1 → S11 |
| 186 | L3272: | .11..1..11 | →L3144 | | | GO TO FVR49 |
| 187 | L3273: | .11.1.1... | | | FVR1 : | STACK → A |
| 188 | L3274: | 111.1.111. | | | | A EXCHANGE C[W] |
| 189 | L3275: | 111...11.1 | →L3343 | | | JSB DIV |
| 190 | L3276: | .11.1.1... | | | | STACK → A |
| 191 | L3277: | .1..1.1... | | | | C → STACK |
| 192 | L3300: | 111.1.111. | | | | A EXCHANGE C[W] |
| 193 | L3301: | .1...11..1 | →L3106 | | | JSB ONE |
| 194 | L3302: | 111.1.111. | | | | A EXCHANGE C[W] |
| 195 | L3303: | 111...11.1 | →L3343 | | | JSB DIV |
| 196 | L3304: | .....1...1 | →L3304 | | | JSB XTY |
| 197 | L3305: | .1...11..1 | →L3016 | | | JSB ONE |
| 198 | L3306: | .11.1.1..1 | →l3152 | | | JSB SUB |
| 199 | L3307: | .1111.1.1. | | | | C + 1 → C[X] |
| 200 | L3310: | .1111.1.1. | | | | C + 1 → C[X] |
| 201 | L3311: | ..111..1.1 | →L3071 | | | JSB R13 |
| 202 | L3312: | 1.11.1.1.. | | | PNT42 : | IF S11 # 1 |
| | | | | | | THEN GO TO PV46 |
| 203 | L3313: | .1...11111 | →L3107 | | | |
| 204 | L3314: | 1.1..1.1.. | | | FV46 : | IF S10 # 1 |
| | | | | | | THEN GO TO PV49 |
| 205 | L3315: | .1..1..111 | →L3111 | | | |
| 206 | L3316: | ..1111111. | | | | 0 – C – 1 → C[S] |
| 207 | L3317: | .1..1..1.1 | →L3111 | | | JSB PV49 |
| 208 | L3320: | .......... | | | | NO OPERATION |
| 209 | L3321: | ..1..1.... | →L1322 | ***** | CSN : | SELECT ROM 1 |
| 210 | L3322: | 1.11.1.1.. | | | FVR46 : | IF S11 # 1 |
| | | | | | | THEN GO TO R13 |
| 211 | L3323: | ..111..111 | →L3071 | | | |
| 212 | L3324: | 11..1.1... | | | | DOWN ROTATE |
| 213 | L3325: | 11..1.1... | | | | DOWN ROTATE |
| 214 | L3326: | 11..1.1... | | | | DOWN ROTATE |
| 215 | L3327: | ........11 | →L3000 | | | GO TO FVR47 |
| 216 | L3330: | ..1..1.... | →L1331 | ***** | ROT1 : | SELECT ROM 1 |
| 217 | L3331: | ..11..111. | | | S12 : | 0 → C[W] |
| 218 | L3332: | .1111...1. | | | | C + 1 → C[P] |
| 219 | L3333: | .11111111. | | | | C + 1 → C[S] |
| 220 | l3334: | 1.1.11..1. | | | | C + C → C[WP] |
| 221 | L3335: | 1..1.1.11. | | | | SHIFT RIGHT C[MS] |
| 222 | L3336: | .1111.1.1. | | | | C + 1 → C[X] |
| 223 | L3337: | ....11.... | | | | RETURN |
| 224 | L3340: | 1.1..1.1.. | | | FV42 : | IF S10 # 1 |
| | | | | | | THEN GO TO FVR4 |
| 225 | L3341: | 111..11.11 | →L3346 | | | |
| 226 | L3342: | .111.1..11 | →L3164 | | | GO TO FVR2 |
| 227 | L3343: | ..1..1.... | →L1344 | ***** | DIV : | SELECT ROM 1 |

ROM 3 – Continued

| | | | | | | | |
|---|---|---|---|---|---|---|---|
| 228 | L3344: | ....11.... | | | TRN16 | : | RETURN |
| 229 | L3345: | ..1..1.... | →L1346 | ***** | MPY | : | SELECT ROM 1 |
| 230 | L3346: | 111.1.111. | | | FVR4 | : | A EXCHANGE C[W] |
| 231 | L3347: | 11..1.1... | | | | | DOWN ROTATE |
| 232 | L3350: | .1..1.1... | | | | | C → STACK |
| 233 | L3351: | .1..1.1... | | | | | C → STACK |
| 234 | L3352: | .1..1.1... | | | | | C → STACK |
| 235 | L3353: | 1.11.11.11 | →L3266 | | | | GO TO FVR9 |
| 236 | L3354: | 1.1.1.1... | | | TEN6 | : | M → C |
| 237 | L3355: | .1111.1.1. | | | | | C + 1 → C[X] |
| 238 | L3356: | .1111.1.1. | | | | | C + 1 → C[X] |
| 239 | L3357: | 11111.1.1. | | | | | A + 1 → A[X] |
| 240 | L3360: | 11111.1.1. | | | | | A + 1 → A[X] |
| 241 | L3361: | 11111.1.1. | | | | | A + 1 → A[X] |
| 242 | L3362: | 11111.1.1. | | | | | A + 1 → A[X] |
| 243 | L3363: | ....11.... | | | | | RETURN |
| 244 | L3364: | 1....1.... | →L4365 | ***** | SELR4 | : | SELECT ROM 4 |
| 245 | L3365: | 111...11.1 | →L3343 | | N41 | : | JSB DIV |
| 246 | L3366: | .1....11.1 | →L3103 | | | | JSB R1000 |
| 247 | L3367: | .11.1.11.1 | →L3153 | | | | JSB ADD |
| 248 | L3370: | 11..1.1... | | | | | DOWN ROTATE |
| 249 | L3371: | .11.1.1... | | | | | STACK → A |
| 250 | L3372: | .11.1.1... | | | | | STACK → A |
| 251 | L3373: | 1...1.111. | | | | | B EXCHANGE C[W] |
| 252 | L3374: | 111.1.111. | | | | | A EXCHANGE C[W] |
| 253 | L3375: | 1.1..1.1.. | | | | | IF S10 # 1 |
| 254 | L3376: | ....111111 | →L3017 | | | | THEN GO TO N44 |
| 255 | L3377: | ....1.1.11 | →L3012 | | | | GO TO N46 |

ROM 4

| | | | | | | | |
|---|---|---|---|---|---|---|---|
| 0 | L4000: | .....1.... | →L0001 | ***** | ERROR | : | SELECT ROM 0 |
| 1 | L4001: | .......... | | | | | NO OPERATION |
| 2 | L4002: | .......... | | | | | NO OPERATION |
| 3 | L4003: | .11..1.... | →L3004 | ***** | XTY | : | SELECT ROM 3 |
| 4 | L4004: | ....11.... | | | RETUR1 | : | RETURN |
| 5 | L4005: | ....111..1 | →L4016 | | SOD2 | : | JSB DOWN3 |
| 6 | L4006: | .111...1.. | | | | | 1 → S7 |
| 7 | L4007: | .1..1..1.. | | | | | 0 → S4 |
| 8 | L4010: | .1...11..1 | →L4106 | | | | JSB ONE |
| 9 | L4011: | .11.1.11.1 | →L4153 | | | | JSB ADD |
| 10 | L4012: | ..1....111 | →L4041 | | | | GO TO SOD3 |
| 11 | L4013: | .11.1.1... | | | STA1 | : | STACK → A |
| 12 | L4014: | .1..1.1... | | | | | C → STACK |
| 13 | L4015: | ....11.... | | | | | RETURN |
| 14 | L4016: | 11..1.1... | | | DOWN3 | : | DOWN ROTATE |
| 15 | L4017: | 11..1.1... | | | DOWN2 | : | DOWN ROTATE |
| 16 | L4020: | 11..1.1... | | | | | DOWN ROTATE |
| 17 | L4021: | ....11.... | | | | | RETURN |
| 18 | L4022: | .1.1.1.1.. | | | | | IF S5 # 1 |
| 19 | L4023: | .....1..11 | →L4004 | | | | THEN GO TO RETUR1 |
| 20 | L4024: | 1.1..1.... | →L5025 | ***** | | | SELECT ROM 5 |
| 21 | L4025: | .111.1.1.. | | | SOD | : | IF S7 # 1 |
| 22 | L4026: | .....1.111 | →L4005 | | | | THEN GO TO SOD2 |
| 23 | L4027: | ...1111111 | →L4037 | | | | GO TO SOD6 |
| 24 | L4030: | ........11 | →L4000 | | FV | : | GO TO ERROR |
| 25 | L4031: | .......... | | | | | NO OPERATION |
| 26 | L4032: | 1.1..1.... | →L5033 | ***** | PV | : | SELECT ROM 5 |
| 27 | L4033: | 1111.11.11 | →L4366 | | PMT | : | GO TO DNOTE1 |
| 28 | L4034: | .1.1...1.. | | | R | : | 1 → S5 |
| 29 | L4035: | 1.1..1.... | →L5036 | ***** | | | SELECT ROM 5 |
| 30 | L4036: | ........11 | →L4000 | | N | : | GO TO ERROR |
| 31 | L4037: | .1...1.1.. | | | SOD6 | : | IF S4 # 1 |
| 32 | L4040: | 111..11111 | →L4347 | | | | THEN GO TO SOD1 |
| 33 | L4041: | 11..1.1... | | | SOD3 | : | DOWN ROTATE |
| 34 | L4042: | .1..1..1.. | | | SOD5 | : | 0 → S4 |
| 35 | L4043: | .11.1.1... | | | | | STACK → A |
| 36 | L4044: | 11..1.1... | | | | | DOWN ROTATE |
| 37 | L4045: | .11...111. | | | | | C → A[W] |
| 38 | L4046: | ....1111.1 | →L4017 | | | | JSB DOWN2 |
| 39 | L4047: | .11.1.1..1 | →L4152 | | | | JSB SUB |
| 40 | L4050: | ....1.11.1 | →L4013 | | | | JSB STA1 |
| 41 | L4051: | .1...11..1 | →L4106 | | | | JSB ONE |
| 42 | L4052: | .1.11.1.11 | →L4132 | | | | GO TO SOD4 |
| 43 | L4053: | ...1.1.111 | →L4025 | | DEPR | : | GO TO SOD |
| 44 | L4054: | .111.1.1.. | | | TRND1 | : | IF S7 # 1 |
| 45 | L4055: | ..11..1.11 | →L4062 | | | | THEN GO TO TRND5 |
| 46 | L4056: | .1...1.1.. | | | | | IF S4 # 1 |
| 47 | L4057: | .11.11.111 | →L4155 | | | | THEN GO TO TRND3 |
| 48 | L4060: | .1..1..1.. | | | | | 0 → S4 |
| 49 | L4061: | 1..11..111 | →L4231 | | | | GO TO TRND8 |
| 50 | L4062: | .111...1.. | | | TRND5 | : | 1 → S7 |
| 51 | L4063: | .1...1.1.. | | | | | IF S4 # 1 |
| 52 | L4064: | .1...11111 | →L4107 | | | | THEN GO TO TRND4 |
| 53 | L4065: | .1..1..1.. | | | | | 0 → S4 |
| 54 | L4066: | 11..1.1... | | | | | DOWN ROTATE |
| 55 | L4067: | 1..1.1.111 | →L4225 | | | | GO TO TRND2 |
| 56 | L4070: | .11..1.... | →L3071 | ***** | R13 | : | SELECT ROM 3 |
| 57 | L4071: | 111.1.111. | | | L360 | : | A EXCHANGE C[W] |
| 58 | L4072: | ..11..111. | | | | | 0 → C[W] |
| 59 | L4073: | ..11.11... | | | | | LOAD CONSTANT 3 |
| 60 | L4074: | .11..11... | | | | | LOAD CONSTANT 6 |

ROM 4–Continued

```
L4075:  .1111.1.1.                               C + 1 → C[X]
L4076:  .1111.1.1.                               C + 1 → C[X]
L4077:  ....11....                               RETURN
L4100:  .11.1.1..1  → L4152          DNOTE4  :   JSB SUB
L4101:  ....1.11.1  → L4013                      JSB STA1
L4102:  1.1..1....  → L5103  *****               SELECT ROM 5
L4103:  ..1..1....  → L1104  *****   R100    :   SELECT ROM 1
L4104:  11..1.1...                   TRND6   :   DOWN ROTATE
L4105:  ..111...11  → L4070                      GO TO R13
L4106:  ..1..1....  → L1107  *****   ONE     :   SELECT ROM 1
L4107:  .111...1..                   TRND4   :   1 → S7
L4110:  ....1.11.1  → L4013                      JSB STA1
L4111:  111.1.111.                               A EXCHANAGE C[W]
L4112:  .1...11..1  → L4106                      JSB ONE
L4113:  .11.1.11.1  → L4153                      JSB ADD
L4114:  11..1.1...                               DOWN ROTATE
L4115:  .1..1.1...                               C → STACK
L4116:  111..1.1.1  → L4345                      JSB MPY
L4117:  11..1.1...                               DOWN ROTATE
L4120:  1...1.111.                               B EXCHANGE C[W]
L4121:  11..1.1...                               DOWN ROTATE
L4122:  11..1.111.                   TRND9   :   A EXCHANGE B[W]
L4123:  .11.1.11.1  → L4153                      JSB ADD
L4124:  11..1.1...                               DOWN ROTATE
L4125:  .11.1.1...                               STACK → A
L4126:  .11.1.11.1  → L4153                      JSB ADD
L4127:  .1..1.1...                               C → STACK
L4130:  ....1111.1  → L4017                      JSB DOWN2
L4131:  ..111...11  → L4070                      GO TO R13
L4132:  .11.1.11.1  → L4153          SOD4    :   JSB ADD
L4133:  1.1.1.1...                               M → C
L4134:  111..1.1.1  → L4345                      JSB MPY
L4135:  .11.1.11.1  → L4153                      JSB ADD
L4136:  ....1.11.1  → L4013                      JSB STA1
L4137:  ..1...111.                               B → C[W]
L4140:  111..1.1.1  → L4345                      JSB MPY
L4141:  ....1.11.1  → L4013                      JSB STA1
L4142:  111.1.111.                               A EXCHANGE C[W]
L4143:  ..111...11  → L4070                      GO TO R13
L4144:  ..1.1.1...                   INTER   :   C EXCHANGE M
L4145:  .1....11.1  → L4103                      JSB R100
L4146:  1.1.1.1...                               M → C
L4147:  111.1.111.                               A EXCHANGE C[W]
L4150:  ..1.1.1...                               C EXCHANGE M
L4151:  1.1...1.11  → L4242                      GO TO INTER1
L4152:  ..1..1....  → L1153  *****   SUB     :   SELECT ROM 1
L4153:  ..1..1....  → L1154  *****   ADD     :   SELECT ROM 1
L4154:  ..1..1....  → L1155  *****   ADD1    :   SELECT ROM 1
L4155:  ....1.11.1  → L4013          TRND3   :   JSB STA1
L4156:  .1..1.1...                               C → STACK
L4157:  111...11.1  → L4343                      JSB DIV
L4160:  11..1.1...                               DOWN ROTATE
L4161:  .1...11..1  → L4106                      JSB ONE
L4162:  .11.1.11.1  → L4153                      JSB ADD
L4163:  ..1...111.                               B → C[W]
L4164:  11..1.1...                               DOWN ROTATE
L4165:  111..1.1.1  → L4345                      JSB MPY
L4166:  .11.1.1...                               STACK → A
L4167:  111...11.1  → L4343                      JSB DIV
L4170:  .11.1.11.1  → L4153                      JSB ADD
L4171:  11..1.1...                               DOWN ROTATE
L4172:  .1..1.1...                               C → STACK
L4173:  .11.1.1..1  → L4152                      JSB SUB
L4174:  .11.1.11.1  → L4153                      JSB ADD
L4175:  11..1.11.                                A EXCHANGE B[W]
L4176:  .11.1.11.1  → l4153                      JSB ADD
L4177:  ....111..1  → L4016                      JSB DOWN3
L4200:  .1...11..1  → L4106                      JSB ONE
L4201:  .11.1.1..1  → L4152                      JSB SUB
L4202:  .11.1.1...                               STACK → A
L4203:  111...11.1  → L4343                      JSB DIV
L4204:  .11.1.11.1  → L4153                      JSB ADD
L4205:  11..1.1...                               DOWN ROTATE
L4206:  11..1.111.                               A EXCHANGE B[W]
L4207:  .11.1.1..1  → L4152                      JSB SUB
L4210:  .11.1.1...                               STACK → A
L4211:  ....1.11.1  → L4013                      JSB STA1
L4212:  ..1...111.                               B → C[W]
L4213:  111..1.1.1  → L4345                      JSB MPY
L4214:  .11.1.1...                               STACK → A
L4215:  .11.1.11.1  → L4153                      JSB ADD
L4216:  ..1111111.                               0 – C – 1 → C[S]
L4217:  ..1.1.1...                               C EXCHANGE M
L4220:  ..11..111.                               0 → C[W]
L4221:  .1..1.1...                               C → STACK
L4222:  1.1.1.1...                               M → C
L4223:  .1..1.1...                               C → STACK
L4224:  .1...1..11  → L4104                      GO TO TRND6
L4225:  .1...11..1  → L4106          TRND2   :   JSB ONE
L4226:  .11.1.11.1  → L4153                      JSB ADD
L4227:  .1..1.1...                               C → STACK
L4230:  .1..1.1...                               C → STACK
L4231:  .11.1.1...                   TRND8   :   STACK → A
L4232:  .11.1.1...                               STACK → A
```

ROM 4 – Continued

| | | | | | | |
|---|---|---|---|---|---|---|
| 155 | L4233: | .11...111. | | | | C → A[W] |
| 156 | L4234: | ....1111.1 | → L4017 | | | JSB DOWN2 |
| 157 | L4235: | 111..1.1.1 | → L4345 | | | JSB MPY |
| 158 | L4236: | 1.1.1.1... | | | | M → C |
| 159 | L4237: | .11.1.11.1 | → L4153 | | | JSB ADD |
| 160 | L4240: | ....1.11.1 | → L4013 | | | JSB STA1 |
| 161 | L4241: | .1...1..11 | → L4104 | | | GO TO TRND6 |
| 162 | L4242: | 1.1.1.1... | | | INTER1 : | M → C |
| 163 | L4243: | 111...11.1 | → L4343 | | | JSB DIV |
| 164 | L4244: | 11..1.1... | | | | DOWN ROTATE |
| 165 | L4245: | .11.1.1... | | | | STACK → A |
| 166 | L4246: | .11.1.1..1 | → L4152 | | | JSB SUB |
| 167 | L4247: | ....1.11.1 | → L4013 | | | JSB STA1 |
| 168 | L4250: | ..1...111. | | | | B → C[W] |
| 169 | L4251: | .11.1.1..1 | → L4152 | | | JSB SUB |
| 170 | L4252: | ..1.1.1... | | | | C EXCHANGE M |
| 171 | L4253: | .1...11..1 | → L4106 | | | JSB ONE |
| 172 | L4254: | .11.1.11.1 | → L4153 | | | JSB ADD |
| 173 | L4255: | .1..1.1... | | | | C → STACK |
| 174 | L4256: | ..1.1.1... | | | | C EXCHANGE M |
| 175 | L4257: | ......11.1 | → L4003 | | | JSB XTY |
| 176 | L4260: | ..1.1.1... | | | | C EXCHANGE M |
| 177 | L4261: | .1...11..1 | → L4106 | | | JSB ONE |
| 178 | L4262: | .11.1.1..1 | → L4152 | | | JSB SUB |
| 179 | L4263: | ....1.11.1 | → L4013 | | | JSB STA1 |
| 180 | L4264: | 111..1.1.1 | → L4345 | | | JSB MPY |
| 181 | L4265: | 11..1.1... | | | | DOWN ROTATE |
| 182 | L4266: | .1...11..1 | → L4106 | | | JSB ONE |
| 183 | L4267: | .11.1.11.1 | → L4153 | | | JSB ADD |
| 184 | L4270: | ....1.11.1 | → L4013 | | | JSB STA1 |
| 185 | L4271: | 111.1.111. | | | | A EXCHANGE C[W] |
| 186 | L4272: | ......11.1 | → L4003 | | | JSB XTY |
| 187 | L4273: | .11.1.1... | | | | STACK → A |
| 188 | L4274: | ..1.1.1... | | | | C EXCHANGE M |
| 189 | L4275: | .1...11..1 | → L4106 | | | JSB ONE |
| 190 | L4276: | .11.1.1..1 | → L4152 | | | JSB SUB |
| 191 | L4277: | 1.1.1.1... | | | | M → C |
| 192 | L4300: | 111..1.1.1 | → L4345 | | | JSB MPY |
| 193 | L4301: | ..1.1.1... | | | | C EXCHANGE M |
| 194 | L4302: | .1...11..1 | → L4106 | | | JSB ONE |
| 195 | L4303: | .11.1.1..1 | → L4152 | | | JSB SUB |
| 196 | L4304: | 11..1.1... | | | | DOWN ROTATE |
| 197 | L4305: | ..111111. | | | | 0 – C – 1 → C[S] |
| 198 | L4306: | .1..1.1... | | | | C → STACK |
| 199 | L4307: | 111..1.1.1 | → L4345 | | | JSB MPY |
| 200 | L4310: | 11..1.1... | | | | DOWN ROTATE |
| 201 | L4311: | .11.1.1... | | | | STACK → A |
| 202 | L4312: | .11.1.1... | | | | STACK → A |
| 203 | L4313: | ..1.1.1... | | | | C EXCHANGE M |
| 204 | L4314: | .11.1.1..1 | → L4152 | | | JSB SUB |
| 205 | L4315: | 1.1.1.1... | | | | M → C |
| 206 | L4316: | 111..1.1.1 | → L4345 | | | JSB MPY |
| 207 | L4317: | ..111...11 | → L4070 | | | GO TO R13 |
| 208 | L4320: | 111..1.1.1 | → L4345 | | DNOTE3 : | JSB MPY |
| 209 | L4321: | ..1.1.1... | | | | C EXCHANGE M |
| 210 | L4322: | .11.1.1... | | | | STACK → A |
| 211 | L4323: | ....1.11.1 | → L4013 | | | JSB STA1 |
| 212 | L4324: | ..111..1.1 | → L4071 | | | JSB L360 |
| 213 | L4325: | 11....11.. | | | | 12 → P |
| 214 | L4326: | 111...11.1 | → L4343 | | | JSB DIV |
| 215 | L4327: | 11..1.1... | | | | DOWN ROTATE |
| 216 | L4330: | ..111..1.1 | → L4071 | | | JSB L360 |
| 217 | L4331: | .1.1.11... | | | | LOAD CONSTANT 5 |
| 218 | L4332: | 11....11.. | | | | 12 → P |
| 219 | L4333: | 111...11.1 | → L4343 | | | JSB DIV |
| 220 | L4334: | ....1.11.1 | → L4013 | | | JSB STA1 |
| 221 | L4335: | .11.1.1..1 | → L4152 | | | JSB SUB |
| 222 | L4336: | ....1111.1 | → L4017 | | | JSB DOWN2 |
| 223 | L4337: | .11.1.1... | | | | STACK → A |
| 224 | L4340: | 111.1.111. | | | | A EXCHANGE C[W] |
| 225 | L4341: | .1..1.1... | | | | C → STACK |
| 226 | L4342: | .1......11 | → L4100 | | | GO TO DNOTE4 |
| 227 | L4343: | ..1..1.... | → L1344 | ***** | DIV : | SELECT ROM 1 |
| 228 | L4344: | .......... | | | | NO OPERATION |
| 229 | L4345: | ..1..1.... | → L1346 | ***** | MPY : | SELECT ROM 1 |
| 130 | L4346: | ..1..1.... | → L1347 | ***** | TEN6 : | SELECT ROM 1 |
| 231 | L4347: | .1..1..1.. | | | SOD1 : | 0 → S4 |
| 232 | L4350: | ..1.1.1... | | | | C EXCHANGE M |
| 233 | L4351: | 11..1.1... | | | | DOWN ROTATE |
| 234 | L4352: | .1..1.1... | | | | C → STACK |
| 235 | L4353: | .1..1.1... | | | | C → STACK |
| 236 | L4354: | .1...11..1 | → L4106 | | | JSB ONE |
| 237 | L4355: | .11.1.11.1 | → L4153 | | | JSB ADD |
| 238 | L4356: | 1...1.111. | | | | B EXCHANGE C[W] |
| 239 | L4357: | 111..1.1.1 | → L4345 | | | JSB MPY |
| 240 | L4360: | ..1.1.1... | | | | C EXCHANGE M |
| 241 | L4361: | 111.1.111. | | | | A EXCHANGE C[W] |
| 242 | L4362: | 111...11.1 | → L4343 | | | JSB DIV |
| 243 | L4363: | ..1.1.1... | | | | C EXCHANGE M |
| 244 | L4364: | ..1...1.11 | → L4042 | | | GO TO SOD5 |
| 245 | L4365: | ..11.1.... | | | SEL4 : | KEYS → ROM ADDRESS |
| 246 | L4366: | .1..1..1.. | | | DNOTE1 : | 0 → S4 |
| 247 | L4367: | ..1.1.1... | | | | C EXCHANGE M |
| 248 | L4370: | .1....11.1 | → L4103 | | | JSB R100 |

ROM 4 – Continued

| | | | | | | |
|---|---|---|---|---|---|---|
| 249 | L4371: | 111.1.111. | | | | A EXCHANGE C[W] |
| 250 | L4372: | .1..1.1... | | | | C → STACK |
| 251 | L4373: | 111...11.1 | → L4343 | | | JSB DIV |
| 252 | L4374: | .11.1.1... | | | | STACK → A |
| 253 | L4375: | 11..1.1... | | | | DOWN ROTATE |
| 254 | L4376: | ..1.1.1... | | | | C EXCHANGE M |
| 255 | L4377: | 11.1....11 | → L4320 | | | GO TO DNOTE |

ROM 5

| | | | | | | |
|---|---|---|---|---|---|---|
| 0 | L5000: | .......... | | | | NO OPERATION |
| 1 | L5001: | .......... | | | | NO OPERATION |
| 2 | L5002: | 1....1.... | → L4003 | ***** | XTY : | SELECT ROM 4 |
| 3 | L5003: | 11..1.1... | | | S182 : | DOWN ROTATE |
| 4 | L5004: | .1..1.1... | | | | C → STACK |
| 5 | L5005: | 111.1.111. | | | | A EXCHANGE C[W] |
| 6 | L5006: | .1..1.1... | | | | C → STACK |
| 7 | L5007: | ..11..111. | | | | 0 → C[W] |
| 8 | L5010: | ...1.11... | | | | LOAD CONSTANT 1 |
| 9 | L5011: | 1....11... | | | | LOAD CONSTANT 8 |
| 10 | L5012: | ..1..11... | | | | LOAD CONSTANT 2 |
| 11 | L5013: | .1.1.11... | | | | LOAD CONSTANT 5 |
| 12 | L5014: | ......11... | | | | LOAD CONSTANT 0 |
| 13 | L5015: | .1111.1.1. | | | S185 : | C + 1 → C[X] |
| 14 | L5016: | .1111.1.1. | | | | C + 1 → C[X] |
| 15 | L5017: | 11....11.. | | | | 12 → P |
| 16 | L5020: | ....11.... | | | RETR5 : | RETURN |
| 17 | L5021: | ..11..111. | | | S180 : | 0 → C[W] |
| 18 | L5022: | ...1.11... | | | | LOAD CONSTANT 1 |
| 19 | L5023: | 1....11... | | | | LOAD CONSTANT 8 |
| 20 | L5024: | ....11.111 | → L5015 | | | GO TO S185 |
| 21 | L5025: | 1.1..1.1.. | | | | IF S10 # 1 |
| 22 | L5026: | ...11...11 | → L5030 | | | THEN GO TO SEL6 |
| 23 | L5027: | ....11.... | | | | RETURN |
| 24 | L5030: | 11...1.... | → L6031 | ***** | SEL6 : | SELECT ROM 6 |
| 25 | L5031: | .......... | | | | NO OPERATION |
| 26 | L5032: | .......... | | | | NO OPERATION |
| 27 | L5033: | .1.1...1.. | | | BOND1 : | 1 → S5 |
| 28 | L5034: | .1...1.1.1 | → L5105 | | | JSB ONE |
| 29 | L5035: | .11.11.111 | → L5155 | | | GO TO BOND3 |
| 30 | L5036: | ..11111..1 | → L5076 | | BONDR1 : | JSB STA1 |
| 31 | L5037: | 1.11...1.. | | | | 1 → S11 |
| 32 | L5040: | .1..1.111. | | | | A → B[W] |
| 33 | L5041: | .11...111. | | | | C → A[W] |
| 34 | L5042: | .11.11...1 | → L5154 | | | JSB ADD1 |
| 35 | L5043: | 11..1.111. | | | | A EXCHANGE B[W] |
| 36 | L5044: | 111...11.1 | → L5343 | | | JSB DIV |
| 37 | L5045: | ..1.1.1... | | | | C EXCHANGE M |
| 38 | L5046: | .1....1..1 | → L5102 | | | JSB R100 |
| 39 | L5047: | 111.1.111. | | | | A EXCHANGE C[W] |
| 40 | L5050: | 111...11.1 | → L5343 | | | JSB DIV |
| 41 | L5051: | ......11.1 | → L5003 | | | JSB S182 |
| 42 | L5052: | 111...11.1 | → L5343 | | | JSB DIV |
| 43 | L5053: | ...1111.1. | | | | IF C[XS] > = 1 |
| 44 | L5054: | .1.111..11 | → L5134 | | | THEN GO TO BONDR2 |
| 45 | L5055: | ..111.1..1 | → L5072 | | | JSB DOWN2 |
| 46 | L5056: | 1.1.1.1... | | | | M → C |
| 47 | L5057: | 11..1.1... | | | BON2 : | DOWN ROTATE |
| 48 | L5060: | 1.1.1.1... | | | BONDR3 : | M → C |
| 49 | L5061: | .1...1.1.1 | → L5105 | | | JSB ONE |
| 50 | L5062: | .11.1.11.1 | → L5153 | | | JSB ADD |
| 51 | L5063: | ..11111..1 | → L5076 | | | JSB STA1 |
| 52 | L5064: | 111.1.111. | | | | A EXCHANGE C[W] |
| 53 | L5065: | 1.11...111 | → L5261 | | | GO TO BONDR7 |
| 54 | L5066: | .11.1.1... | | | DNOTE2 : | STACK → A |
| 55 | L5067: | .1.11..1.. | | | R13 : | 0 → S5 |
| 56 | L5070: | .11..1.... | → L3071 | ***** | | SELECT ROM 3 |
| 57 | L5071: | 11..1.1... | | | DOWN3 : | DOWN ROTATE |
| 58 | L5072: | 11..1.1... | | | DOWN2 : | DOWN ROTATE |
| 59 | L5073: | 11..1.1... | | | | DOWN ROTATE |
| 60 | L5074: | ....11.... | | | | RETURN |
| 61 | L5075: | 11..1.1... | | | STA2 : | DOWN ROTATE |
| 62 | L5076: | .11.1.1... | | | STA1 : | STACK → A |
| 63 | L5077: | .1..1.1... | | | | C → STACK |
| 64 | L5100: | ....11... | | | | RETURN |
| 65 | L5101: | .......... | | | | NO OPERATION |
| 66 | L5102: | 1....1.... | → L4103 | ***** | R100 : | SELECT ROM 4 |
| 67 | L5103: | .1.1...1.. | | | DNOTE5 : | 1 → S5 |
| 68 | L5104: | .1...11.11 | → L5106 | | | GO TO DNOTE6 |
| 69 | L5105: | 1....1.... | → L4106 | ***** | ONE : | SELECT ROM 4 |
| 70 | L5106: | 1.1.1.1... | | | DNOTE6 : | M → C |
| 71 | L5107: | 111..1.1.1 | → L5345 | | | JSB MPY |
| 72 | L5110: | .1....1..1 | → L5102 | | | JSB R100 |
| 73 | L5111: | 111.1.111. | | | | A EXCHANGE C[W] |
| 74 | L5112: | 111...11.1 | → L5343 | | | JSB DIV |
| 75 | L5113: | ..1111.1.1 | → L5075 | | | JSB STA2 |
| 76 | L5114: | 1.1.1.1... | | | | M → C |
| 77 | L5115: | 111..1.1.1 | → L5345 | | | JSB MPY |
| 78 | L5116: | .1....1..1 | → L5102 | | | JSB R100 |
| 79 | L5117: | 111.1.111. | | | | A EXCHANGE C[W] |
| 80 | L5120: | 111...11.1 | → L5343 | | | JSB DIV |
| 81 | L5121: | 11..1.1... | | | | DOWN ROTATE |
| 82 | L5122: | 1.11.1.1.. | | | | IF S11 # 1 |

ROM 5 – Continued

```
L5123:  ..11.11.11   → L5066                          THEN GO TO DNOTE2
L5124:  ..11.11111   → L5067                       GO TO R13
L5125:  11..1.1...                   IT1      :    DOWN ROTATE
L5126:  .11...111.                                 C → A[W]
L5127:  1..1111.1.                   IT2      :    IF A[XS] >= 1
L5130:  ...1....11   → L5020                          THEN GO TO RETR5
L5131:  11.11.1.1.                                 A - 1 → A[X]
L5132:  .1.....11.                                 SHIFT LEFT A[M]
L5133:  .1.1.11111   → L5127                       GO TO IT2
L5134:  .11.1.1...                   BONDR2   :    STACK → A
L5135:  1.1.1.1...                                 M → C
L5136:  .11.1.11.1   → L5153                       JSB ADD
L5137:  ..11111..1   → L5076                       JSB STA1
L5140:  ...1...1.1   → L5021                       JSB S180
L5141:  111...11.1   → L5343                       JSB DIV
L5142:  .1...1.1.1   → L5105                       JSB ONE
L5143:  .11.1.1..1   → L5152                       JSB SUB
L5144:  1...1.111.                                 B EXCHANGE C[W]
L5145:  ..1.1.1...                                 C EXCHANGE M
L5146:  ..111111 1.                                0 - C - 1 → C[S]
L5147:  111..1.1.1   → L5345                       JSB MPY
L5150:  .1...1.1.1   → L5105                       JSB ONE
L5151:  11.11..111   → L5331                       GO TO BONDR8
L5152:  ..1..1....   → L1153   *****  SUB      :    SELECT ROM 1
L5153:  ..1..1....   → L1154   *****  ADD      :    SELECT ROM 1
L5154:  ..1..1....   → L1155   *****  ADD1     :    SELECT ROM 1
L5155:  1.1.1.111.                   BOND 3   :    C + C → C[W]
L5156:  111...11.1   → L5343                       JSB DIV
L5157:  ..1.1.1...                                 C EXCHANGE M
L5160:  .1....1..1   → L5102                       JSB R100
L5161:  ......11.1   → L5003                       JSB S182
L5162:  111...11.1   → L5343                       JSB DIV
L5163:  ...1111.1.                                 IF C[XS] >= 1
L5164:  1..11.1.11   → L5232                          THEN GO TO BOND2
L5165:  ..1111.1.1   → L5075                       JSB STA2
L5166:  .1...1.1.1   → L5105                       JSB ONE
L5167:  1.1.1.111.                                 C + C → C[W]
L5170:  111.1.111.                                 A EXCHANGE C[W]
L5171:  .11.1.11.1   → L5153                       JSB ADD
L5172:  ..1...111.                                 B → C[W]
L5173:  111...11.1   → L5343                       JSB DIV
L5174:  11..1.1...                                 DOWN ROTATE
L5175:  .11.1.1...                                 STACK → A
L5176:  11..1.1...                                 DOWN ROTATE
L5177:  ..1111111.                                 0 - C - 1 → C[S]
L5200:  ......1..1   → L5002                       JSB XTY
L5201:  .1.1.1.1.1   → L5125                       JSB IT1
L5202:  111.1.111.                                 A EXCHANGE C[W]
L5203:  .1...1.1.1   → L5105                       JSB ONE
L5204:  .11.1.11.1   → L5153                       JSB ADD
L5205:  ......1..1   → L5002                       JSB XTY
L5206:  ..111..1.1   → L5071                       JSB DOWN3
L5207:  ..11111..1   → L5076                       JSB STA1
L5210:  .11.1.1..1   → L5152                       JSB SUB
L5211:  .11.1.11.1   → L5153                       JSB ADD
L5212:  1.1.1.1...                                 M → C
L5213:  111..1.1.1   → L5345                       JSB MPY
L5214:  11..1.1...                                 DOWN ROTATE
L5215:  ....11.1.1   → L5015                       JSB S185
L5216:  11..1.1...                                 DOWN ROTATE
L5217:  .11...111.                                 C → A[W]
L5220:  1.1.1.1...                                 M → C
L5221:  111..1.1.1   → L5345                       JSB MPY
L5222:  11..1.1...                                 DOWN ROTATE
L5223:  .11.1.1...                                 STACK → A
L5224:  111...11.1   → L5343                       JSB DIV
L5225:  .11.1.1...                                 STACK → A
L5226:  .11.1.11.1   → L5153                       JSB ADD
L5227:  11..1.1...                                 DOWN ROTATE
L5230:  .11.1.1..1   → L5152                       JSB SUB
L5231:  ..11.11111   → L5067                       GO TO R13
L5232:  ..1111.1.1   → L5075         BOND2    :    JSB STA2
L5233:  ...1...1.1   → L5021                       JSB S180
L5234:  111...11.1   → L5343                       JSB DIV
L5235:  11..1.1...                                 DOWN ROTATE
L5236:  111..1.1.1   → L5345                       JSB MPY
L5237:  .1...1.1.1   → L5105                       JSB ONE
L5240:  1.1.1.111.                                 C + C → C[W]
L5241:  .11.1.11.1   → L5153                       JSB ADD
L5242:  ..1.1.1...                                 C EXCHANGE M
L5243:  .1...1.1.1   → L5105                       JSB ONE
L5244:  ....11.1.1   → L5015                       JSB S185
L5245:  .11.1.11.1   → L5153                       JSB ADD
L5246:  ..1...111.                                 B → C[W]
L5247:  ..1.1.1...                                 C EXCHANGE M
L5250:  111...11.1   → L5343                       JSB DIV
L5251:  .11.1.11.1   → L5153                       JSB ADD
L5252:  ..111..1.1   → L5071                       JSB DOWN3
L5253:  .1...1.1.1   → L5105                       JSB ONE
L5254:  .11.1.1..1   → L5152                       JSB SUB
L5255:  ..1.1.1...                                 C EXCHANGE M
L5256:  111..1.1.1   → L5345                       JSB MPY
L5257:  11..1.1...                                 DOWN ROTATE
L5260:  1111111.11   → L5376                       GO TO BONDR6
```

ROM 5 – Continued

| | | | | | | |
|---|---|---|---|---|---|---|
| 177 | L5261: | ......1..1 | → L5002 | | BONDR7 : | JSB XTY |
| 178 | L5262: | .1...1.1.1 | → L5105 | | | JSB ONE |
| 179 | L5263: | .11.1.1..1 | → L5152 | | | JSB SUB |
| 180 | L5264: | 11.11....1 | → L5330 | | | JSB ROT1 |
| 181 | L5265: | ..111..1.1 | → L5071 | | | JSB DOWN3 |
| 182 | L5266: | .11.1.1..1 | → L5152 | | | JSB SUB |
| 183 | L5267: | 11.11....1 | → L5330 | | | JSB ROT1 |
| 184 | L5270: | 11..1.1... | | | | DOWN ROTATE |
| 185 | L5271: | 111.1.111. | | | | A EXCHANGE C[W] |
| 186 | L5272: | 111...11.1 | → L5343 | | | JSB DIV |
| 187 | L5273: | 1.1.1.1... | | | | M → C |
| 188 | L5274: | 111..1.1.1 | → L5345 | | | JSB MPY |
| 189 | L5275: | ..11111..1 | → L5076 | | | JSB STA1 |
| 190 | L5276: | .11.1.11.1 | → L5153 | | | JSB ADD |
| 191 | L5277: | .11.1.1... | | | | STACK → A |
| 192 | L5300: | ..111.1..1 | → L5072 | | | JSB DOWN2 |
| 193 | L5301: | ..1...111. | | | | B → C[W] |
| 194 | L5302: | ..1111.1.1 | → L5075 | | | JSB STA2 |
| 195 | L5303: | 1.1.1.1... | | | | M → C |
| 196 | L5304: | .11.1.11.1 | → L5153 | | | JSB ADD |
| 197 | L5305: | ..1.1.1... | | | | C EXCHANGE M |
| 198 | L5306: | ..1...111. | | | | B → C[W] |
| 199 | L5307: | ....11.1.1 | → L5015 | | | JSB S185 |
| 200 | L5310: | ....11.1.1 | → L5015 | | | JSB S185 |
| 201 | L5311: | ....11.1.1 | → L5015 | | | JSB S185 |
| 202 | L5312: | .11.1..11. | | | | IF C[M] = 0 |
| 203 | L5313: | 11..111.11 | → L5316 | | | THEN GO TO BON1 |
| 204 | L5314: | .11.111.1. | | | | IF C[XS] = 0 |
| 205 | L5315: | ..11....11 | → L5060 | | | THEN GO TO BONDR3 |
| 206 | L5316: | 1.11.1.1.. | | | BON1 : | IF S11 # 1 |
| 207 | L5317: | 11111.1111 | → L5373 | | | THEN GO TO BONDR4 |
| 208 | L5320: | 1.111..1.. | | | | 0 → S11 |
| 209 | L5321: | 11..1.1... | | | | DOWN ROTATE |
| 210 | L5322: | .1..1.1... | | | | C → STACK |
| 211 | L5323: | .1.1.1.1.1 | → L5125 | | | JSB IT1 |
| 212 | L5324: | 111.1.111. | | | | A EXCHANGE C[W] |
| 213 | L5325: | .1...1.1.1 | → L5105 | | | JSB ONE |
| 214 | L5326: | .11.1.1..1 | → L5152 | | | JSB SUB |
| 215 | L5327: | 111..11.11 | → L5346 | | | GO TO BONDR9 |
| 216 | L5330: | ..1..1.... | → L1331 | ***** | ROT1 : | SELECT ROM 1 |
| 217 | L5331: | .11.1.11.1 | → L5153 | | BONDR8 : | JSB ADD |
| 218 | L5332: | .11.1.1... | | | | STACK → A |
| 219 | L5333: | 111...11.1 | → L5343 | | | JSB DIV |
| 220 | L5334: | .1...1.1.1 | → L5105 | | | JSB ONE |
| 221 | L5335: | .11.1.1..1 | → L5152 | | | JSB SUB |
| 222 | L5336: | 1.1.1.1... | | | | M → C |
| 223 | L5337: | 111...11.1 | → L5343 | | | JSB DIV |
| 224 | L5340: | 111111..11 | → L5374 | | | GO TO BONDR5 |
| 225 | L5341: | .......... | | | | NO OPERATION |
| 226 | L5342: | .......... | | | | NO OPERATION |
| 227 | L5343: | ..1..1.... | → L1344 | ***** | DIV : | SELECT ROM 1 |
| 228 | L5344: | .......... | | | | NO OPERATION |
| 229 | L5345: | ..1..1.... | → L1346 | ***** | MPY : | SELECT ROM 1 |
| 230 | L5346: | ..1...111. | | | BONDR9 : | B → C[W] |
| 231 | L5347: | 111..1.1.1 | → L5345 | | | JSB MPY |
| 232 | L5350: | 1.1.1.1... | | | | M → C |
| 233 | L5351: | 111..1.1.1 | → L5345 | | | JSB MPY |
| 234 | L5352: | ..111.1..1 | → L5072 | | | JSB DOWN2 |
| 235 | L5353: | .11...111. | | | | C → A[W] |
| 236 | L5354: | ..111.1..1 | → L5072 | | | JSB DOWN2 |
| 237 | L5355: | 111..1.1.1 | → L5345 | | | JSB MPY |
| 238 | L5356: | .1...1.1.1 | → L5105 | | | JSB ONE |
| 239 | L5357: | 1.1.1.111. | | | | C + C → C[W] |
| 240 | L5360: | 111.1.111. | | | | A EXCHANGE C[W] |
| 241 | L5361: | .11.1.11.1 | → L5153 | | | JSB ADD |
| 242 | L5362: | ..1...111. | | | | B → C[W] |
| 243 | L5363: | 111...11.1 | → L5343 | | | JSB DIV |
| 244 | L5364: | ..11111..1 | → L5076 | | | JSB STA1 |
| 245 | L5365: | 111..1.1.1 | → L5345 | | | JSB MPY |
| 246 | L5366: | 11..1.1... | | | | DOWN ROTATE |
| 247 | L5367: | .11.1.1... | | | | STACK → A |
| 248 | L5370: | 111..1.1.1 | → L5345 | | | JSB MPY |
| 249 | L5371: | .1..1.1... | | | | C → STACK |
| 250 | L5372: | ..1.111111 | → L5057 | | | GO TO BON2 |
| 251 | L5373: | 1.1.1.1... | | | BONDR4 : | M → C |
| 252 | L5374: | ....11.1.1 | → L5015 | | BONDR5 : | JSB S185 |
| 253 | L5375: | .11...111. | | | | C → A[W] |
| 254 | L5376: | .11.1.11.1 | → L5153 | | BONDR6 : | JSB ADD |
| 255 | L5377: | ..11.11111 | → L5067 | | | GO TO R13 |

ROM 6

| | | | | | | |
|---|---|---|---|---|---|---|
| 0 | L6000: | .....1.... | → L0001 | ***** | ERR71 : | SELECT ROM 0 |
| 1 | L6001: | .1.....1.. | | | DA8 : | 1 → S4 |
| 2 | L6002: | 111.11..11 | → L6354 | | | GO TO DA12 |
| 3 | L6003: | 1..11.11.. | | | DM6 : | IF P # 9 |
| 4 | L6004: | 1...11..11 | → L6214 | | | THEN GO TO DM7 |
| 5 | L6005: | ....11.... | | | | RETURN |
| 6 | L6006: | 11..1.111. | | | DM3 : | A EXCHANGE B[W] |
| 7 | L6007: | ..1.1.11.. | | | DM1 : | IF P # 2 |
| 8 | L6010: | 1...1..111 | → L6211 | | | THEN GO TO DM4 |
| 9 | L6011: | 11111..11. | | | | A + 1 → A[M] |

ROM 6—Continued

```
L6012:  .1.11..11.                          C - 1 → C[M]
L6013:  .11.1.1.1.                          IF C[X]=0
L6014:  ....111111   → L6017                    THEN GO TO DM2
L6015:  11111..11.                          A + 1 → A[M]
L6016:  .1.11..11.                          C - 1 → C[M]
L6017:  ....11....              DM2     :   RETURN
L6020:  ..11.11...              YC1     :   LOAD CONSTANT 3
L6021:  .11..11...                          LOAD CONSTANT 6
L6022:  .1.1.11...                          LOAD CONSTANT 5
L6023:  .1...1.1..                          IF S4 # 1
L6024:  ...1.11111   → L6027                    THEN GO TO YC2
L6025:  11111.1.1.                          A + 1 → A[X]
L6026:  ....11....                          RETURN
L6027:  ..1..11...              YC2     :   LOAD CONSTANT 2
L6030:  .1.1.11...                          LOAD CONSTANT 5
L6031:  ....11....                          RETURN
L6032:  ..........                          NO OPERATION
L6033:  ..........                          NO OPERATION
L6034:  .....11..1   → L6006    DD6     :   JSB DM3
L6035:  11..1.111.                          A EXCHANGE B[W]
L6036:  .111...11.                          A + C → C[M]
L6037:  .....111..              DD8     :   P - 1 → P
L6040:  ....1.11..                          IF P # 0
L6041:  ...111..11   → L6034                    THEN GO TO DD6
L6042:  ..11..1.1.                          0 → C[X]
L6043:  .11...111.                          C → A[W]
L6044:  .111.1.1..                          IF S7 # 1
L6045:  1..1..1.11   → L6222                    THEN GO TO DA4
L6046:  .11.1.1...              DN1     :   STACK → A
L6047:  111.1.111.                          A EXCHANGE C[W]
L6050:  1..111..11   → L6234                GO TO DN3
L6051:  .111.1.1..                          IF S7 # 1
L6052:  ..1.11.111   → L6055                    THEN GO TO DA1
L6053:  .1...1.1..                          IF S4 # 1
L6054:  ..11....11   → L6060                    THEN GO TO DA3
L6055:  .1111..1..              DA1     :   0 → S7
L6056:  .1..1.1...                          C → STACK
L6057:  .1..1.1...                          C → STACK
L6060:  .11.1.1...              DA3     :   STACK → A
L6061:  .111.1.1..                          IF S7 # 1
L
L6062:  ..11.1..11   → L6065                    THEN GO TO DA13
L6063:  .1..1.1...                          C → STACK
L6064:  111.1.111.              DA13    :   A EXCHANGE C[W]
L6065:  111.1.1111   → L6353                GO TO DA5
L6066:  .11.1.11..              DM5     :   IF P # 6
L6067:  ......1111   → L6003                    THEN GO TO DM6
L6070:  ....11....                          RETURN
L6071:  ..........                          NO OPERATION
L6072:  .1.1.1.11.              DA7     :   A - C → C[MS]
L6073:  ..1111.111   → L6075                IF NO CARRY GO TO DA11
L6074:  ..1.11.11.                          0 - C → C[MS]
L6075:  1...1.111.              DA11    :   B EXCHANGE C[W]
L6076:  .11.1.1...                          STACK → A
L6077:  11..1.1...                          DOWN ROTATE
L6100:  ..1111111.                          0 - C - 1 → C[S]
L6101:  .11.1..1.1   → L6151                JSB ADD63
L6102:  1.1111111.                          0 → A[S]
L6103:  ..11..111.                          0 → C[W]
L6104:  .1.1..11..                          5 → P
L6105:  ...1.11...                          LOAD CONSTANT 1
L6106:  1....11...                          LOAD CONSTANT 8
L6107:  111.1.111.                          A EXCHANGE C[W]
L6110:  1....1.11.                          IF A >= B[MS]
L6111:  .11..1.111   → L6145                    THEN GO TO DA10
L6112:  .1..1.1...              DA9     :   C → STACK
L6113:  ..1...111.                          B → C[W]
L6114:  .11.1....1   → L6150    ADD62   :   JSB ADD61
L6115:  .1.11..1..                          0 → S5
L6116:  .1111..1..                          0 → S7
L6117:  .....1....   → L0120 *****          SELECT ROM 0
L6120:  ....1111..              DD4     :   P + 1 → P
L6121:  .1.11.1.1.                          C - 1 → C[X]
L6122:  1....1.111   → L6205                IF NO CARRY GO TO DD3
L6123:  111.1.111.                          A EXCHANGE C[W]
L6124:  .......11.                          IF B[M] = 0
L6125:  ........11   → L6000                    THEN GO TO ERR71
L6126:  .....11..1   → L6006                JSB DM3
L6127:  .111...11.                          A + C → C[M]
L6130:  11..1.111.                          A EXCHANGE B[W]
L6131:  .1...1.1..                          IF S4 # 1
L6132:  .1.111..11   → L6134                    THEN GO TO DD5
L6133:  ...1111111   → L6037                GO TO DD8
L6134:  1......11.              DD5     :   IF A >= B[M]
L6135:  ...1111111   → L6037                    THEN GO TO DD8
L6136:  ........11   → L6000                GO TO ERR71
L6137:  1.111.111.              DY1     :   0 → A[W]
L6140:  1...11..1.                          B EXCHANGE C[WP]
L6141:  ...1.....1   → L6020                JSB YC1
L6142:  1.....11..                          8 → P
L6143:  1...11..1.                          B EXCHANGE C[WP]
L6144:  .111....11   → L6160                GO TO MU3
L6145:  ..1...111.              DA10    :   B → C[W]
L6146:  .11.1....1   → L6150                JSB ADD61
```

ROM 6 – Continued

```
L6147:  .1..1.1.11   → L6112                  GO TO DA9
L6150:  1.111.111.             ADD61   :  0 → A[W]
L6151:  .1.1...1..             ADD63   :  1 → S5
L6152:  .111...1..                        1 → S7
L6153:  11....11..                        12 → P
L6154:  ..1..1....   → L1155  *****       SELECT ROM 1
L6155:  111...111.             MU1     :  A + B → A[W]
L6156:  .1.11...1.             MU2     :  C − 1 → C[P]
L6157:  .11.11.111   → L6155              IF NO CARRY GO TO MU1
L6160:  1.1...111.             MU3     :  SHIFT RIGHT B[W]
L6161:  .....111..                        P − 1 → P
L6162:  ..111.11..                        IF P # 3
                                              THEN GO TO MU2
L6163:  .11.111.11   → L6156
L6164:  11.11.111.                        A − 1 → A[W]
L6165:  .111.11111   → L6167              IF NO CARRY GO TO DY2
L6166:  11111.111.                        A + 1 → A[W]
L6167:  11111.1.1.             DY2     :  A + 1 → A[X]
L6170:  ....1111..             DD1     :  P + 1 → P
L6171:  1..1..111.                        SHIFT RIGHT C[W]
L6172:  1..11.11..                        IF P # 9
                                              THEN GO TO DD1
L6173:  .1111...11   → L6170
L6174:  ..11.11...                        LOAD CONSTANT 3
L6175:  .1....11..                        4 → P
L6176:  1...11..1.                        B EXCHANGE C[WP]
L6177:  1..1..111.             DD2     :  SHIFT RIGHT C[W]
L6200:  .....111..                        P − 1 → P
6201:   11111.11..                        IF P # 14
                                              THEN GO TO DD2
L6202:  .111111111   → L6177
L6203:  .11.1.1.1.                        IF C[X] = 0
                                              THEN GO TO ERR71
L6204:  ........11   → L6000
L6205:  11..1.11..             DD3     :  IF P # 12
                                              THEN GO TO DD4
L6206:  .1.1....11   → L6120
L6207:  ........11   → L6000              GO TO ERR71
L6210:  ..........                        NO OPERATION
L6211:  .1..1.11..             DM4     :  IF P # 4
                                              THEN GO TO DM5
L6212:  ..11.11.11   → L6066
L6213:  ....11....                        RETURN
L6214:  1.111.11..             DM7     :  IF P # 11
                                              THEN GO TO DM8
L6215:  1...111111   → L6217
L6216:  ....11....                        RETURN
L6217:  11.11..11.             DM8     :  A − 1 → A[M]
L6220:  .1111..11.                        C + 1 → C[M]
L6221:  ....11....                        RETURN
L6222:  .1.11...1.             DA4     :  C − 1 → C[P]
L6223:  11..1.1...                        DOWN ROTATE
L6224:  1..1.1.1..                        IF S9 # 1
                                              THEN GO TO DA6
L6225:  111.1..111   → L6351
L6226:  .1...1.1..                        IF S4 # 1
                                              THEN GO TO DA8
L6227:  .......111   → L6001
L6230:  1..11..1..                        0 → S9
L6231:  111.11..11   → L6354              GO TO DA12
L6232:  ......11..             DN2     :  0 → P
L6233:  1..1...11.                        SHIFT RIGHT C[M]
L6234:  .1111...1.             DN3     :  C + 1 → C[P]
L6235:  1..11.1.11   → L6232              IF NO CARRY GO TO DN2
L6236:  ...11.1.1.                        IF C[X] >= 1
                                              THEN GO TO ERR71
L6237:  ........11   → L6000
L6240:  .11.11111.                        IF C[S] = 0
                                              THEN GO TO DN4
L6241:  1.1...1111   → L6243
L6242:  ..1.1..11.                        0 − C → C[M]
L6243:  1111.1.11.             DN4     :  A + C → A[MS]
L6244:  .111..11...                       7 → P
L6245:  ..11..111.                        0 → C[W]
L6246:  .111.11...                        LOAD CONSTANT 7
L6247:  ..11.11...                        LOAD CONSTANT 3
L6250:  .....11...                        LOAD CONSTANT 0
L6251:  .1.1.11...                        LOAD CONSTANT 5
L6252:  ...1.1.11.                        IF A >= C[M]
                                              THEN GO TO ERR71
L6253:  ........11   → L6000
L6254:  1.....11..                        8 → P
L6255:  ...1.....1   → L6020              JSB YC1
L6256:  ....1.111.                        0 → B[W]
L6257:  1...1.111.                        B EXCHANGE C[W]
L6260:  1..11..11.                        IF A[M] >= 1
                                              THEN GO TO DN11
L6261:  1.11..1111   → L6263
L6262:  ........11   → L6000              GO TO ERR71
L6263:  11111..11.             DN11    :  A + 1 → A[M]
L6264:  1.1...111.             DN15    :  SHIFT RIGHT B[W]
L6265:  .....111..                        P − 1 → P
L6266:  1.111...11   → L6270              GO TO DN6
L6267:  .111...1.              DN5     :  C + 1 → C[P]
L6270:  11....111.             DN6     :  A − B → A[W]
L6271:  1.11.11111   → L6267              IF NO CARRY GO TO DN5
L6272:  111...111.                        A + B → A[W]
L6273:  ....1.11..                        IF P # 0
                                              THEN GO TO DN15
L6274:  1.11.1..11   → L6264
L6275:  1..11..11.                        IF A[M] >= 1
                                              THEN GO TO DN12
L6276:  11.....111   → L6301
L6277:  111...111.                        A + B → A[W]
L6300:  .1.11.1.1.                        C − 1 → C[X]
L6301:  ...11.1.1.             DN12    :  IF C[X] >= 1
                                              THEN GO TO DN7
L6302:  11...1..11   → L6304
L6303:  11.11.111.                        A − 1 → A[W]
L6304:  .1....11..             DN7     :  4 → P:
```

ROM 6 – Continued

| | | | | | |
|---|---|---|---|---|---|
| 197 | L6305: | ..11.11... | | | LOAD CONSTANT 3 |
| 198 | L6306: | ......11.. | | | 0 → P |
| 199 | L6307: | 1...1.111. | | | B EXCHANGE C[W] |
| 200 | L6310: | ..11..111. | | | 0 → C[W] |
| 201 | L6311: | 111.1.1.1. | | | A EXCHANGE C[X] |
| 202 | L6312: | ....1111.. | | DN8 : | P + 1 → P |
| 203 | L6313: | 11111.1.1. | | | A + 1 → A[X] |
| 204 | L6314: | ..11...11. | | | 0 → C[M] |
| 205 | L6315: | .....111.1 | → L6007 | | JSB DM1 |
| 206 | L6136: | 11.....11. | | | A − B → A[M] |
| 207 | L6317: | 11.1...111 | → L6321 | | IF NO CARRY GO TO DN13 |
| 208 | L6320: | 11.1..1111 | → L6323 | | GO TO DN14 |
| 209 | L6321: | 1..11..11. | | DN13 : | IF A[M] >= 1 |
| 210 | L6322: | 11..1.1.11 | → L6312 | | THEN GO TO DN8 |
| 211 | L6323: | 111....11. | | DN14 : | A + B → A[M] |
| 212 | L6324: | 1111...11. | | | A + C → A[M] |
| 213 | L6325: | .1.....11. | | | SHIFT LEFT A[M] |
| 214 | L6326: | 1111..11. | | | A + 1 → A[M] |
| 215 | L6327: | 11..1.1.1. | | | A EXCHANGE B[X] |
| 216 | L6330: | ..11..111. | | | 0 C[W] |
| 217 | L6331: | .1.1111.1. | | | C − 1 → C[XS] |
| 218 | L6332: | 1111..111. | | | A + C → A[W] |
| 219 | L6333: | 11..1.111. | | | A EXCHANGE B[W] |
| 220 | L6334: | 11.1..11.. | | | 13 → P |
| 221 | L6335: | .....111.. | | DN9 : | P − 1 → P |
| 222 | L6336: | .1....111. | | | SHIFT LEFT A[W] |
| 223 | L6337: | .1111.11.. | | | IF P # 7 |
| 224 | L6340: | 11.111.111. | → L6335 | | THEN GO TO DN9 |
| 225 | L6341: | 111...111. | | | A + B → A[W] |
| 226 | L6342: | ....1111.. | | DN10 : | P + 1 → P |
| 227 | L6343: | .1....111. | | | SHIFT LEFT A[W] |
| 228 | L6344: | 11..1.11.. | | | IF P # 12 |
| 229 | L6345: | 111...1.11 | → L6342 | | THEN GO TO DN10 |
| 230 | L6346: | 11111.1.1. | | | A + 1 → A[X] |
| 231 | L6347: | 111.1.111. | | | A EXCHANGE C[W] |
| 232 | L6350: | .1..11..11 | → L6114 | | GO TO ADD62 |
| 233 | L6351: | .1...1.1.. | | DA6 : | IF S4 # 1 |
| 234 | L6352: | ..111.1.11 | → L6072 | | THEN GO TO DA7 |
| 235 | L6353: | .1..1..1.. | | DA5 : | 0 → S4 |
| 236 | L6354: | .1.11.1.1. | | DA12 : | C − 1 → C[X] |
| 237 | L6355: | 1111....11 | → L6360 | | IF NO CARRY GO TO DA2 |
| 238 | L6356: | 1..1...11. | | | SHIFT RIGHT C[M] |
| 239 | L6357: | ..11..1.1. | | | 0 → C[ ] |
| 240 | L6360: | ...11.1.1. | | DA2 : | IF C[X] >= 1 |
| 241 | L6361: | ........11 | → L6000 | | THEN GO TO ERR71 |
| 242 | L6362: | ....1.111. | | | 0 → B[W] |
| 243 | L6363: | .11...111. | | | C → A[W] |
| 244 | L6364: | 1.....11.. | | | 8 → P |
| 245 | L6365: | ..11.1..1. | | | 0 → C[WP] |
| 246 | L6366: | ..1..11... | | | LOAD CONSTANT 2 |
| 247 | L6367: | ...1.11... | | | LOAD CONSTANT 1 |
| 248 | L6370: | 1.....11.. | | | 8 → P |
| 249 | L6371: | ...1.1..1. | | | IF A >= C[WP] |
| 250 | L6372: | ........11 | → L6000 | | THEN GO TO ERR71 |
| 251 | L6373: | ...1.11... | | | LOAD CONSTANT 1 |
| 252 | L6374: | 1..1.11... | | | LOAD CONSTANT 9 |
| 253 | L6375: | 1..:..11.. | | | 8 → P |
| 254 | L6376: | .1.1.1..1. | | | A − C → C[WP] |
| 255 | L6377: | .1.1111111 | → L6137 | | IF NO CARRY GO TO DY1 |

FUNCTIONS

All of the functions performed by the calculator are given in the table below. The notes referred to in this table are given at the end of the table.

TABLE OF FUNCTIONS INCORPORATED INTO THE BUSINESS CALCULATOR

1. SIMPLE COMPOUNDING
   - 1.1 $FV = PV (1 + i)^n$
   - 1.2 $PV = FV/(1 + i)^n$
   - 1.3 $= (FV/PV)^{1/n} - 1$
   - 1.4 $n = (Log(FV))/Log (PV(1 + i))$
2. ANNUITY
   - 2.1 $FV = PMT (1 + i)^n - 1/i$
   - 2.2 $PV = PMT (1 + i)^n - 1/i (1 + i)^n$
   - 2.3 Solve For $i$ In (see Note 1):
     $PV - PMT [(1 + i)^n - 1]/i (1 + i)^n = 0$
   - 2.4 Solve For $i$ In (see Note 1):
     $FV - PMT [(1 + i)^n - 1]/i = 0$
   - 2.5 $n = \log (PMT/(PV - PMT))/\log (1 + i)$
   - 2.6 $n = \log (FV \times i/PMT + 1)/\log (1 + i)$
   - 2.7 $PMT = PV\ i (1 + i)^n/[(1 + i)^n - 1]$
   - 2.8 $PMT = FV\ i/[(1 + i)^n - 1]$
3. ADD ON TO ANNUAL RATE
   - 3.1 Solve For $i$ In (see Note 1):

$$1-\frac{1+\frac{n}{12}\times\frac{R}{100}}{n}\times\frac{(1+i)^n-1}{i(1+i)^n}$$

$n$ = No. of Months
R = Annual Add-On Rate

4. ACCRUED INTEREST
   $n$ = No. of Days
   $i$ = Annual Interest Rate (%)
   PV = Principal Amount
   - 4.1 $i_{360} = n\ PV\ i/36000$
   - 4.2 $i_{365} = i_{360} \times 0.98630137$
5. DISCOUNTED NOTE $n$ = No. of Days
$i$ = Annual Interest Rate (%)
FV = Face Value of Note
5.1 $d_{360}$ = FV × $n$ × $i$/36000
5.2 yield$_{360}$ = $d_{360}$ × 36000/$n$ (FV − $d_{360}$)
5.3 $d_{365}$ = $d_{360}$ × 360/365
5.4 yield$_{365}$ = $d_{365}$ × 36500/$n$ (FV − $d_{365}$)

6. BOND
6.1 Price of a Bond (PV) (see Note 2):
$n$ = No. of Days (uncompensated for leap days)
$i$ = yield
$c$ = coupon rate
For $n \geq 182.5$:

$$PV=100\left(1+\frac{i}{200}\right)^{-\frac{n}{182.5}}+\frac{100c}{i}\left(1+\frac{i}{200}\right)^{j}-\left(1+\frac{i}{200}\right)^{-\frac{n}{182.5}}-\frac{cj}{2}$$

where $j$ = 1 − frac $n$/182.5
For $n$ < 182.5:

$$PV=\frac{200+c}{2+\frac{n}{180}\cdot\frac{i}{100}}-\frac{(1-n)c}{2}$$

6.2 Yield of a Bond (see Note 2):
Solve for $i$ knowing PV, in the above 2 equations, which one depending on $n$.
Solution gives
$|i_{actual} - i_{calc}| < 2 \times i^2_{actual} \times C \times 10^{-6}$ 7. DATE (see Note 3):
7.1 Date 1 − Date 2
7.2 Date ± $n$ Days
1900≤Date≤2099 A.D.

8. ACCUMULATED INTEREST accumulated interest (in $)

$$=PMT\left\{k-j\frac{\left(1+\frac{i}{100}\right)^{k-n}}{\frac{i}{100}}\left[1-\left(1+\frac{i}{100}\right)^{j-k}\right]\right\}$$

8.2 PV$_k$ = PMT × 100/$i$ {1 − (1 + $i$/100)$^{k-n}$}

9. ACCUMULATION & MEANS & $\sigma$ 9.1
$$\text{Sum}=\sum_{1}^{n}x_i$$

9.2
$$\text{Sum of Squares}=\sum_{1}^{n}x_i^2$$

9.3
$$\text{Mean}=\frac{1}{n}\sum_{1}^{n}x_i$$

9.4
$$\sigma=\left\{\frac{1}{n-1}\sum_{1}^{n}x_i^2-\text{Mean}^2\right\}^{1/2}$$

10. TREND LINE 10.1
$$\underset{(m)}{\text{Slope}}=\frac{2\sum_{1}^{n}ky_k-(n+1)\sum_{1}^{n}y_k}{n(n^2-1)/6}$$

10.2
$$\underset{(c)}{Y\ \text{Intercept}}=\frac{1}{n}\sum_{1}^{n}y_k-\frac{n+1}{2}\cdot\text{slope}$$

10.3 $y_{(k)} = mk + c$

11. SUM OF DIGITS DEPRECIATION
$n$ = Depreciable Lifetime
PV = Initial Value of Asset
11.1 Depreciation at time ($k$) = [2 PV/$n$ ($n$ + 1)] ($n$ − $k$ + 1)
11.2 Remaining book value at ($k$) = PV [($n$ − $k$) ($n$ − $k$ + 1)]/$n$ ($n$ + 1)

12. CASH FLOW
12.1 Current Sum of Present Value of Cash Flow $$=\sum_{j=0}^{n}F_j(1+i)^{-j}$$

where
$j = j$ 'th cash flow
and $i$ = cost of capital

Figure 32:
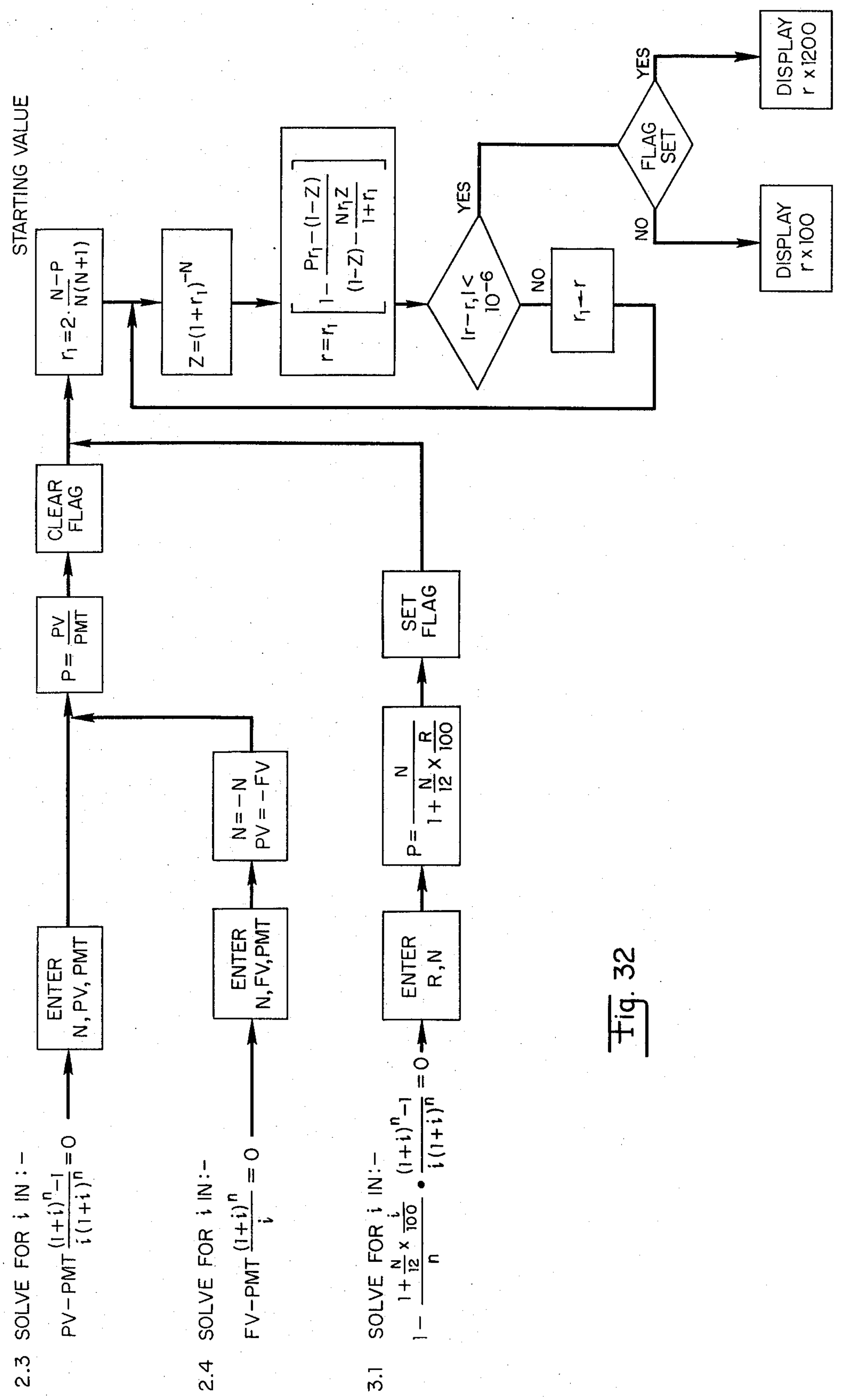
FIG. 32 is a flow diagram of an interest algorithm employed in the calculator of FIGS. 1 and 2.

Note 1: FIG. 32 illustrates the algorithm used for the solution of 2.3, 2.4 and 3.1 above. The technique is a simple Newton-Raphson method for the solution of an implicit equation.

Figure 33:
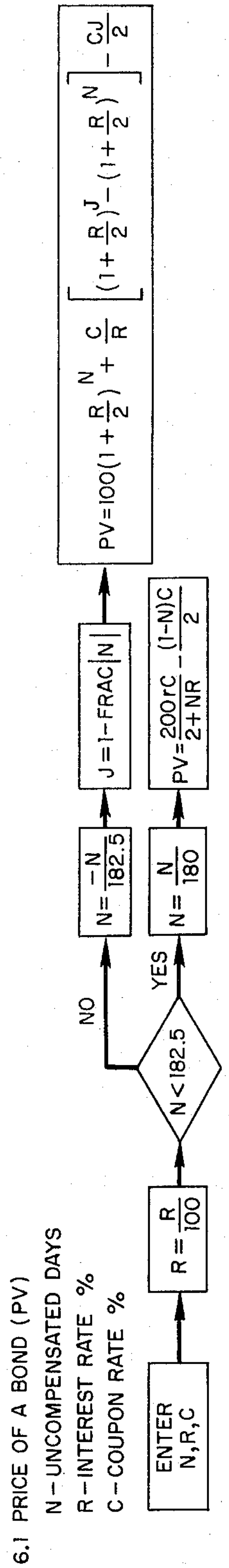
FIG. 33 is a flow diagram of a price of a bond algorithm employed in the calculator of FIGS. 1 and 2.
Figure 34:
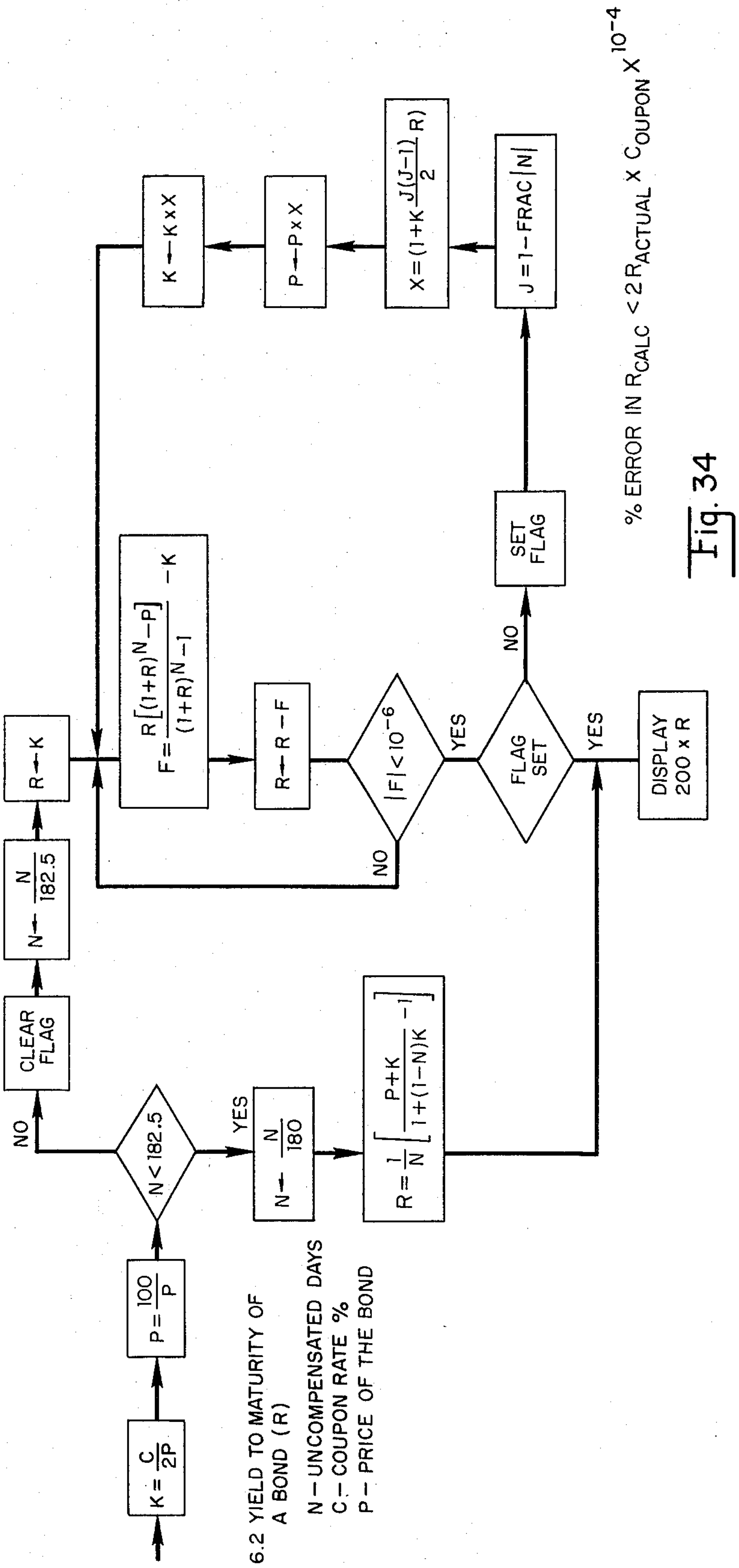
FIG. 34 is a flow diagram of a yield to maturity of a bond algorithm employed in the calculator of FIGS. 1 and 2.

Note 2: FIG. 33 shows how the price of a bond is calculated, and FIG. 34 illustrates the algorithm used to compute the yield to maturity of a bond.

Figure 35A:
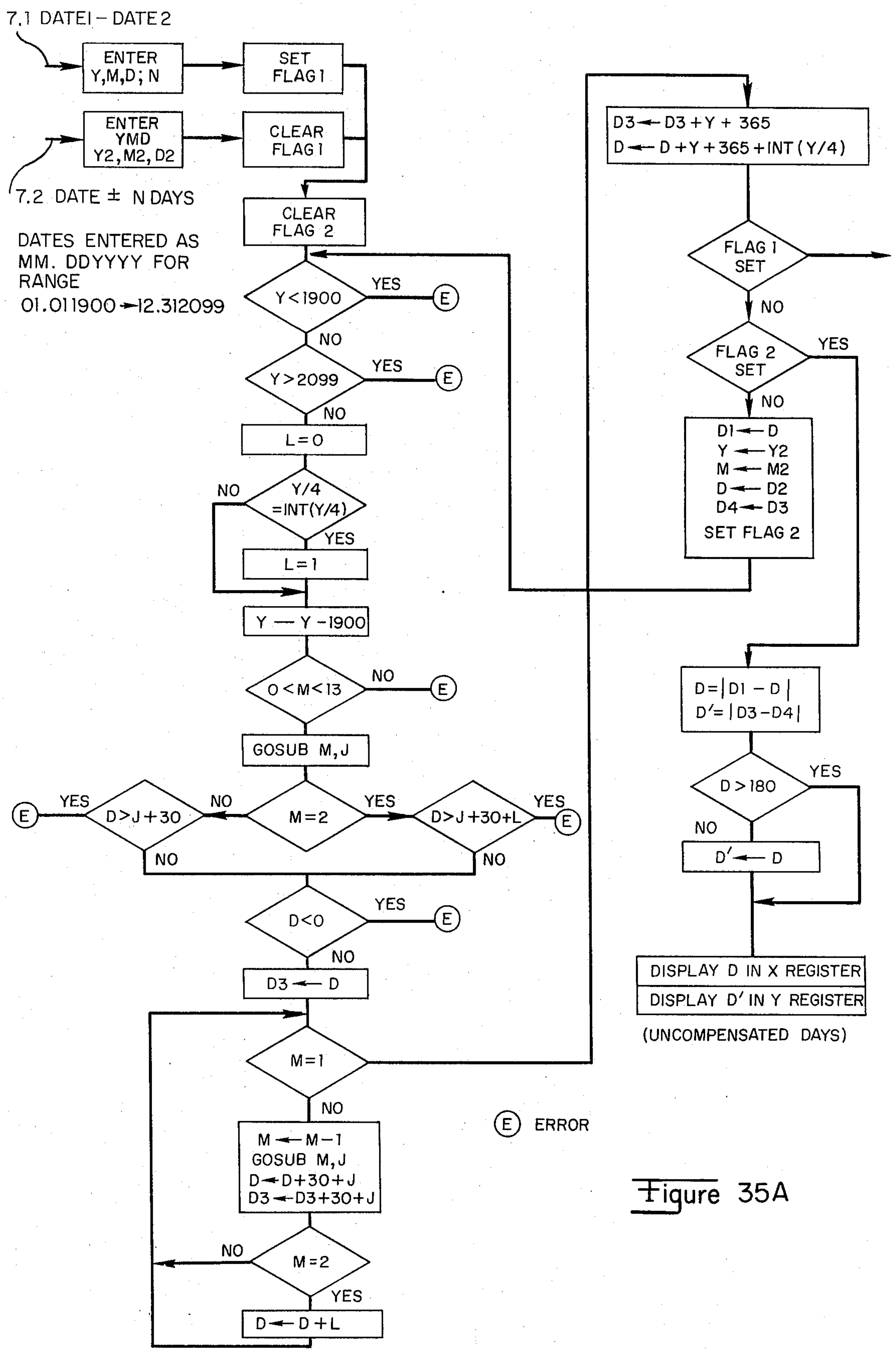
FIGS. 35A and B comprise a flow diagram of a date algorithm employed in the calculator of FIGS. 1 and 2.
Figure 35B:
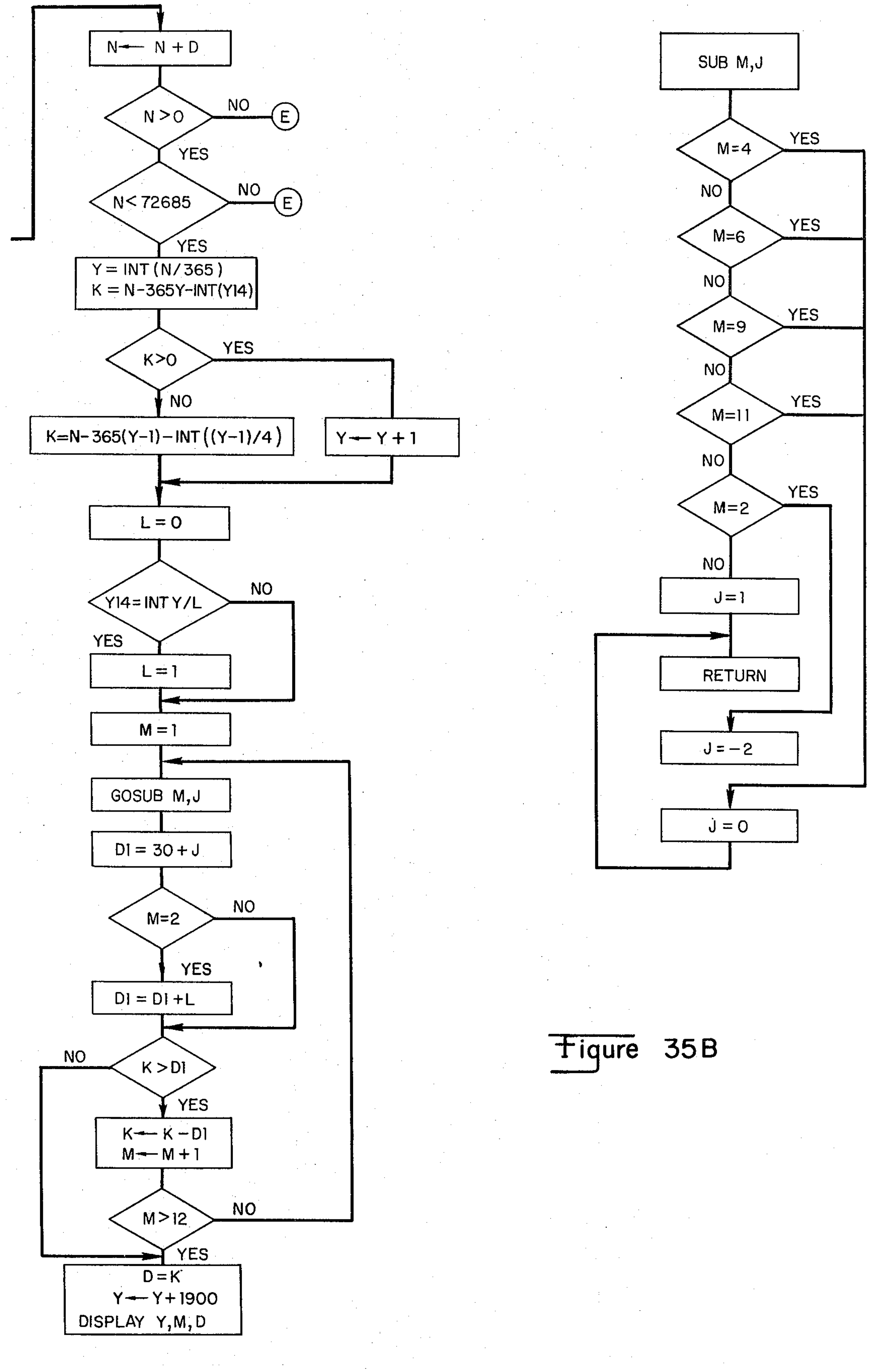

Note 3: FIG. 35 illustrates the date algorithm. The first half computes the dates difference and the next half the date ± $n$ days.

OPERATING INSTRUCTIONS

All of the operations described below are controlled or initiated from the keyboard input unit 12 which is shown in FIG. 1.

BASIC INSTRUCTIONS

| | | | |
|---|---|---|---|
| **Clearing** | | | |
| To clear display only | press | CLX | CLEAR |
| To clear everything (except constant storage) | press | | CLX |
| **Constant Storage** | | | |
| To store a constant | press | STO | |
| To recall a constant | press | RCL | |

NOTE: Certain important pre-programmed calculations overwrite previous contents of the constant storage. These are:
Add-on to annual Percentage Rate Conversion
Effective yield of an annuity (Loan repayment and sinking fund)
Accrued interest and discounted note problems
Trend lines (least squares linear regression)
Sum-of-the-digits calculations
Bond calculations (price and yield)
Accumulated interest paid on a loan
Discounted Cash Flow Analysis Except where noted above, a constant remains in the machine until it is turned off or over-written by another constant.

Rounding
To round-off (the display only) . . . . . press then any desired numeral key between [0] and [6]. A numeral key greater than [6] will put display in socalled "scientific notation." Normal turn-on mode is automatically rounded to two decimal places.

NOTE: Rounding affects the display only. The full internal accuracy of the machine is maintained.

Arithmetic Operations

To perform simple arithmetic operations between two numbers:

| | | |
|---|---|---|
| —key in the first number | press | SAVE ↑ |
| —key in the second number, press desired operation | | +, −, × ÷ |

To perform chain calculations, only the first number has to be loaded through a SAVE ↑ operation. . all subsequent numbers need only be keyed in and the desired function key pressed after each one.

Automatic computation between a displayed number and a stored constant is achieved by pressing RCL and the desired function.

Changing Sign

| | | |
|---|---|---|
| To change the sign of a displayed number | press | CHS |
| To enter a negative number, key in number | press | CHS |

Raising a Number to a Power

| | | |
|---|---|---|
| Key in positive base number (to be raised to a power) | press | SAVE ↑ |
| Key in power (exponent) | press | $y^x$ |

To Obtain Square Root of a Number

| | | |
|---|---|---|
| Key in Number | press | [shaded key] $y^x$ ($\sqrt{x}$) |

Percentage Operations

To obtain the percent amount of a number:

| | | |
|---|---|---|
| —key in the base number | press | SAVE ↑ |
| —key in the percent (as a %) | press | % |

To add or subtract the percentage amount to the base number simply press [+] or [−], respectively.

To obtain the percent difference between the two numbers:

| | | |
|---|---|---|
| —key in the base (or reference) number | press | SAVE ↑ |
| —key in the second number (answer is displayed in percent) | press | [shaded key] % (Δ%) |

Calendar Functions

Data entry sequence is: month, decimal point, two numeral day and four numeral year. Example: May 8, 1972 = 5.081972 Calendar range is from Jan. 1, 1900 to December 31, 2099.

| | | |
|---|---|---|
| To obtain difference between two dates: | | |
| —key in first date | press | SAVE ↑ |
| —key in second date | press | DAY |
| To obtain a date from a base date: | | |
| —key in the base date | press | SAVE ↑ |
| —key in the number of days (can be positive or negative) | press | [shaded key] DAY (DATE) |
| To obtain the day of the week of a date: | | |
| —key in today's date | press | SAVE ↑ |
| —key in the desired date | press | DAY SAVE ↑ |
| —key in 7 | press | ÷ |
| —key in that portion of the display left of the decimal point | press | − |
| —key in 7 again | press | × |

If the date in question is beyond today, its day of the week will be today's day plus the number shown in the display.

If the date in question is before today, its day of the week will be today's day minus the number shown in the display.

Error Indication

An improper or illegal operation (such as dividing by zero) will result in a steady blinking display..

Battery Condition (low charge indication)

All decimals in the display indicates low battery condition. Plug into recharger.

COMPOUND INTEREST

NOTE: To use the compound interest keys (top row) simply remember to enter your known values in left-to-right sequence and then press the key which corresponds to your answer.

Future Value

| | | |
|---|---|---|
| Key in number of time periods | press | n |
| Key in interest rate per time period (in %) | press | i |
| Key in present value (principal) | press | PV |
| To obtain future value | press | FV |

NOTE: Simple arithmetic operations may be performed prior to entering any value. Also, a mistaken last entry may be corrected by pressing CLX, then keying in the correct value and pressing the appropriate key.

Present Value

| | | |
|---|---|---|
| Key in number of time periods | press | n |
| Key in interest rate per time period (in %) | press | i |
| Key in future value amount | press | FV |
| To obtain present value | press | PV |

Rate of Return (growth rate)

| | | |
|---|---|---|
| Key in number of periods | press | n |
| Key in present (beginning) value | press | PV |
| Key in future (ending) value | press | FV |
| To obtain effective rate per period (in %) | press | i |

Number of Time Periods (for a compounded amount)

| | | |
|---|---|---|
| Key in interest rate per period (in %) | press | i |
| Key in present (beginning) value | press | PV |
| Key in future (ending) value | press | FV |
| To obtain number of time periods | press | n |

Nominal Rate Converted to Effective Annual Rate

| | | | | |
|---|---|---|---|---|
| Key in number of time periods per year | press | STO | | n |
| Key in Nominal Rate (as a %) | press | RCL | ÷ | i |
| Key in 1 0 0 | press | STO | PV | FV |
| To obtain effective annual rate (in %) | press | RCL | − | |

Effective Annual Rate Converted to Nominal Rate

| | | | |
|---|---|---|---|
| Key in number of time periods per year | press | STO | n |
| Key in 1 0 0 | press | SAVE ↑ | PV |
| Key in effective annual rate (in %) | press | + FV | i |
| To obtain nominal rate (in %) | press | RCL | × |

SINKING FUND

Future Value of an Annuity (sinking fund)

| | | |
|---|---|---|
| Key in number of time periods | press | n |
| Key in interest rate per period (as a %) | press | i |
| Key in payment (installment) amount | press | PMT |
| To obtain future value | press | FV |

Sinking Fund Payment Amount

| | | |
|---|---|---|
| Key in number of time periods | press | n |
| Key in interest rate per period (as a %) | press | i |
| Key in future value | press | FV |
| To obtain payment amount | press | PMT |

Effective Yield of Sinking Fund

| | | |
|---|---|---|
| Key in number of time periods | press | n |
| Key in payment (installment) amount | press | PMT |
| Key in future value | press | FV |
| To obtain interest rate per period (as a %) | press | i |

Number of Periods Required for a Sinking Fund

| | | |
|---|---|---|
| Key in interest rate per period (as a %) | press | i |
| Key in payment (installment) amount | press | PMT |

-Continued

| | | |
|---|---|---|
| Key in future value | press | FV |
| To obtain number of time periods | press | n |

LOAN PAYMENT

Accrued (Simple) Interest Payment Due

| | | | |
|---|---|---|---|
| Key in number of days | press | n | |
| Key in annual interest rate (in %) | press | i | |
| Key in the principal (present value) | press | PV | |
| To obtain interest payment due on a 360 day basis | press | [shaded key] | NTR / PMT |
| To obtain interest payment due on a 365 day basis | press | XY | |

Discounted Note and Effective Annual Yields

| | | | |
|---|---|---|---|
| Key in number of days | press | n | |
| Key in annual interest (discount) rate (in %) | press | i | |
| Key in the face (future) value of note | press | FV | |
| To obtain the discount amount (i.e.—the interest portion) of the note on a 360 day basis | press | [shaded key] | NTR / PMT |
| To obtain the effective annual yield on a 360 day basis | press | R↓ | |
| To obtain the discount amount of the note on a 365 day basis | press | R↓ | |
| To obtain the effective annual yield on a 365 day basis | press | R↓ | |

True Equivalent Annual Yield

| | | | |
|---|---|---|---|
| Key in number of days | press | SAVE ↑ | |
| Key in 3 6 5 | press | ÷ | n |
| Key in the principal (present value) of note | press | PV | |

| | | |
|---|---|---|
| Key in the face value (future value) of note | press | FV |
| To obtain true equivalent annual yield | press | i |

Present Value of an Annuity (Principal Amount of a Loan)

| | | |
|---|---|---|
| Key in the number of time periods (months, years, etc.) | press | n |
| Key in interest rate per period (in %) | press | i |
| Key in the amount of the payment per period | press | PMT |
| To obtain present value (principal) | press | PV |

Loan Repayment Amount

| | | |
|---|---|---|
| Key in number of time periods | press | n |
| Key in interest rate per period (in %) | press | i |
| Key in present value (principal) | press | PV |
| To obtain payment amount per period | press | PMT |

True Interest Rate of a Loan

| | | |
|---|---|---|
| Key in number of time periods | press | n |
| Key in payment amount per period | press | PMT |
| Key in present value (principal) | press | PV |
| To obtain interest rate per period (in %) | press | i |

NOTE: To obtain an annual rate simply key in the number of time periods per year and press [X].

Number of Time Periods Required for a Loan

| | | |
|---|---|---|
| Key in the interest rate per time period | press | i |
| Key in the payment amount per time period | | PMT |
| Key in the present value (principal) | press | PV |
| To obtain the number of time periods | press | n |

Accumulated Interest Paid on a Loan (between two points in time)

| | | |
|---|---|---|
| Key in the payment number corresponding to the first point of the time span in question | press | STO |
| Key in the payment number corresponding to the last point of the time span in question | press | n |
| Key in the total number of payments of the loan | press | n |

-Continued

| | | |
|---|---|---|
| Key in the interest rate per payment (or period) | press | i |
| Key in the payment amount per period | press | PMT |
| To obtain the accumulated interest | press | Σ+ |

Remaining Balance (Principal) of a Loan

| | | |
|---|---|---|
| As an extension of the previous problem To obtain the remaining balance (principal) | press | x y |

"Add-on" Interest Converted to a True Annual Percentage Rate

| | | |
|---|---|---|
| Key in the number of months of the loan | press | n |
| Key in the "add-on" rate (per annum) | press | i |
| To obtain true annual percentage rate | press | i |
| To obtain the monthly payment amount | press | xy |
| Then key in the principal amount to be loaned | press | X |

Interest Rebate (Rule of 78's)

| | | |
|---|---|---|
| Key in last payment number | press | n |
| Key in total number of payments for the loan | press | n |
| Key in the total finance charge | press | PV |
| To obtain the unearned interest (rebate) | press | [shaded key] SOD xy |

| | | |
|---|---|---|
| To obtain the remaining principal due, key in the amount of each payment | press | SAVE ↑ |
| key in the number of payments remaining | press | X xy − |

DEPRECIATION AMORTIZATION

Sum-of-the-years' Digits Depreciation

| | | |
|---|---|---|
| 1. Key in given year number (or beginning year number) | press | n |
| 2. Key in life of asset (number of years) | press | n |
| 3. Key in depreciable amount (purchase less salvage value) | press | PV |
| 4. To obtain given year's depreciation | press | [shaded key] SOD |
| 5. To obtain subsequent year's depreciation | press | SOD |
| 6. Continue step 5 as desired | | |
| 7. To obtain the depreciation for a particular year not in sequence, simply key in the year number desired and | press | n SOD |
| 8. Continue step 7 as desired. | | |

NOTE: To obtain the remaining book value after each year's depreciation press [xy]. The [xy] key must be pressed again before the next [SOD] calculation (step 5).

Straight Line Depreciation

| | | |
|---|---|---|
| Key in depreciable amount (purchase less salvage value) | press | SAVE ↑ SAVE ↑ |
| To obtain each year's depreciation —key in life of asset (number of years) | press | ÷ |

NOTE: To obtain the remaining book value after each year's depreciation, first press [STO] [−] (for book value after first year) then [RCL] [−] for each subsequent year.

Variable Rate, Declining-Balance Depreciation

| | | |
|---|---|---|
| 1. Key in [1] [0] [0] and | press | [SAVE ↑] |
| 2. Key in life of asset (number of years) | press | [÷] |
| 3. Key in declining factor or rate (i.e.—1.5, 2 etc.) | press | [×] [STO] |
| 4. Key in depreciable amount (purchase less salvage value) | | |
| 5. To obtain year's depreciation | press | [RCL] [%] |
| 6. To obtain remaining book value | press | [−] |
| 7. Continue steps 5. and 6. for subsequent years. | | |

Diminishing Balance Depreciation

| | | |
|---|---|---|
| 1. Key in life of asset (number of years) | press | [n] |
| 2. Key in beginning value of asset | press | [PV] |
| 3. Key in ending (salvage) value of asset | press | [FV] |

NOTE: Salvage value must be greater than zero.

| | | |
|---|---|---|
| 4. To obtain and store rate of depreciation | press | [i] [CHS] [STO] |
| 5. Key in beginning value of asset | | |
| 6. To obtain year's depreciation | press | [RCL] [%] |
| 7. To obtain remaining book value | press | [−] |
| 8. Continue steps 6. and 7. for subsequent years. | | |

BONDS

Price of a Bond

| | | |
|---|---|---|
| 1. Key in either maturity or purchase date | press | [SAVE ↑] |
| 2. Key in remaining date | press | [DAY] |
| 3. Key in yield-to-maturity (as a %) | press | [i] |
| 4. Key in coupon rate (as a %) | press | [PMT] |
| 5. To obtain bond price | press | [▨] [PV] (BOND) |

Yield-to-Maturity of a Bond

| | | |
|---|---|---|
| 1. Key in either maturity or purchase date* | press | [SAVE ↑] |
| 2. Key in remaining date | press | [DAY] |
| 3. Key in coupon rate (as a %) | press | [PMT] |
| 4. Key in the bond price | press | [PV] |
| 5. To obtain bond yield | press | [▨] [i] (YTM) |

NOTE: Normal accuracy of bond calculations is two decimal places for most cases. If further accuracy is required, the following procedure should replace steps 1 and 2 of either of the above.

Extended Precision Bond Calculations

NOTE: This procedure replaces steps 1 and 2 in normal bond calculations. It provides six decimal place accuracy for all bond price calculations and three decimal place accuracy for most yield calculations.

| | | |
|---|---|---|
| a) Determine the number of days, months and years to maturity (in accordance with trade custom) | | |
| b) Key in number of days | press | [SAVE ↑] |
| c) Key in [3] [0] (days/month) | press | [−] |
| d) Key in number of months | press | [−] |
| e) Key in [1] [2] (months/year) | press | [−] |
| f) Key in number of years | press | [−] |
| g) Key in [3] [6] [5] (days/year) | press | [X] [i] |

Continue with step 3. of bond calculations.

INVESTMENT ANALYSIS

Discounted Rate of Return (for even cash flows)

| | | |
|---|---|---|
| Key in number of time periods | press | [n] |
| Key in amount of cash flow per period | press | [PMT] |
| Key in original investment | press | [PV] |
| To obtain discounted rate of return (in %) per period | press | [i] |

Discounted Cash Flow Analysis (for uneven cash flows)

| | | |
|---|---|---|
| 1. Key in discount rate (in %) per period | press | [i] |
| 2. Key in original investment | press | [CHS] [PV] |
| 3. Key in cash flow per period | press | [PV] [Σ+] |
| 4. Continue step 3. for subsequent flows. | | |

NOTE: Investment is profitable (to the extent of the discount rate) if the result is positive. Furthermore, the user can determine the "break-even" period by noting the period in which step 3 first yielded a positive result.

STATISTICS

Mean and Standard Deviation

1. Clear the entire machine by pressing ▨ [CLX] (CLEAR)
2. Key in data item press [Σ+]
3. Continue step 2. until all data are entered.
4. To obtain mean (arithmetic average) press [$\bar{x}$]

NOTE: To obtain the standard deviation after each mean calculation press [xy] . The [xy] key must be pressed again before resuming.

5. To return to the summation mode press ▨ [$\bar{x}$] (→Σ)
6. Continue with step 2. if desired.

NOTE: To correct a data item key in its value and press ▨ [Σ+] (Σ−).

Trend Lines (Least Squares Linear Regression)

1. Clear the entire machine by pressing ▨ [CLX] (CLEAR)
2. Sequentially, key in data item press [TL]

NOTE: Each time [TL] is pressed, the sequence number for that item is displayed.

3. Continue step 2. until all data are entered.
4. To terminate the data entry sequence press ▨ [TL]
5. To obtain a specific value on the trend line, key in the appropriate time period number press [n] [TL]
6. Repeat step 5. as often as desired.

NOTE: The user may also "step-along" the trend line by simply pressing [TL] as many times as desired. Further, the current time period number may be obtained by pressing [xy]. The [xy] key must be pressed again before resuming.

7. To obtain the amount of change of the trend line per period (commonly called "slope") press [R↓] [R↓]
8. To resume operation press [R↓] [R↓]

We claim:

1. An electronic calculator comprising:

keyboard input means having a plurality of numeric keys manually operable for entering numerical data into the calculator and having a plurality of non-numeric control keys manually operable for controlling the calculator, said non-numeric control keys including a plurality of function keys associated with a plurality of mathematically related variables and manually operable for designating selected numerical data as said variables and for conditioning the calculator to perform mathematical operations involving said variables;

storage means coupled to said keyboard input means for storing numerical data entered into or calculated by the calculator;

processing means coupled to said keyboard input means and to said storage means and responsive to successive actuation of one or more of said numeric keys and one or more of said non-numeric control keys in a sequence, including one of said function keys followed by one of said function keys without interruption by any of said numeric keys, for automatically performing a mathematical operation employing selected numerical data, stored in said storage means and designated as one or more of said variables by actuation of one or more of said function keys, to determine the value of a variable associated with the last of said function keys in said sequence; and output means coupled to said processing means for indicating the value of the variable associated with the last of said function keys in said sequence.

2. An electronic calculator as in claim 1 wherein said processing means is responsive to actuation of one of said non-numeric control keys for determining the percentage difference between two numerical values stored in said storage means and for thereupon causing said output means to display that percentage difference in decimal digit form.

3. An electronic calculator as in claim 1 wherein:

said processing means is operable for generating the percentage difference between two numerical values stored in said storage means; and said non-numeric control keys include a command key manually operable with another of said non-numeric control keys, when said command key and said other non-numeric control key are successively actuated in the order mentioned, for causing said processing means to generate the percentage difference between two numerical values stored in said storage means and for thereupon causing said output means to display that percentage difference in decimal digit form.

4. An electronic calculator as in claim 1 wherein said processing means includes:

first means responsive to actuation of a first one of said non-numeric control keys for generating the arithmetic average of numerical data stored in said storage means, for causing said output means to display said arithmetic average in decimal digit form, and for generating an end-of-operation signal; and second means coupled to said first means and responsive to said end-of-operation signal for generating the standard deviation of numerical data stored in said storage means, said processing means being responsive to actuation of a second one of said non-numeric keys for causing said output means to indicate said standard deviation in decimal digit form.

5. An electronic calculator as in claim 4 wherein said non-numeric control keys include a command key manually operable with said first and second non-numeric control keys, when said second non-numeric control key, said command key, and said first non-numeric control key are successively actuated in the order mentioned following generation of said arithmetic average and said end-of-operation signal, for causing said first and second means to generate the arithmetic average and the standard deviation for different numerical data entered into said storage means by said numeric keys.

6. An electronic calculator as in claim 1 wherein:
said numeric and non-numeric control keys are manually operable for storing numerical data representing any two calendar dates in said storage means in a predetermined decimal digit format; and
said processing means includes first means responsive to actuation of one of said non-numeric control keys for determining the number of days between any two calendar dates, included within a predetermined range of calendar dates and represented by numerical data stored in said storage means in said predetermined decimal digit format, and for causing said output means to display the determined number of days in said predetermined decimal digit format.

7. An electronic calculator as in claim 6 wherein said processing means includes:
second means responsive to actuation of said one of said non-numeric control keys for causing said output means to indicate when numerical data stored in said storage means represents an erroneous calendar date, represents a calendar date outside said predetermined range of calendar dates, or is incompatible with said predetermined decimal digit format; and
third means for compensating for the extra day in leap-years occurring within said predetermined range of calendar dates.

8. An electronic calculator as in claim 1 wherein:
a first one of said non-numeric control keys is manually operable with one or more of said numeric keys for storing a first numerical datum representing the number of successive payments;
a second one of said non-numeric control keys is manually operable with one or more of said numeric keys for storing a second numerical datum representing the interest rate per payment;
a third one of said non-numeric control keys is manually operable with one or more of said numeric keys for storing a third numerical datum representing the amount of each payment; and
said processing means is responsive to actuation of a fourth one of said non-numeric control keys for generating the present value of the number of successive payments represented by said first numerical datum in the amount per payment represented by said third numerical datum and at the interest rate per payment represented by said second numerical datum and for causing said output means to display the generated present value in decimal digit form.

9. An elecronic calculator is in claim 8 wherein each of said first, second, third, and fourth non-numeric control keys comprises a different one of said function keys.

10. An electronic calculator as in claim 1 wherein:
a first one of said non-numeric control keys is manually operable with one or more of said numeric keys for storing equally-spaced and chronologically-sequenced numerical data in said storage means;
said processing means is operable for generating the least-squares linear regression of the numerical data stored in said storage means; and
said non-numeric control keys include a command key manually operable with said first non-numeric control key, when said command key and said first non-numeric control key are successively actuated in the order mentioned, for causing said processing means to generate a first value of the least-squares linear regression of the numerical data stored in said storage means and for causing said output means to indicate said first value in decimal digit form.

11. An electronic calculator as in claim 10 wherein:
said first value is the value at the $y$-intercept in rectangular coordinate notation; and
said processing means is responsive to further successive actuations of said first non-numeric control key for generating succeeding values of the least-squares linear regression of the numerical data stored in said storage means.

12. An electronic calculator as in claim 10 wherein:
a second one of said non-numeric control keys is manually operable with one or more of said numeric keys for storing the sequence number of a chronological numerical datum in said storage means; and
said processing means is responsive to actuation of said first non-numeric control key, when successively preceded by actuation of said second non-numeric control key, for generting the value of the least-squares linear regression for the chronological numerical datum designated by the sequence number stored in said storage means by actuation of said second non-numeric control key.

13. An electronic calculator as in claim 1 wherein:
said numeric and non-numeric control keys are manually operable for storing numerical data representing an initial calendar date in said storage means in a predetermined decimal digit format and for storing numerical data representing a number of days from said initial calender date; and
said processing means includes first means responsive to actuation of one of said non-numeric control keys for generating the calender date of the day corresponding to said number of days from said initial calendar date, when said initial and generated calendar dates are included within a predetermined range of calendar dates, and for causing said output means to display the generated calendar date in said predetermined decimal digit format.

14. An electronic calculator as in claim 13 wherein said processing means includes:
second means responsive to actuation of said one non-numeric control key for causing said output means to indicate when numerical data stored in said storage means represents an erroneous calendar date, represents a calendar date outside said predetermined range of calendar dates, or is incompatible with said predetermined decimal digit format; and third means for compensating for the extra day in leap-years occurring within said predetermined range of calendar dates.

15. An electronic calculator as in claim 13 wherein said non-numeric control keys include a command key manually operable with said one non-numeric control key, when said command key and said one non-numeric control key are successively actuated in the order mentioned, for causing said first means to generate the calendar date of the day corresponding to said number of days from said initial calendar date and to cause said output means to display the generated calendar date in said predetermined decimal digit format.

16. An electronic calculator as in claim 13 wherein said first means is responsive to actuation of said one non-numeric control key for generating the calendar date of the day corresponding to said number of days forward from said initial calendar date, when the numerical data representing said number of days from said initial calendar date is positive, and for generating the calendar date of the day corresponding to said number of days backward from said initial calendar date, when the numerical data representing said number of days from said initial calendar date is negative.

17. An electronic calculator as in claim 1 wherein:

a first one of said non-numeric control keys is manually operable with one or more of said numeric keys for storing a first numerical datum designating a particular period within the depreciable life of an asset in said storage means and is manually operable with one or more of said numeric keys for storing a second numerical datum representing the total number of such periods in the depreciable life of the asset in said storage means;

a second one of said non-numeric control keys is manually operable with one or more of said numeric keys for storing a third numerical datum representing an initial value of the asset in said storage means;

said processing means is operable for generating the value of the sum-of-the-digits depreciation and the depreciated value of the initial value of the asset represented by said third numerical datum for the period designated by said first numerical datum; and said non-numeric control keys include a command key manually operable with a third one of said non-numeric control keys, when said command key and said third non-numeric control key are successively actuated in the order mentioned, for causing said processing means to generate said value of the sum-of-the-digits depreciation and said depreciated value and for causing said output means to display said generated value of the sum-of-the-digits depreciation in decimal digit form.

18. An electronic calculator as in claim 17 wherein said processing means is responsive to further successive actuations of said third non-numeric control key for generating the value of the sum-of-the-digits depreciation of the initial value of the asset represented by said third numerical datum for each period included within the total number of periods represented by said second numerical datum subsequent to the period designated by said first numerical datum and for causing said output means to display each generated value of the sum-of-the-digits depreciation in decimal digit form.

19. An electronic calculator as in claim 17 wherein a fourth one of said non-numeric control keys is manually operable for thereafter causing said output means to display said generated depreciated value in decimal digit form.

20. An electronic calculator as in claim 1 wherein:

a first one of said non-numeric control keys is manually operable with one or more of said numeric keys for storing a first numerical datum representing the number of days within an interest accruing period in said storage means;

a second one of said non-numeric control keys is manually operable with one or more of said numeric keys for storing a second numerical datum representing an annual interest rate in said storage means;

a third one of said non-numeric control keys is manually operable with one or more of said numeric keys for storing a third numerical datum representing a principal amount in said storage means;

said processing means is responsive to actuation of a fourth one of said non-numeric control keys for generating the values of the amount of interest on a 360-day basis and on a 365-day basis of the principal amount represented by said third numerical datum for the number of days represented by said first numerical datum and at the annual interest rate represented by said second numerical datum and for causing said output means to display the value of the amount of interest generated on one of said bases in decimal digit form.

21. An electronic calculator as in claim 20 wherein said processing means is responsive to actuation of a fifth one of said non-numeric control keys for causing said output means to display the value of the amount of interest generated on the other of said bases in decimal digit form.

22. An electronic calculator as in claim 20 wherein said non-numeric control keys include a command key manually operable with said fourth non-numeric control key, when said command key and said fourth non-numeric control key are successively actuated in the order mentioned, for causing said processing means to generate said values of the amount of interest and to cause said output means to display the value of the amount of interest generated on said one of said bases in decimal digit form.

23. An electronic calculator as in claim 22 wherein said processing means is responsive to actuation of a fifth one of said non-numeric control keys for causing said output means to display the value of the amount of interest generated on the other of said bases in decimal digit form.

24. An electronic calculator as in claim 1 wherein:

a first one of said non-numeric control keys is manually operable with one or more of said numeric keys for storing a first numerical datum representing the number of payments within an interest accruing period in said storage means;

a second one of said non-numeric control keys is manually operable with one or more of said numeric keys for storing a second numerical datum representing the annual add-on interest rate in said storage means; and said processing means is responsive to reactuation of said second non-numeric control key, following storage of said second numerical datum in said storage means, for generating the value of an annular percentage interest rate and the value of a monthly payment factor for the number of payments represented by said first numerical datum at the annual add-on interest rate represented by said second numerical datum and for causing said output means to display the generated value of the annual percentage interest rate in decimal digit form.

25. An electronic calculator as in claim 24 wherein each of said first and second non-numeric control keys comprises a different one of said function keys.

26. An electronic calculator as in claim 24 wherein said processing means is responsive to actuation of a third one of said non-numeric control keys for causing said output means to display the generated value of the monthly payment factor in decimal digit form.

27. An electronic calculator as in claim 26 wherein said processing means is further responsive to actuation of one or more of said numeric keys for storing a third numerical datum representing the principal amount in said storage means and is thereupon responsive to actuation of a fourth one of said non-numeric control keys for generating the value of the monthly payment and for causing said output means to display the generated value of the monthly payment in decimal digit form.

28. An electronic calculator as in claim 1 wherein:

said plurality of function keys comprises five financial function keys associated with five mathematically related financial function variables; and said processing means is responsive to successive actuation of one or more of said numeric keys and one or more of said non-numeric control keys in a sequence, including one of said financial function keys followed by one of said financial function keys without interruption by any of said numeric keys, for automatically performing a mathematical operation employing selected numerical data, stored in said storage means and designated as one or more of said variables by actuation of one or more of said financial function keys, to determine the value of a financial function variable associated with the last of said financial function keys in said sequence.

29. An electronic calculator as in claim 28 wherein said five financial function keys include:

a first financial function key associated with a financial function variable representing a number of periods;

a second financial function key associated with a financial function variable representing an interest rate per period;

a third financial function key associated with a financial function variable representing a periodic payment amount;

a fourth financial function key associated with a financial function variable representing a present value of principal; and a fifth financial function key associated with a financial function variable representing a future value of principal after one or more periods have elasped.

30. An electronic calculator as in claim 29 wherein said first, second, third, fourth, and fifth financial function keys are positioned on said keyboard input means in a lineal sequence and in the order mentioned.

31. An electronic calculator as in claim 29 wherein:

said non-numeric control keys include a command key for associating one of said five financial function keys with an alternate financial function variable representing a yield to maturity of a bond, for associating another of said five financial function keys with an alternate financial function variable representing an accrued interest amount, and for associating still another of said five finanical function keys with an alternate financial function variable representing a bond price; and each of said three last-mentioned financial function keys is manually operable, when actuated successively following actuation oof said command key, for designating selected numerical data as the corresponding one of said alternate financial function variables and for conditioning the calculator to perform a mathematical operation involving that alternate financial function variable.

32. An electronic calculator as in claim 31 wherein:

said first, second, third, fourth, and fifth financial function keys are positioned on said keyboard input means in a lineal sequence and in the order mentioned; and said three financial function keys associable with said alternate financial function variables are positioned on said keyboard input means in a lineal sequence and in the order mentioned.

33. An electronic calculator as in claim 31 wherein:

each of said five financial function keys is provided with an indicium indicating the financial function variable with which it is associated; and said keyboard input means is further provided with indicia indicating the alternate financial function variables with which said three financial function keys are associable.

34. An electronic calculator as in claim 33 wherein said command key and said indicia indicating the alternate financial function variables are color coded.

* * * * *

UNITED STATES PATENT OFFICE
CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

Col. 11, line 12, after "pointer" insert -- ≠ --;

Col. 13, line 37, "16" should read -- 20 --;

Col. 15, line 10, "wave forms" should read -- waveforms --;

Col. 18, line 66, after "with" insert -- the functions it initializes. The additional functions --;

Col. 19-22, the "TABLE OF INSTRUCTION TYPES (X = DON'T CARE)" should appear as shown below:

TABLE OF INSTRUCTION TYPES (X = DON'T CARE)

| TYPE | AVAILABLE INSTRUCTIONS | NAME | FIELDS |
|---|---|---|---|
| 1 | 256 (ADDRESSES) | JUMP SUBROUTINE | 8: SUBROUTINE ADDRESS \| 0 1 |
| | 256 (ADDRESSES) | CONDITIONAL BRANCH | BRANCH ADDRESS \| 1 1 ($I_9$ … $I_0$) |
| 2 | 32 x 8 = 256 | ARITHMETIC/REGISTER | 5: OPERATION CODE \| 3: WORD SELECT \| 1 0 |
| 3 | 64 (37 used) | STATUS OPERATIONS | 4: N \| 2: F \| 0 \| 1 0 0 ($I_5$ $I_4$ $I_3$ $I_2$ $I_1$ $I_0$) |
| | | SET BIT N | F = 00 |
| | | INTERROGATE N | F = 01 |
| | | RESET N | F = 10 |
| | | CLEAR ALL | F = 11 (N = 0000) |

UNITED STATES PATENT OFFICE
CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

TABLE OF INSTRUCTION TYPES (X = DON'T CARE)

| TYPE | AVAILABLE INSTRUCTIONS | NAME | FIELDS |
|---|---|---|---|
| 4 | 64 | POINTER OPERATIONS | P [4] \| F [2] \| 1 \| 1 0 0 |
| | (30 used) | SET POINTER TO P | F = 00 |
| | | INTERROGATE P | F = 10 |
| | | DECREMENT P | F = 01 } P = XXXX |
| | | INCREMENT P | F = 11 } |
| 5 | 64 (20 used) | DATA ENTRY/DISPLAY | N [4] \| F [2] \| 1 0 0 0 |
| | | LOAD CONSTANT | F = 01 |
| | | IS → A | F = 1X (N = XX01) |
| | | BCD INPUT TO C REG | F = 1X (N = XX11) |
| | | STACK INSTRUCTIONS | F = 10 N = (---0) |
| | | AVAILABLE | F = 00 |
| 6 | 32 | ROM SELECT, MISC. | N [3] \| F [2] \| 1 0 0 0 0 |
| | (11 used) | SELECT ROM "N" | F = 00 |
| | | KEYBOARD ENTRY | F = 10 (N = XX1) |
| | | EXTERNAL ENTRY | (N = XX0) |
| | | SUBROUTINE RETURN | F = 01 (N = XXX) |
| 7 | 16 | RESERVED FOR PROGRAM STORAGE MOS CIRCUIT | X X X X [4] \| 1 0 0 0 0 0 |
| 8 | 8 | | X X X [3] \| 1 0 0 0 0 0 0 |
| 9 | 7 | AVAILABLE | X X X \| 0 0 0 0 0 0 0 |
| 10 | 1 | NO OPERATION (NOP) | 0 0 0 0 0 0 0 0 0 0 |

Col. 23, line 69 "+" (each occurrence) should read -- ± --;

UNITED STATES PATENT OFFICE

CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

Col. 23, line 70, "+" (first occurrence) should read -- ± --;

Col. 25, the "TABLE OF STATUS INSTRUCTION DECODING" should appear as follows:

TABLE OF STATUS INSTRUCTION DECODING

| Bit # | $I_9$ $I_8$ $I_7$ $I_6$ | $I_5$ $I_4$ | $I_3$ | $I_2$ $I_1$ $I_0$ |
|---|---|---|---|---|
| FIELD | N | F | 0 | 1 0 0 |

| F | INSTRUCTION |
|---|---|
| 0 0 | SET FLAG N |
| 0 1 | INTERROGATE FLAG N |
| 1 0 | RESET FLAG N |
| 1 1 | CLEAR ALL FLAGS (N=0000) |

Col. 26, the "TABLE OF POINTER INSTRUCTION DECODING" should appear as follows:

TABLE OF POINTER INSTRUCTION DECODING

| BIT # | 9 8 7 6 | 5 4 | 3 | 2 1 0 |
|---|---|---|---|---|
| FIELD | P | F | 1 | 1 0 0 |

| F | INSTRUCTION | |
|---|---|---|
| 00 | Set pointer to P | |
| 10 | Interrogate if pointer at P | |
| 01 | Decrement pointer | P = XXXX i.e. don't care |
| 11 | Increment pointer | |

UNITED STATES PATENT OFFICE
CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

Col. 26, the "TABLE OF TYPE 5 INSTRUCTION DECODING" should appear as follows:

TABLE OF TYPE 5 INSTRUCTION DECODING (X = don't care, which in this context means the instruction does not depend on this bit; either a 1 or a 0 here will cause the same execution.)

| $I_9\ I_8\ I_7\ I_6\ I_5\ I_4$ | 1 0 0 0 |
|---|---|

| | $I_9\ I_8\ I_7\ I_8$ | $I_5\ I_4$ | INSTRUCTION |
|---|---|---|---|
| | 0000 → 1111 | 0 0 | 16 Available instructions |
| 10 | 0000 $\overset{N}{\rightarrow}$ 1001 | 0 1 | Enters 4 bit code N into C Register at pointer position (LOAD CONSTANT) |
| 8 | 0 0 0 \| 0 | 1 X | Display Toggle |
| | 0 0 1 \| 0 | 1 X | Exchange Memory, C→M→C |
| | 0 1 0 \| 0 | 1 X | Up Stack, C→C→D→E→F |
| | 0 1 1 \| 0 | 1 X | Down Stack, F→F→E→D→A |
| | 1 0 0 \| 0 | 1 X | Display OFF |
| | 1 0 1 \| 0 | 1 X | Recall Memory, M→M→C |
| | 1 1 0 \| 0 | 1 X | Rotate Down, C→F→E→D→C |
| | 1 1 1 \| 0 | 1 X | Clear all registers 0→A,B,C,D,E,F,M |
| 1 | X X \| 0 1 | 1 X | $I_8$ → A register (56 bits) |
| 1 | X X \| 1 1 | 1 X | BCD → C register (56 bits) |
| 20 | | | |

UNITED STATES PATENT OFFICE
CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

Col. 27, the "TABLE OF TYPE SIX INSTRUCTION DECODING" should appear as follows:

TABLE OF TYPE SIX INSTRUCTION DECODING

| Circuit Affected | $I_9 I_8 I_7 I_6 I_5 I_4 I_3 I_2 I_1 I_0$ | Instruction |
|---|---|---|
| ROM | 0 0 0 0 0 1 0 0 0 0<br>↓ 0 0 1 0 0 0 0<br>1 1 1 0 0 1 0 0 0 0 | ROM select. One of 8 as specified in bits 19 - 17. |
| C&T | X X X 0 1 1 0 0 0 0 | Subroutine return |
| | X X 0 1 0 1 0 0 0 0 | External key code entry to C&T |
| | X X 1 1 0 1 0 0 0 0 | Keyboard entry |
| DATA STORAGE | 1 X 0 1 1 1 0 0 0 0 | Send Address from C Register to Data Storage Circuit |
| | 1 0 1 1 1 1 0 0 0 0 | Send data from C Register into Data Storage Circuit |

Col. 30, lines 25-26, "instruction" should read -- to --;

Col. 33-34, the right-hand column of the ROM 0 listing at line 132 should read -- IF A > = B[X] --;

Col. 35-36, at line 242 of the ROM 0 listing, delete "L0363:";

Col. 35-36, at line 243 of the ROM 0 listing, "I0363:" should read -- L0363: --;

Col. 41-42, at line 242 of the ROM 1 listing, "JSB ROTL" should read -- JSB ROT1 --;

UNITED STATES PATENT OFFICE

CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

Col. 49-50, at line 53 of the ROM 3 listing, "111.1.11." should read -- 111.1.111. --;

Col. 57-58 of the ROM 4 listing, line number "130" should read line number -- 230 --;

Col. 65-66, at line 50 of the ROM 6 listing, "→L6065" should read -- →L6064 --;

Col. 67-68, at line 164 of the ROM 6 listing, ".111..11..." should read -- .111..11.. --;

Col. 67-68, at line 170 of the ROM 6 listing, "IF A>=C[M]" should read -- IF A>=C[MS] --;

Col. 69-70, at line 206 of the ROM 6 listing, "L6136:" should read -- L6316: --;

Col. 69-70, at line 214 of the ROM 6 listing, "1111..11." should read -- 11111..11. --;

Col. 69-70, at line 216 of the ROM 6 listing, "0 C[W]" should read -- 0->C[W] --;

Col. 69-70, at line 224 of the ROM 6 listing, "11.111.111." should read -- 11.111.11 --;

UNITED STATES PATENT OFFICE

CERTIFICATE OF CORRECTION

Patent No. 3,863,060 Dated January 28, 1975

Inventor(s) France Rode et al.

It is certified that error appears in the above-identified patent and that said Letters Patent are hereby corrected as shown below:

Col. 69-70, at line 239 of the ROM 6 listing, "0→C[ ]" should read -- 0→C[X] --; and Col. 69, line 58, between "1.3" and "=" insert -- i --.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*